(12) United States Patent
Han et al.

(10) Patent No.: US 11,780,754 B2
(45) Date of Patent: Oct. 10, 2023

(54) RETURN FLOW SYSTEM FOR ION CONCENTRATION POLARIZATION (ICP) DESALINATION

(71) Applicant: Massachusetts Institute of Technology, Cambridge, MA (US)

(72) Inventors: Jongyoon Han, Bedford, MA (US); Junghyo Yoon, Malden, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 719 days.

(21) Appl. No.: 16/839,152

(22) Filed: Apr. 3, 2020

(65) Prior Publication Data
US 2020/0308028 A1    Oct. 1, 2020

Related U.S. Application Data

(63) Continuation of application No. PCT/US2019/014941, filed on Jan. 24, 2019.

(60) Provisional application No. 62/621,839, filed on Jan. 25, 2018.

(51) Int. Cl.
C02F 1/469    (2023.01)

(52) U.S. Cl.
CPC ............ *C02F 1/4695* (2013.01); *C02F 1/469* (2013.01); *C02F 1/4693* (2013.01); *C02F 2201/46* (2013.01); *Y02A 20/124* (2018.01)

(58) Field of Classification Search
CPC ...................................... C02F 1/469
See application file for complete search history.

(56) References Cited

U.S. PATENT DOCUMENTS

| | | | | |
|---|---|---|---|---|
| 2014/0374274 | A1* | 12/2014 | Kwak | B01D 61/42 205/748 |
| 2016/0115045 | A1* | 4/2016 | Kim | B01D 61/42 204/520 |
| 2017/0066665 | A1 | 3/2017 | Choi et al. | |

FOREIGN PATENT DOCUMENTS

WO    2016067274 A1    5/2016

* cited by examiner

*Primary Examiner* — Salil Jain
(74) *Attorney, Agent, or Firm* — Modern Times Legal; Robert J. Sayre

(57) ABSTRACT

The present invention provides return flow ICP and ED systems and methods that can be used for water desalination and/or concentration of a wide range of target brine and other aqueous and contaminated streams.

22 Claims, 47 Drawing Sheets

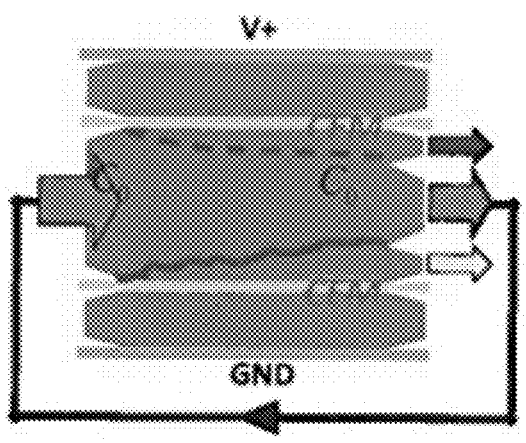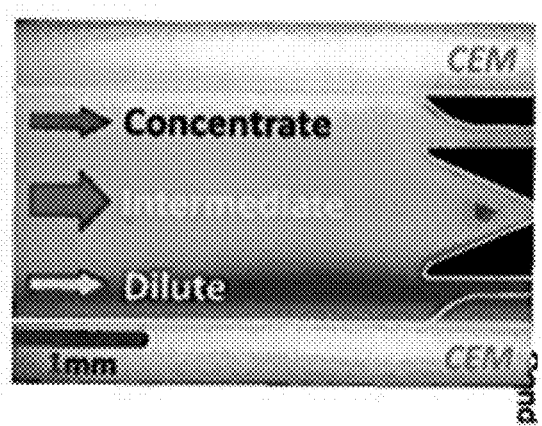
FIG. 2A                    FIG. 2B

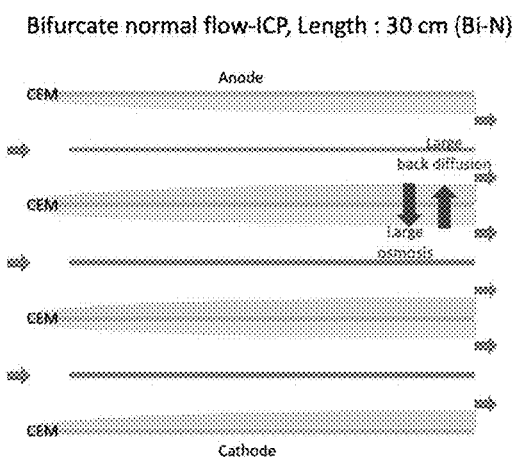 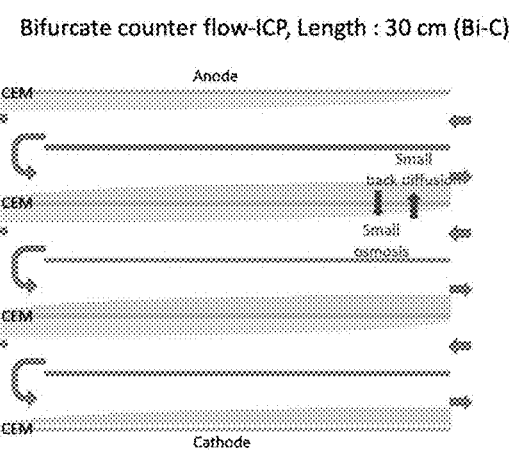
FIG. 29

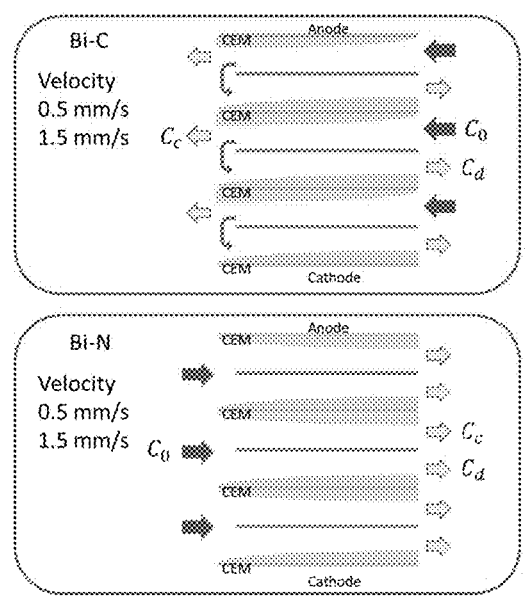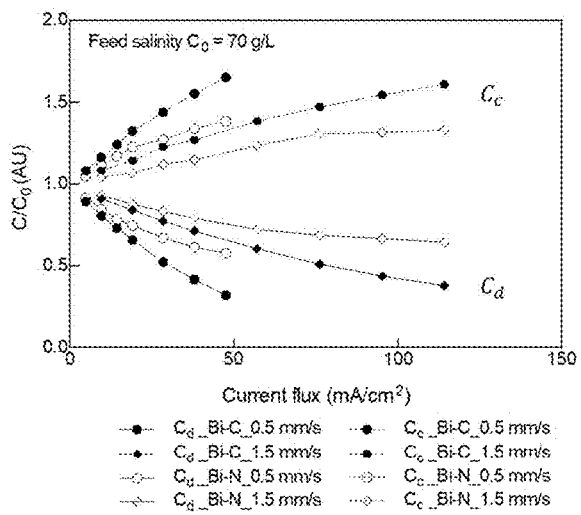
FIG. 30

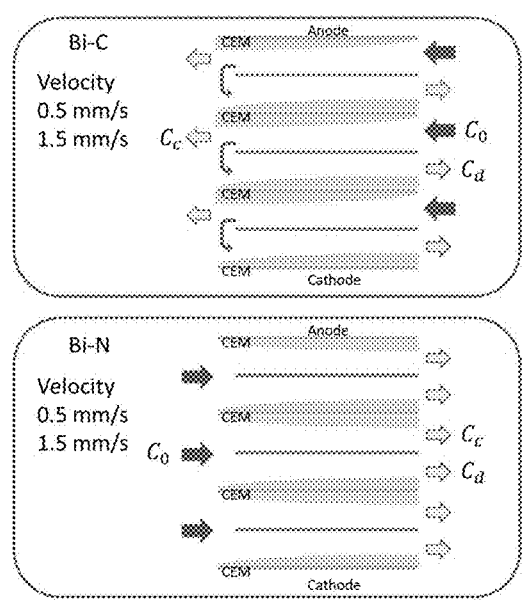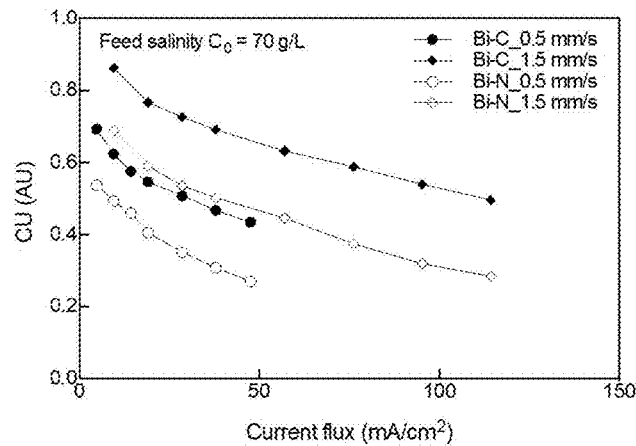
FIG. 31

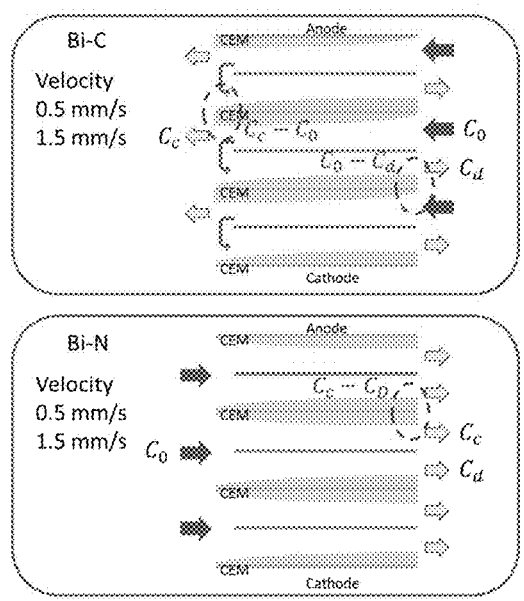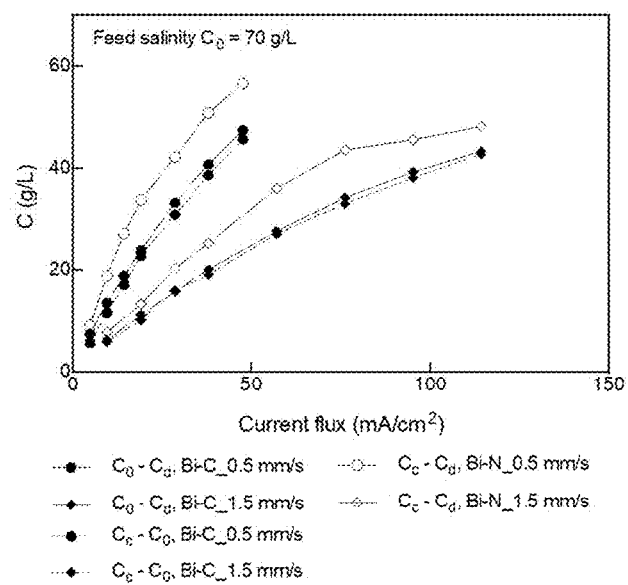
FIG. 32

RETURN FLOW SYSTEM FOR ION CONCENTRATION POLARIZATION (ICP) DESALINATION

RELATED APPLICATIONS

This application is a continuation of International Application No. PCT/US19/14941, which designated the United States and was filed on Jan. 24, 2019, published in English, which claims the benefit of U.S. Provisional Application No. 62/621,839 filed Jan. 25, 2018. The entire teachings of the above-referenced applications are incorporated herein by reference.

BACKGROUND OF THE INVENTION

Ion concentration polarization (ICP) desalination and trifurcate ICP desalination systems have been described, for example, in U.S. Patent App. Pub. No. 2014/0374274 A1 (entitled "Water Desalination/Purification and Bio-Agent Preconcentration by Ion Concentration Polarization") and U.S. Patent App. Pub. No. 2016/0115045 A1 (entitled "Purification of Ultra-High Saline and Contaminated Water by Multi-Stage Ion Concentration Polarization (ICP) Desalination"). As described in these patent publications, in ICP desalination, both dilute and concentrate streams are separately acquired between two identical ion exchange membranes (IEM). In contrast, conventional electrodialysis (ED) requires alternating different IEMs, for example, alternating an anion exchange membrane (AEM) and a cation exchange membrane (CEM).

It has been reported that ICP utilizing CEMs can enhance salt removal ratio up to 20% compared to electrodialysis under constant current applied, along with other advantages as compared with related electrodialysis techniques (Kim et al. (2016), Scientific Reports 6:31850; doi: 10.1038/srep31850). To improve energy efficiency of ICP, the trifurcate ICP desalination system and method was developed which splits the feed stream into three different output flows according to concentration distribution between membranes. The trifurcate ICP enables the collection of thin ion depleted and ion enriched layers which develop next to the IEM surface while the majority of the fluid is in the middle of the channel, by dividing outlets of target stream within one channel unit.

However, even with the trifurcate ICP desalination system, a high current density, corresponding to an over-limiting current, needs to be applied to provide highly desalted and concentrated water streams. This over-limiting current is accompanied by two phenomena, chaotic electroconvection in the dilute stream and propagation of enriched salt from the concentrate stream, resulting in increased energy consumption. The electroconvection in the dilute stream generates a chaotic flow motion which increases energy dissipation and causes undesirable flow mixing. The highly enriched salt in the concentrate stream, in turn, propagates to the dilute stream causing a decline of salt removal efficiency. Since the dilute and concentrate streams are on the same channel component, they can affect each other without any restrictions.

The present invention is based on the recognition that two strategies can be used to improve the energy efficiency of desalination and/or salt production. The strategies provide a channel structure that minimizes chaotic electroconvection at the dilute stream and/or that blocks enriched salt propagation from the concentrate stream.

SUMMARY OF THE INVENTION

The present invention provides return flow ICP and ED systems and methods that can be used for water desalination and/or concentration of a wide range of target brine and other aqueous and contaminated streams. Specifically, a newly designed flow pathway incorporating a porous membrane has been developed, a so-called return flow ICP desalination/concentration system, which suppresses chaotic electroconvection in the dilute stream and suppresses or prevents highly enriched salt propagation from the concentrate stream (described, for example, in more detail in FIGS. 3-7). The invention provides systems characterized by a primary channel defined by opposing ion exchange membranes with an inlet at one end and one or more return flow channels disposed therein, an anode and a cathode configured to create an electric field across the channel. The one or more return flow channels can be defined by one of the ion exchange membranes and a porous membrane that extends parallel (or approximately parallel) thereto. The return flow channel is configured within the primary channel to allow a feed stream to enter the channel through an inlet, flow along the primary channel to the distal end of the channel and at least a portion of the feed stream (that is either enriched or depleted in ions) to flow into the return flow channel(s) and back towards the inlet end of the channel, allowing cross current flow across the porous membrane. The systems and methods described herein utilize a porous membrane installed between different streams as a physical flow separation structure, resulting in a flow barrier. The porous membrane allows fluid to flow partially by a pressure difference, but also allows ions to freely pass through. The partial fluid that flows through the porous membrane ("porous membrane flow" or "PM-flow") generates a flow barrier which acts as a suppressor (of chaotic electroconvection) for the dilute stream and a preventer (of highly enriched salt propagation) for the concentrate stream. In addition, the systems and methods described herein feature an inlet for the feed stream and an outlet for a target stream (the dilute/purified stream or the concentrate stream) next to each other, but the inlet and the outlet are separated from each other by the porous membrane which runs the length of the channel, except at the end of channel providing for return-flow, for maximizing pressure difference. This configuration allows a maximized flow through the porous membrane which results in a flow barrier, and the return-flow which has the effect of sweeping a mass on the IEM surfaces by shear stress. The newly designed channel pathway can also result in an increase in the traveling length of the stream. As described in more detail below, in some configurations, the fluid effectively passes the channel twice (by return flow), effectively increasing the length of the channel (feedwater dwell time). In other configurations, one of the streams (the diluate stream or the concentrate streams) effectively passes the channel twice, increasing the feed water dwell time, but the other stream (the concentrate stream or the diluate stream, respectively) flows out (to its outlet) without any dwell time increase. The present invention entailing the use of the return-flow system can be applied for water desalination and/or concentration for a wide range of target brine and other target streams.

In certain aspects, the invention is directed to a method of purifying and/or concentrating a first water stream containing ionic impurities comprising the steps of:

a. directing the water stream into an inlet of a channel, wherein the channel is defined, at least in part, by a first ion exchange membrane and a second ion exchange membrane, wherein the ion exchange membranes are juxtaposed and characterized by the same charge;

wherein the channel is further characterized as having an inlet end and a return flow end, wherein the inlet end is the end of the channel at which the inlet is located, and the return flow end is the end of the channel opposite to or downstream, with respect to the inlet, from the inlet end;

the channel further comprising at least two outlets, e.g., a first outlet and a second outlet, wherein the inlet and at least the first outlet are located on the inlet end of the channel and are separated by a first porous membrane that traverses the length of the channel between the ion exchange membranes and terminates at a return flow zone, wherein the return flow zone is a section of the channel at the return flow end, and wherein the return flow end is at least partially closed;

b. applying an electric field across the channel causing formation of an ion depletion zone comprising a purified water stream and formation of an ion enrichment zone comprising a concentrated ion aqueous stream;

wherein at least part of the feed stream enters the return flow zone and forms at least one return flow stream that flows to the opposing side of the first porous membrane (as compared to that of the feed stream), the first return flow stream flows in the direction of (or toward) the first outlet (e.g., cross-current to the flow of the water stream entering the inlet), and at least part of the feed stream adjacent to the first porous membrane flows through the first porous membrane joining the return flow stream;

wherein a purified water stream is the stream directed to the first or the second outlet, and the concentrated ion aqueous stream is the stream directed to the other of the first and the second outlet; and c. collecting the purified water stream and/or the concentrated ion aqueous stream from the first and/or second outlet.

In certain aspects, the method is for purification of a water stream, for example, desalination, and the purified or dilute stream is directed to the first outlet and the concentrate stream is directed to the second outlet. In yet additional aspects, the method is for concentration of a water stream and the concentrate is directed to the first outlet and the dilute stream is directed to the second outlet.

In yet additional aspects, the ion exchange membranes are CEMs, the first outlet is located on the cathodic side of the first porous membrane, the inlet is located on the anodic side of the first porous membrane, the purified water stream is directed to the first outlet, and the second outlet is located at the return flow end on the anodic side of the first porous membrane. The return flow end, which is partially closed, can be closed on the cathodic side. In certain aspects, the return flow end is closed except at the second outlet.

In yet further aspects, the ion exchange membranes are CEMs, the second outlet is located on the inlet end of the channel, the inlet is located between the first outlet and the second outlet, the inlet and the second outlet are separated by a second porous membrane that traverses the length of the channel between the ion exchange membranes and terminates at the return flow zone, and wherein the return flow end is fully closed, and the first outlet is located on the cathodic side of the porous membrane, and the second outlet is located on the anodic side of the porous membrane, wherein the purified water stream is directed to the first outlet, and concentrated ion aqueous stream is directed to the second outlet;

wherein at least part of the feed stream (comprising the concentrate) enters the return flow zone and forms a second return flow stream that flows to the opposing side of the second porous membrane and flows in the direction of the second outlet, and at least part of the feed stream adjacent to the second porous membrane flows through the second porous membrane joining the second return flow stream.

The invention also encompasses a system or device for purifying and/or concentrating a first water stream containing ionic impurities, wherein the system or device comprises the channel described herein. In certain aspects, the system or device comprises a plurality of the channels, or a stack of channels, as described herein.

The invention also includes a method of purifying and/or concentrating a first water stream containing ionic impurities by electrodialysis comprising the steps of:

a. directing the first water stream into an inlet of a first channel and into an inlet of a second channel of an electrodialysis unit forming a first feed stream and a second feed stream, respectively;

wherein the electrodialysis unit comprises at least three stacked ion exchange membranes (IEMs), wherein the first and the third IEMs have the same charge polarity, and the second IEM has the opposite charge polarity, and further wherein the second IEM is arranged between the first and the second IEMs;

wherein the first channel is defined, at least in part, by the first and the second IEMs, wherein the second channel is defined, at least in part, by the second and third IEMs, and wherein the first channel is on the anodic side of the unit and the second channel is on the cathodic side of the unit;

wherein the first channel and the second channel are each further characterized as having an inlet end and a return flow end, wherein the inlet end is the end of the channel at which the first inlet and the second inlets, respectively, are located, and the return flow end is the end of the channel downstream from the inlet end;

the first channel and the second channel each further comprise two outlets on the inlet end of the channels, wherein the first inlet is located between the two outlets of the first channel, and the second inlet is located between the outlets of the second channel;

wherein the first inlet is separated from the two outlets of the first channel by two porous membranes, respectively, that traverse the length of the first channel between the first and second IEMs, and terminate at the return flow zone of the first channel, wherein the return flow zone is a section of the channel at the return flow end, and wherein the return flow end is fully closed;

wherein the second inlet is separated from the two outlets of the second channel by two porous membranes, respectively, that traverse the length of the second channel between the second and third IEMs, and terminate at the return flow zone of the second channel, wherein the return flow zone is a section of the channel at the return flow end, and wherein the return flow end is fully closed;

b. applying an electric field across the first and the second channels, wherein the electric field causes formation of two purified water streams in the first or the second channel and formation of two concentrated water streams in the other of the first and the second channels;

at least part of the first feed stream enters the return flow zone of the first channel and forms two return flow streams that flow to the opposing sides of the porous membranes (as compared to that of the first feed stream) and the return flow streams flow in the direction of the outlets, and at least part of the first feed stream adjacent to the porous membranes flows through the membranes joining the return flow streams, at least part of the second feed stream enters the return flow zone of the second channel and forms two return flow streams that flow to the opposing sides of the porous membranes (as compared to that of the second feed stream) and the return flow streams flow in the direction of the outlets, and at least part of the second feed stream adjacent to the porous membranes flows through the membranes joining the return flow streams, and wherein the purified water stream is the stream directed to the outlets of the first or the second channel, and the concentrated ion aqueous stream is the stream directed to the outlets of the other of the first and the second channel; and c. collecting the purified water stream and/or the concentrated ion aqueous stream from the outlets of the first and/or second channels.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A and 1B are schematics showing standard bipolar ED vs unipolar ICP desalination. FIG. 1A shows standard bipolar ED and FIG. 1B shows unipolar ICP platforms have desalted flows with low ion concentration at the anodic side of CEMs and at the cathodic side of AEMs (white regions); and vice versa for brine flows (dark gray regions). An ICP platform can also be built with AEMs but the location of desalted/brine flows would be reversed. FIG. 1C is a schematic showing depletion on CEM or AEM. In FIG. 1C, the arrows indicate the ion flux through the membranes. The black dotted boxes are the one membrane pair (N=1) for ED and ICP systems, which are repeated; both are functionally matched (membrane number, flow rate, water recovery, etc.).

FIG. 2A is a schematic showing trifurcated ICP desalination. To obtain a thin depletion stream and a small amount of dilute flow with high purity, one can trifurcate the main channel into three different output flows in accordance with the concentration distribution between membranes. The intermediate stream (the middle stream) can be fed to a next stage by a batch process or recirculation. FIG. 2B is a fluorescent image of trifurcated ICP desalination using 0.5M sodium chloride solution (4V).

FIG. 25A shows the visualized magnitude of flow velocity and PM-flow velocity toward the diluate channel along the porous membrane. FIG. 25B shows the visualized cation concentration and the distribution of local current density, CU and EPIR along CEM. The values are nondimensionalized by dividing by the local value in the beginning for RF-ICP at 2 mm/s of $U_F$.

FIG. 28A: Schematic illustration of the process. FIG. 2B: Cost and recovery rate changes as a function of SRRatio for RF-ICP desalination with a fixed waste treatment cost, $5/m³. FIG. 2C: Water cost change as a function of waste treatment cost. (Numbers on the line indicate waste treatment costs, $/m³).

FIG. 29 is a schematic comparing the ICP with a bifurcated channel with normal flow (Bi-N; left side) and the CF-ICP system (referred to as a bifurcated channel with counter flow, Bi-C; right side) each having 30 cm of effective membrane length. In the Bi-N system shown in the figure, the feed stream is bifurcated into a diluate stream and a concentrate on the cathodic and anodic sides of porous membrane, respectively. This architecture is characterized by large back diffusion and osmosis between cation exchange membranes (CEMs). In the CF-ICP system (Bi-C) the feed stream forms two streams, the concentrate stream which is directed to the outlet and the diluate stream which passes the length of the channel and then flows in a direction counter to that of the feed stream.

FIG. 30 shows the concentration profiles of the Bi-C and Bi-N systems at feed flow velocities of 0.5 mm/s and 1.5 mm/s. The graph on the right side shows the salinity variation at the concentrate and diluate outlets with a feed salinity ($C_0$) of 70 g/l.

FIG. 31 shows the current utilization (CU) of the Bi-C and Bi-N systems at feed flow velocities of 0.5 mm/s and 1.5 mm/s. The graph on the right side shows the change in CU of Bi-C and Bi-N versus current flux for 70 g/l feed salinity.

FIG. 32 shows the concentration difference of the Bi-C and Bi-N systems at feed flow velocities of 0.5 mm/s and 1.5 mm/s. The graph on the right side shows the concentration (g/L) versus the current flux for 70 g/l feed salinity.

DETAILED DESCRIPTION

Figure 1A:
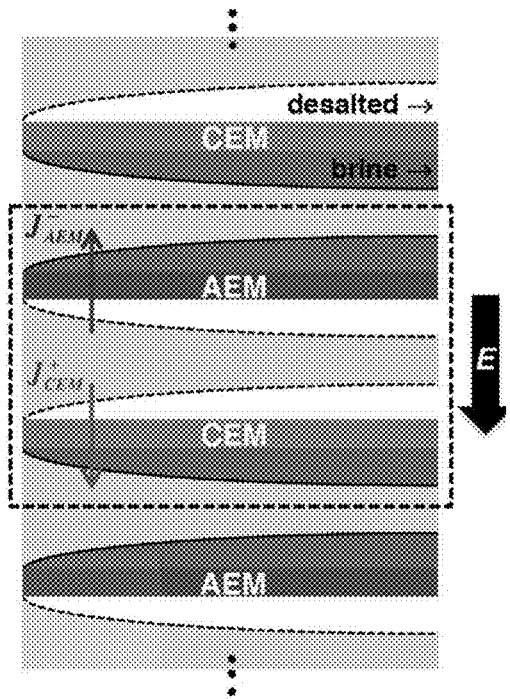
FIGS. 1A, 1B, and 1C are schematics.

A description of preferred embodiments of the invention follows.

As used herein, the words "a" and "an" are meant to include one or more unless otherwise specified.

Conventional electrodialysis (ED) generally operates at 80% of a limiting current regime for energy efficiency. To reduce capital cost caused by expensive membrane cost in an electrodialysis plant, an application of current should be increased and this current indispensable to enter an over limiting current regime. However, the over limiting current results in many side effects such as chaotic electroconvection in a dilute channel, and a back diffusion from concentrate to the dilute channel, or water splitting. The above phenomena have a negative impact on both desalination for purification of water and concentration for salt production.

Conventional electrodialysis (ED) for desalination facilitates a salt removal using a bipolar ion conduction employing alternating two ion exchange membranes, anion exchange membrane (AEM) and cation exchange membrane (CEM) (FIG. 1A). [1] The ion depletion layers, which develop next to AEM and CEM, are formed by different ion transports in the solution and the ion exchange membrane. [2] It is important to note that the development of the ion depletion layer, a desired outcome for desalination, also largely determines the energy consumption, because of the increased electrical resistance of ion-depleted boundary layer. [3] Since the thickness of ion depletion layer is largely determined by the current (or salt removal ratio), this poses a fundamental trade-off for any electromembrane desalination processes; the higher the salt removal ratio of the process becomes (i.e. thicker ion depletion layer), the more resistant the cell becomes, resulting in poor energy efficiency.

It is, however, still important to increase energy efficiency by reducing the ion depletion layer for both ED and ICP desalination. In ED, the ion depletion layer has been mechanically controlled by mesh spacers as a turbulence promoter or corrugated membrane for influencing the flow profile. [2,4,5] In other words, the studies have focused on eliminating ion depletion layer by mixing the entire channel as much as possible. Yet, the entire diluate stream inevitably become of high electrical resistance (no matter how well it becomes mixed) when ED is operated with high salt removal ratio, resulting in high power consumption. Previously, a new desalination technique was proposed, so called ion concentration polarization (ICP) desalination, using unipolar ion conduction by employing only CEM to enhance an energy efficiency using the higher diffusivity of chloride ion (FIG. 1B). [6] The bifurcate ICP (Bi-ICP) desalination model facilitates collection of depleted and enriched streams via two separated channel ends. In ICP desalination, both ion depletion and enrichment appear in the same channel, resulting in a few unique advantages (such as co-removal of total suspended solids (TSS)) [6], however, the mixture of the ion depleted and concentrated streams should be prevented. Therefore, this represents a fundamental trade-off for any electromembrane desalination process, limiting performance and cost-effectiveness, especially when compared with reverse osmosis (RO).

A trifurcate ICP (Tri-ICP) desalination architecture was developed to facilitate collection of thin depleted and concentrated streams which develop adjacent to CEM (FIGS. 2A and 2B). [7] In this architecture, a thin ion depletion region is extracted to achieve both good energy efficiency (only a thin depletion region is generated) and good salt removal ratio (incremental depleted/desalted stream is extracted). Using this architecture, we have demonstrated cost-effective partial desalination of brine (from 70 g/L to 35 g/L) in a lab scale experimental system. [8] However, Tri-ICP essentially relies on lower current electromembrane operation, and therefore requires recirculation of main fluid intake. Another idea to address this tradeoff is incorporation of microporous ion-selective membranes, allowing the diluate stream 'penetrate' into the membranes through large pores (~100 µm), effectively eliminating the ion-depleted boundary layer and leading to higher energy efficiency. However, this requires a rather complex system and fluid handling architecture. [9]

The present application encompasses a newly designed channel for electrical water desalination/concentration technology. The systems and methods described herein include:
(1) A return flow system which results in a suppressive flow barrier for stable ICP desalination.
(2) A return flow system which results in a preventive flow barrier for stable ICP concentration.
(3) A return flow system resulting in united flow barriers for stable ICP desalination/concentration.
(4) A double return flow system for conventional electrodialysis.

ICP desalination, bifurcate, and trifurcate ICP desalination system have been described, for example, in U.S. Pat. App. Pub. No. 2014/0374274 A1, U.S. Pat. No. 9,845,252, U.S. Pat. App. Pub. No. 20170066665, U.S. Pat. No. 9,850,146, U.S. Pat. App. Pub. No. 2016/0115045 A1, Kim et al. (2016), Scientific Reports 6:31850; and Kwak et al. (2016), Sci Rep. 6: 25349, the contents of each of which are expressly incorporated by reference herein.

Figure 1B:
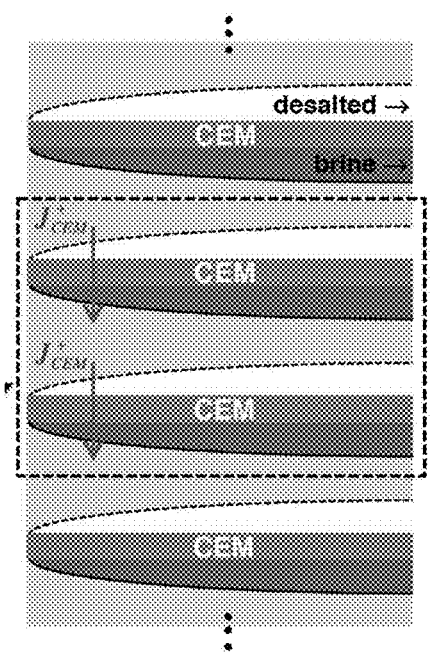
Figure 1C:
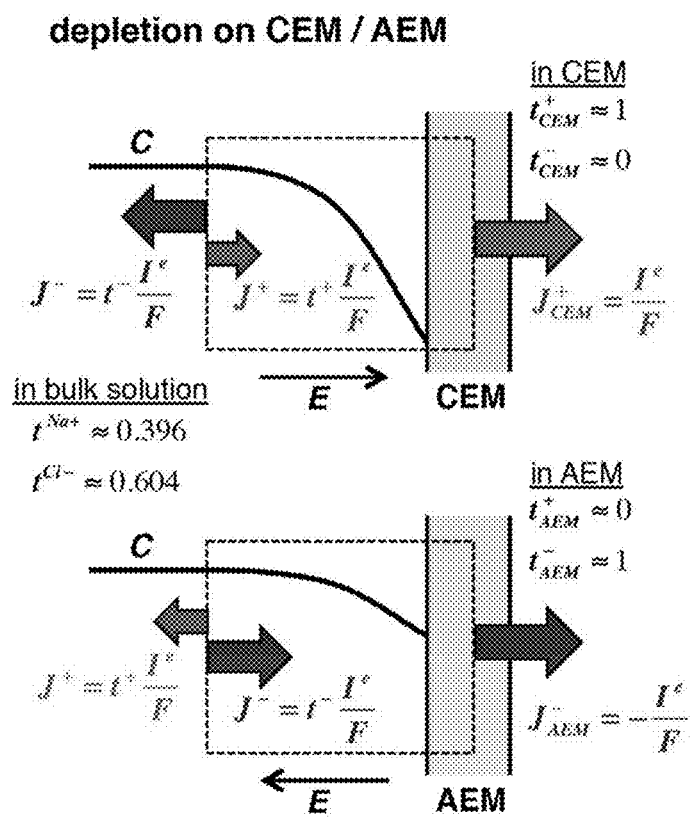

As shown in FIG. 1B, ICP desalination results in both dilute and concentrate streams that are separately acquired between two identical ion exchange membranes (IEMs) (FIG. 1B) whereas a conventional electrodialysis (ED) needs alternating differently charged IEMs, e.g., alternating an anion exchange membrane (AEM) and a cation exchange membrane (CEM) (FIG. 1A). A trifurcate ICP desalination system and method is shown in FIGS. 2A and 2B which enables the collection of thin ion depleted and ion enriched layers which develop next to the IEM surface, by dividing outlets of the target stream within one channel unit (FIGS. 2A and 2B). In ICP desalination/purification, colloidal pollutant particles and charged bio-agents can simultaneously be removed from brackish and/or contaminated water by nonlinear ion concentration polarization (ICP) phenomenon between two identical ion exchange membranes (IEMs). The consequence of the configuration is that only positive (or negative) ions, but not both, participate in the conduction. Ion exchange membranes (IEMs) act as an ion filter by allowing only cations or anions to pass through. This selective ion transport initiates a unique phenomenon called ion concentration polarization (ICP) near the membranes, which is characterized by significant, dynamic perturbation in ion concentrations (also known as ion depletion and ion enrichment) [1, 2]. In 2010, S. J. Kim et al. demonstrated a microfluidic desalination device by using ICP. Two disadvantages of this technology include chemical reactions and pH changes near electrodes and difficulties in scale-up [3].

As discussed above, ICP desalination/concentration utilizes ICP between two identical IEMs. Between two juxtaposed similar ion exchange membranes (AEMs or CEMs), an ion depletion zone ($d_{de}$) and ion enrichment zone ($d_{en}$) are generated under an electric field. As cations are selectively transferred through the CEMs, for example, anions are relocated in order to achieve electro-neutrality, resulting in the concentration drop (increase) in the ion depletion (enrichment) zone. The concentration drop (or salt removal) is low and spatially gradual at relatively low voltage or current (e.g., Ohmic regime). However, at higher voltage or current (e.g., overlimiting regime), strong electroconvective vortex or vortices accelerate cation transport through CEMs, allowing "relocation" of most salt ions. The flat depletion zone occurs with significantly low ion concentration, and corresponding strong electric field in the zone, and any charged agents (e.g., proteins and bacteria) cannot penetrate this flat zone. This ICP desalination/purification also occurs with two anion exchange membranes (AEMs) by relocating cations, but the location of desalted/brine flows are reversed.

As described above, the over-limiting current is accompanied by two phenomena, chaotic electroconvection in the dilute stream and propagation of enriched salt from the concentrate stream, with an increase in energy consumption. The electroconvection in the dilute stream generates a chaotic flow motion which increases energy dissipation and causes an undesirable flow mixing. Highly enriched salt in the concentrate stream propagates to the dilute stream causing decline of salt removal efficiency. In previous configurations, the dilute and concentrate streams were on the same channel component, and they can affect each other without any restrictions. The present invention can improve energy efficiency for desalination and/or salt production by minimizing chaotic electroconvection at the dilute stream and/or blocking enriched salt propagation from the concentrate stream. Specifically, the present invention is directed to an ICP desalination/concentration system and method comprising a return flow system.

The methods described herein produce at least two streams: a stream which has reduced ionic species and a stream which concentrated ionic species. The stream which has reduced ionic species can be referred to as the "dilute stream," the "purified water stream," the "diluate stream," or the "diluate," interchangeably herein unless otherwise indicated. The stream which has concentrated ionic species can be referred to as the "concentrate stream," the "concentrated ion aqueous stream," or the "concentrate" interchangeably herein unless otherwise indicated.

Figure 3:
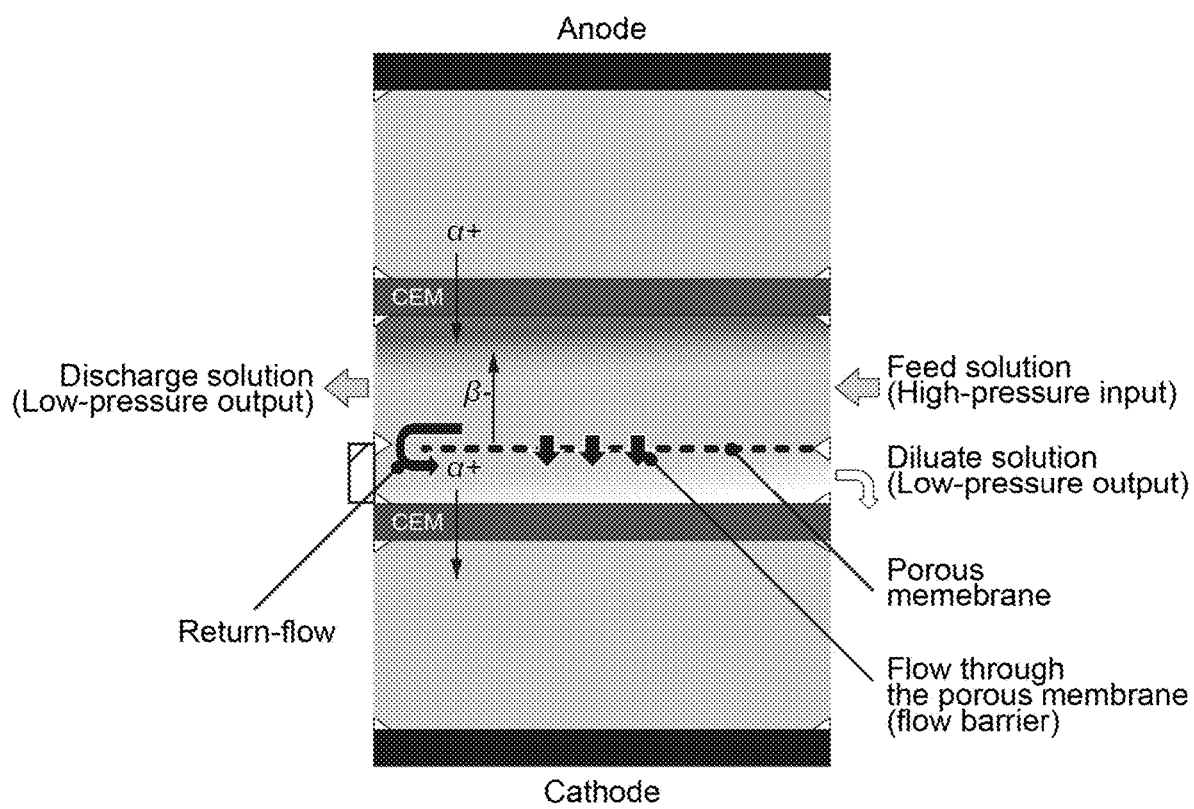
FIG. 3 is a schematic illustration of a desalination application comprising return-flow using the "counter flow" ICP (CF-ICP) system which results in a suppressive flow barrier for suppressing a chaotic electroconvection in the dilute stream. "α+" and "β−" indicate cation and anion movement, respectively, by electric field.
Figure 4:
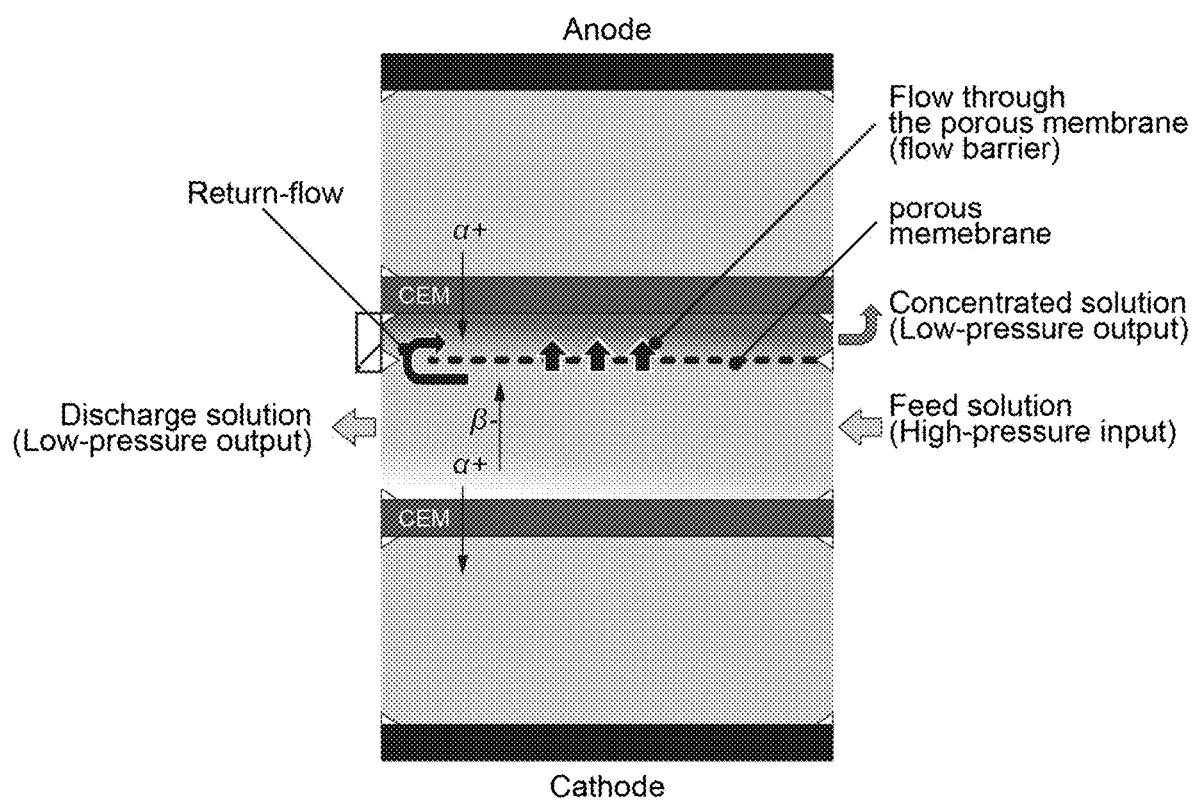
FIG. 4 is a schematic illustration of a concentration application using the CF-ICP system which results in a preventive flow barrier for preventing a propagation of highly enriched mass in the concentrate stream.
Figure 5:
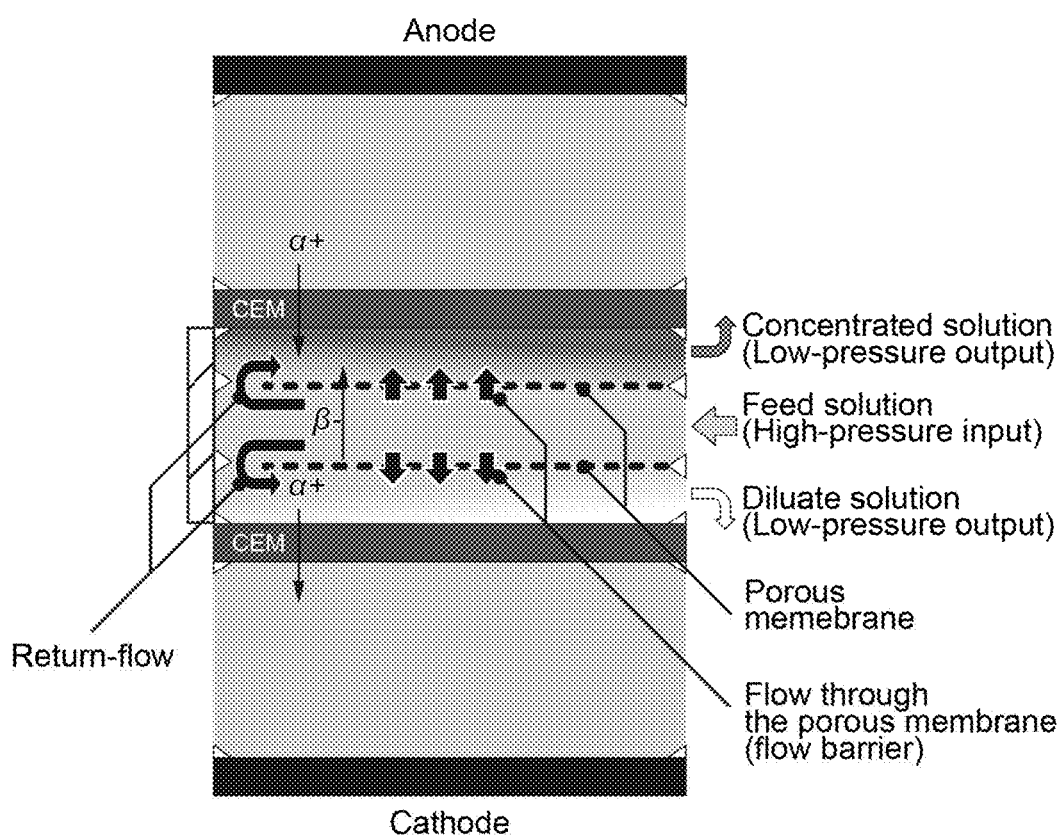
FIG. 5 is a schematic illustration of a desalination/concentration application using the return flow ICP (RF-ICP) system resulting in united (suppressing chaotic electroconvection in the dilute stream and preventing propagation of highly enriched mass in the concentrate stream) flow barriers.

FIGS. 3 to 5 describe specific embodiments of the return flow system for ICP. Specifically, FIGS. 3, 4 and 5 are schematics showing a return flow system which results in a suppressive flow barrier, a return flow system which results in a preventive flow barrier, and a return flow system for united barriers, respectively.

FIG. 3 represents a desalination application (CF-ICP) using a return flow system that results in a suppressive flow barrier. The inlet of the feed stream and the outlet of the dilute stream are installed in the same direction or on the same end of the channel (here, right side), but are separated by a porous membrane except the end of the channel for a return flow. The inlet of the feed stream is installed at the anodic side and the outlet of dilute stream is installed on the opposite side of the channel. The other stream, the discharge stream (the concentrate stream), is discharged through the outlet on the left side (the end of the channel opposite to the inlet end). The feed stream adjacent to the porous membrane partially flows through the membrane to suppress an electroconvection in the dilute stream. Then the feed stream at the end of porous membrane splits and returns to the right side of the channel to wash out the desalted mass near IEM.

Figure 8A:
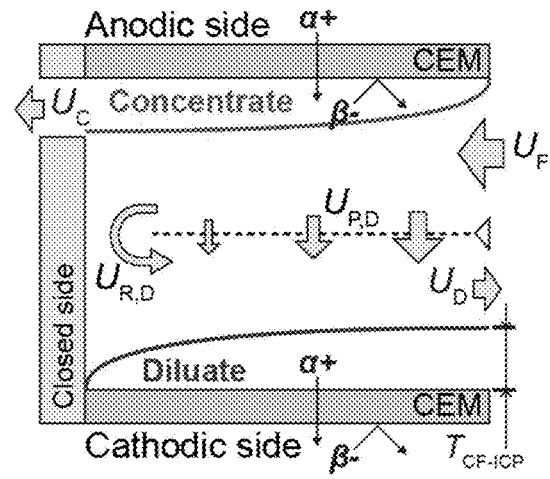
FIG. 8A is a schematic illustration of ion transport and flow path in counter-flow ICP (CF-ICP) desalination. The solid lines (top and bottom, respectively) indicate depletion and concentration boundary layer, respectively. Concentration
Figure 8B:
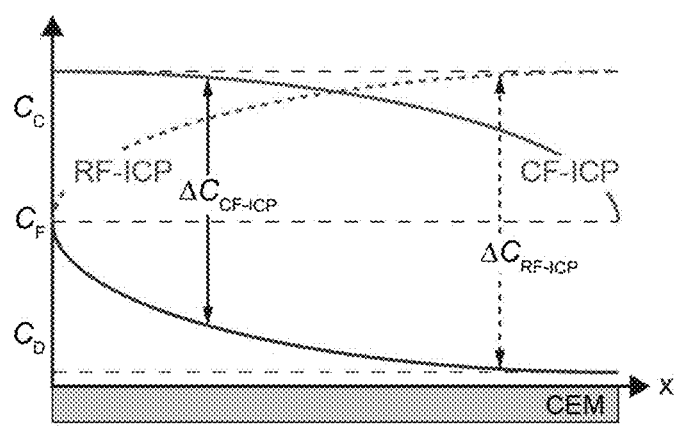
FIG. 8B shows concentration profiles for RF-ICP and CF-ICP along CEM. The top and bottom lines indicate concentration profiles of the concentration and depletion layer, respectively.

The configuration shown in FIG. 3 is also referred to herein as "counter-flow" ICP (CF-ICP) for desalination application. In ED and ICP, a high salt removal ratio requires a large concentration polarization at the membrane interface. The large concentration polarization results in a larger trans-membrane concentration difference, leading to stronger diffusion and osmosis. This results in an increase in the total current application to compensate for the reverse transfer of salt. To solve these problems, CF-ICP has two features to address the key challenge of enabling energy-efficient, high current desalination. First, the diluate stream effectively passes the channel twice, increasing in feedwater dwell time, but the concentrate stream flows out without any dwell time increase. Second, one can reduce the concentrate difference along CEM (FIGS. 8A and 8B, right side). The minimized trans-membrane concentration difference results in reduced diffusion and osmosis.

In the CF-ICP system shown in FIG. 8A, the ion exchange membranes are CEMs, the first outlet is located on the cathodic side of the first porous membrane, the inlet is located on the anodic side of the first porous membrane, and the purified water stream is directed to the first outlet. In this CF-ICP system, the second outlet (to which the concentrate stream is directed) is located at the return flow end. As discussed above, the diluate stream passes through the channel twice whereas the concentrate stream flows out of the second outlet (at the return flow end) and effectively only passes through the channel once. The return flow end is closed on the cathodic side (but open at the anodic side). In this way, the concentrate stream is directed to the first outlet and the purified water stream is directed to the first outlet.

FIG. 4 represents a concentration application using the CF-ICP system that results in a preventive flow barrier. The channel configuration for the concentration application is identical with the channel configuration for the desalination application of FIG. 3, except with respect to the inlet and outlet positions. The inlet of feed stream is installed at the cathodic side of the channel while the outlet of concentrate stream is installed opposite direction. The feed stream flowing adjacent to the porous membrane flows through the membrane to prevent or suppress propagation of concentrated mass from the concentrate stream.

FIG. 5 represents a desalination and concentration application using the return flow system resulting in united flow barriers (RF-ICP). The inlet of feed stream is located between the outlets for the dilute and concentrate streams and the left side of the channel is entirely blocked. The outlet of concentrate stream is placed on the anodic side of the channel and that of dilute stream is placed in the opposite direction. Each outlet is separated from the inlet by a porous membrane except the end of channel for the return flow. Thus, this configuration includes two porous membranes. The feed stream adjacent to the porous membranes flows through the membranes in two directions, a suppressive flow barrier for the dilute stream and a preventive flow barrier for the concentrate stream. The feed stream splits into two directions at the end of the porous membranes, to wash out the enriched mass and desalted mass on the IEM surface, respectively.

Figure 7A:
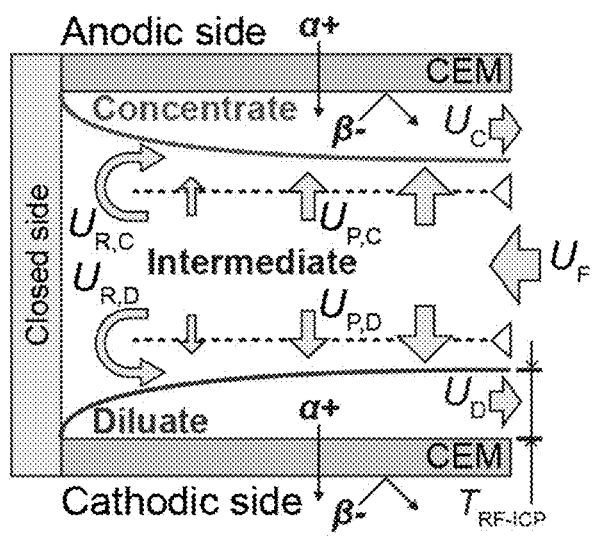
FIG. 7A is a schematic illustration of ion transport and flow path in Return flow return-flow ICP (RF-ICP) desalination. The solid lines (top and bottom, respectively) indicate the depletion and concentration boundary layer, respectively.
Figure 7B:
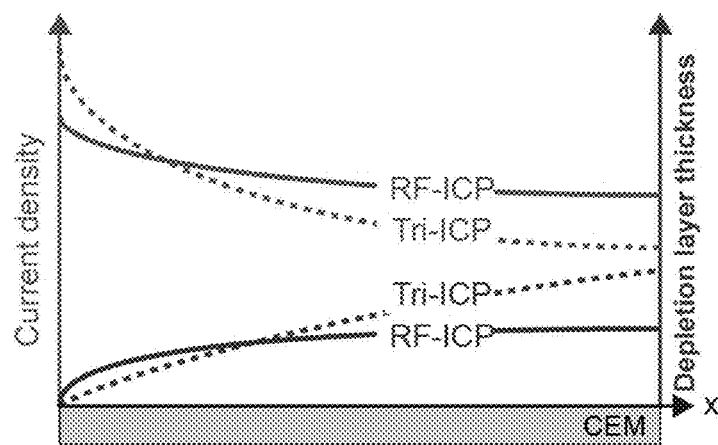
FIG. 7B shows the distribution of current density and thickness of the depletion layer along the membrane expressed as an arbitrary value.

The configuration shown in FIG. 5 is also referred herein as return flow ICP (RF-ICP). It is known that increased flow rate in the ED (at a given operating current) results in reduction in ion depletion region, therefore increased energy efficiency. Yet, this means that same amount of salt removed (same current) for larger volume of water processed, resulting in reduced salt removal ratio for product water. As discussed above, incorporating a return flow system re-routes the feedwater inside the ED or ICP channels. The 'return-flow' architecture (RF-ICP), is shown in FIGS. 7A and 7B. This system has three unique features to address the key challenge of enabling energy-efficient, high current desalination. First, the fluid effectively passes the channel twice (by return flow), effectively increasing the length of the channel (feedwater dwell time). Second, one can significantly increase the output desalted flow speed compared with incoming flow speed, resulting in sequestration of ion depletion region even at high salt removal ratios. With the change in fluid behavior, the current and deletion layer are re-distributed along the membrane (FIGS. 7A and 7B (right side). The current is more uniformly distributed along the membrane and the depletion layer was developed with a flat thickness, resulting in an overall resistance reduction.

In the RF-ICP system shown in FIGS. 7A and 7B, the ion exchange membranes are CEMs, the second outlet is located on the inlet end of the channel, the inlet is located between the first outlet and the second outlet, and the inlet and the second outlet are separated by a second porous membrane that traverses the length of the channel between the ion exchange membranes and terminates at the return flow zone, and the return flow end is fully closed.

The flow rate of the outlet can be controlled independently. For collection of highly enriched mass from the concentrate stream, the outlet flow rate of concentrate stream can decrease. In the same manner, the outlet flow rate of dilute stream can increase for collection of a large volume of desalted mass. The pore size of porous membrane can be varied for control of suppressive and preventive flow through the membrane.

As described above, the invention includes systems, devices, and methods for purifying and/or concentrating a first water stream containing ionic impurities comprising the steps of:

a. directing the water stream into an inlet of a channel forming a feed stream, wherein the channel is defined, at least in part, by a first ion exchange membrane and a second ion exchange membrane, wherein the ion exchange membranes are juxtaposed and characterized by the same charge;
      wherein the channel is further characterized as having an inlet end and a return flow end, wherein the inlet end is the end of the channel at which the inlet is located, and the return flow end is the end of the channel downstream, with respect to the inlet, the inlet end;

the channel further comprising a first outlet and a second outlet, wherein the inlet and at least the first outlet are located on the inlet end of the channel and are separated by a first porous membrane that traverses the length of the channel between the ion exchange membranes and terminates at the return flow zone, wherein the return flow zone is a section of the channel at the return flow end, and wherein the return flow end is at least partially closed;

b. applying an electric field across the channel causing formation of an ion depletion zone comprising a purified water stream and formation of an ion enrichment zone comprising a concentrated ion aqueous stream;

wherein at least part of the feed stream enters the return flow zone and forms a first return flow stream that flows to the opposing side of the first porous membrane, the first return flow stream flows in the direction of the first outlet, and at least part of the feed stream adjacent to the first porous membrane flows through the first porous membrane joining the return flow stream;

wherein the purified water stream is the stream directed to the first or the second outlet, and the concentrated ion aqueous stream is the stream directed to the other of the first and the second outlet; and c. collecting the purified water stream and/or the concentrated ion aqueous stream from the first and/or second outlet.

The ion exchange membranes can be cation exchange membranes (CEMs) or anion exchange membranes (AEMs). The electric field can be created by an electrode and a ground each located external and parallel to the channel. The two ion exchange membranes can be the same or different. Strong anion or cation exchange membranes, as those products are generally sold in the art, are preferred. FUMASEP® FTAM-E and FTCM-E (FuMA-Tech CmbH, Germany) are suitable membranes. A suitable membrane is also a NAFION® membrane, for example, a NAFION® perfluorinated membrane available, for example, from Sigma Aldrich, USA. However, others can also be used. In particular, the term "ion exchange membrane" is intended to include not only porous, microporous, and/or nanoporous films and membranes, but also resins or materials through which ions can pass. Thus, in one embodiment, an ion exchange resin can be entrapped by one or more meshes (or porous membranes) in lieu of or in addition to one or more of the ion exchange membranes. In certain aspects, the ion exchange membranes comprise micrometer sized pores (or micro pores). In yet additional aspects, the ion exchange membranes comprise nanometer sized pores (or nano pores). In yet further aspects, the ion exchange membranes comprise micro pores and nano pores. An exemplary ion exchange membrane comprising micro pores and nano pores has been described, for example, in Kwon et al., (2015), A Water Permeable Ion Exchange Membrane for Desalination, 19$^{th}$ International Conference on Miniaturized Systems for Chemistry and Life Sciences October 25-29, Gyeongju, Korea available at http://www.rsc.org/images/LOC/2015/PDFs/Papers/1202_T.302e.pdf, the contents of which are expressly incorporated by reference herein. The ion exchange membranes can be placed into a support, such as glass, polydimethylsiloxane or other inert material. Thus, the support can also contribute to the formation of the channels.

FIGS. 3 to 5 show channels formed by cation exchange membranes (CEMs). Anion exchange membranes (AEMs) can also be used in the desalination/concentration methods described herein but the outlets for the purified water stream and concentrated ion aqueous streams are reversed.

In certain aspects, the ion exchange membranes are CEMs, and the first outlet is located on the cathodic side of the first porous membrane, the inlet is located on the anodic side of the first porous membrane, and the purified water stream is the stream directed to the first outlet; optionally, the second outlet is located at the return flow end. The terms "anodic side" and "cathodic side" are used in reference to the side of the channel proximal to the anode and the cathode, respectively. The second outlet can be located at the return flow end, for example, the second outlet is located on the part of the return flow end that is not closed and that is on the same side (anodic or cathodic) as the inlet (see, for example, FIGS. 3 and 8A).

In additional aspects, the ion exchange membranes are CEMs and the first outlet is located on the anodic side of the porous membrane, the inlet is located on the cathodic side of the porous membrane, and the concentrated water stream is directed to the first outlet. The second outlet can be located at the return flow end, for example, the second outlet is located on the part of the return flow end that is not closed and that is on the same side (anodic or cathodic) as the inlet.

As described above, at least part of the feed stream enters the return flow zone and forms a return flow stream that flows to the other (opposing) side of the porous membrane (as compared to the side of the porous membrane that the feed stream flows). The part of feed stream that forms the return flow stream can, for example, be the feed stream that enters the closed portion of the return flow zone (wherein the closed portion of the return flow zone is that portion adjacent to the closed part of the return flow end). The return flow stream then flows in the direction of the first outlet (e.g., cross-current to the feed steam entering the inlet) and is directed to the first outlet. In FIGS. 3 and 8A, the return flow stream is the dilute stream and the closed portion of the return flow end is on the side of the channel that the diluate is formed.

In yet additional aspects, the second outlet is located on the inlet end, the return flow end is fully closed, the inlet is located between the first outlet and the second outlet, and the inlet and the second outlet are separated by a second porous membrane that traverses the length of the channel between the ion exchange membranes except at the return flow zone. Where the ion exchange membranes are CEMs, the first outlet is located on the cathodic side of the first porous membrane (the membrane separating the inlet and the first outlet), and the second outlet is located on the anodic side of the second porous membrane; and the purified water stream is the stream (e.g., the first return flow stream) directed to the first outlet, and the concentrated ion aqueous stream is the stream (e.g., the second return flow stream) directed to the second outlet. At least part of the feed stream enters the return flow zone (for example, the closed portion of the return flow zone) and forms a second return flow stream that flows to the other side of the second porous membrane as the feed stream (the opposing side) and flows in the direction of the second outlet. In addition, at least part of the feed stream adjacent to the second porous membrane flows through the second porous membrane joining the second return flow stream. The purified water stream and the concentrated ion aqueous streams are collected from the first and the second outlets, respectively. In FIGS. 5 and 7, there are two return flow streams: the dilute stream is directed to the first outlet and the concentrate is directed to the second outlet.

FIGS. 3 to 5 show channels formed by cation exchange membranes (CEMs). Anion exchange membranes (AEMs) can also be used in the desalination/concentration methods described herein but the outlets for the purified water stream and concentrated ion aqueous streams would be reversed. For CEMs, the ion concentration is depleted at the cathode side (ion-depleted region) and concentrated at the anode side (ion-enrichment region). For AEMs, the ion concentration is depleted at the anodic side (ion-depleted region) and concentrated at the cathodic side (ion-enrichment region). Thus, where CEMs are used as the ion exchange membranes forming the channel that provides a suppressive flow barrier (e.g., FIG. 3), the inlet is located on the anodic side and the outlet for the purified water stream is located on the cathodic side of the channel. If AEMs are used to provide a suppressive flow barrier (e.g., in a system analogous of FIG. 3) then the inlet is located on the cathodic side of the channel and the outlet for the purified water stream is located on the anodic side of the channel. Similarly, if AEMs are used to provide a preventive flow barrier (e.g., analogous to the system of FIG. 4), then the inlet is located on the anodic side of the channel and the outlet for the concentrated solution is located on the cathodic side of the channel. In another example, if AEMs are used for the united flow barrier system (e.g., analogous to the system of FIG. 5), then the outlet for the purified stream is located on anodic side and the outlet for the concentrate ion aqueous stream is located on the cathodic side of the channel.

The channels described herein include at least two outlets, for example, one outlet is for the purified water stream and the other outlet is for the concentrate ion aqueous stream. As explained herein, whether the purified water stream is the stream directed to the first outlet (the return flow stream) or the stream directed to the second outlet depends on where the outlet is located on the end of the channel relative to the inlet (e.g., on the anodic or cathodic side), and whether the ion exchange membranes are CEMs or AEMs. The concentrate ion aqueous stream is directed to the other outlet of the at least two outlets (in other words, to the outlet to which the purified water stream is not directed). As described herein, the "first outlet" is the outlet located next to the inlet and is thus on the same end of the channel as the inlet. In some aspects, the second outlet is located at the return flow end, which is the end of the channel opposite to the end that the inlet is located. In yet other aspects, the second outlet is located on the same end of the channel as the inlet and the first outlet. The inlet can, for example, be located between the first and second outlets.

At least one porous membrane is used to separate the inlet and the first outlet and the porous membrane traverses the length of the channel except at the return flow end, thus the porous membrane traverses the length of the channel and terminates at the return flow zone. In addition, where the second outlet is also located next to the inlet, a porous membrane is used to separate the inlet and the second outlet and the porous membrane traverses the length of the channel except at the return flow end. The porous membrane can, for example, be a non-ionic porous membrane. In addition, the porous membrane can be microporous and/or nanoporous. In certain aspects, the porous membranes comprise, for example, pores about 1 nm to about 2 um or about 100 nm to about 2 um, or about 1 um to about 2 um in size. In certain additional aspects, the pores are about 1 um diameter pores. The porous membrane(s) can be located parallel or substantially parallel to the ion exchange membranes. A non-ionic porous membrane is a porous membrane that is not an ion exchange membrane, or that is not charged and thus does not only allow cations or anions to pass through. The non-ionic porous membrane can allow fluid and ions (cations and anions) to pass through.

The feed stream directed into the channel via the inlet flows from the inlet in the direction of the return flow end. At least part of the feed stream adjacent to the porous membrane flows through the porous membrane to the opposing side of the membrane (flows to the other side of the membrane as that of the feed stream entering through the inlet). The return flow zone is the section of the channel at the return flow end that is not traversed by the porous membrane and/or where the porous membrane is not present. At least part of the feed stream that flows to the return flow zone forms a return flow stream that flows to the to the other side (or opposing) of the first porous membrane (flowing around the end of the porous membrane) and flows in the direction of the first outlet (cross current to the flow of the flow stream entering the inlet). Depending on the specific features of the channel (e.g., the location of the first outlet, the IEMs used), the purified water stream is the stream directed to the first or the second outlet, and the concentrated ion aqueous stream is the stream directed to the other of the first and the second outlet. The return flow stream is the purified water stream or the concentrated ion aqueous stream (depending on which stream is directed to the first outlet).

In general, the channel formed by the two juxtaposed ion exchange membranes does not contain a membrane carrying a charge counter to the two juxtaposed ion exchange membranes. The consequence of the configuration is that only positive (or negative) ions, but not both participate in conduction. In other words, the ions in the electrolyte solution or aqueous stream to be purified that participate in the conduction in the apparatus, or cell, carry a common charge, while the counterions or ions carrying the opposite charge, while present, do not participate in conduction. Thus, the invention preferably excludes the use of an apparatus that traditionally functions via electrodialysis.

The electric field can be generated by an electrode and a ground each located external and parallel to the channel. The electric field can be generated, for example, by an anode and a cathode. An electrode can form another channel (e.g., a second channel) with the first ion exchange membrane, for example, an anode can form a second channel with the first ion exchange membrane. The ground, or for example the cathode, can form yet another channel (e.g., a third channel) with the second ion exchange membrane. The second and third channels can be filled with an electrolyte solution. In certain aspects, the electrolyte solution is the first water stream.

In certain additional embodiments, the first water stream comprises a salt. In yet additional aspects, the first water stream comprises biomolecules. The first water stream can, for example, be water with a range of salinities, for example, brackish water, seawater, produced water, and brine. The terms "brackish water," "produced water," and "brine" are terms known to those of skill in the art. In certain aspects, brackish water can refer to water having a salinity less than about 10,000 ppm and/or having an NaCl concentration greater than about 0.5M NaCl. In certain aspects, produced water can have a salinity greater than about 30,000 ppm. In certain aspects, brine can refer to water with higher salinity than 35,000 mg/L TDS and/or water having an NaCl concentration greater than about 1M NaCl. In certain aspects, the first water stream can be wastewater, for example, brackish groundwater, household water rich in bacteria or other biological contaminants, or simply murky water from various suspended solids and/or industrial heavy metal contaminants. Biomolecules include cells (such as bacteria or animal), cellular fragments, particles (including viral particles), proteins, and nucleic acid molecules, for example.

As described herein, in some aspects, the fluid flow of the device using current-voltage responses categorized as Ohmic (1-2 V), limiting (2-2.5V) and overlimiting (>2.5 V) regimes. The electric field preferably creates a boundary layer comprising at least one electroconvective vortex proximal to at least one of the two juxtaposed ion exchange membranes. The electric field is created by an electrode and a ground, each located external and parallel to the channel. In general, the electrode forms a second channel with the first of said two juxtaposed ion exchange membranes and the ground forms a third channel with the second of the two juxtaposed ion exchange membranes. These channels are generally filled with an electrolyte solution, which can conveniently be the water stream to be purified or concentrated.

The invention additional encompasses a device comprising the channel and the return flow system as described herein.

Figure 6:
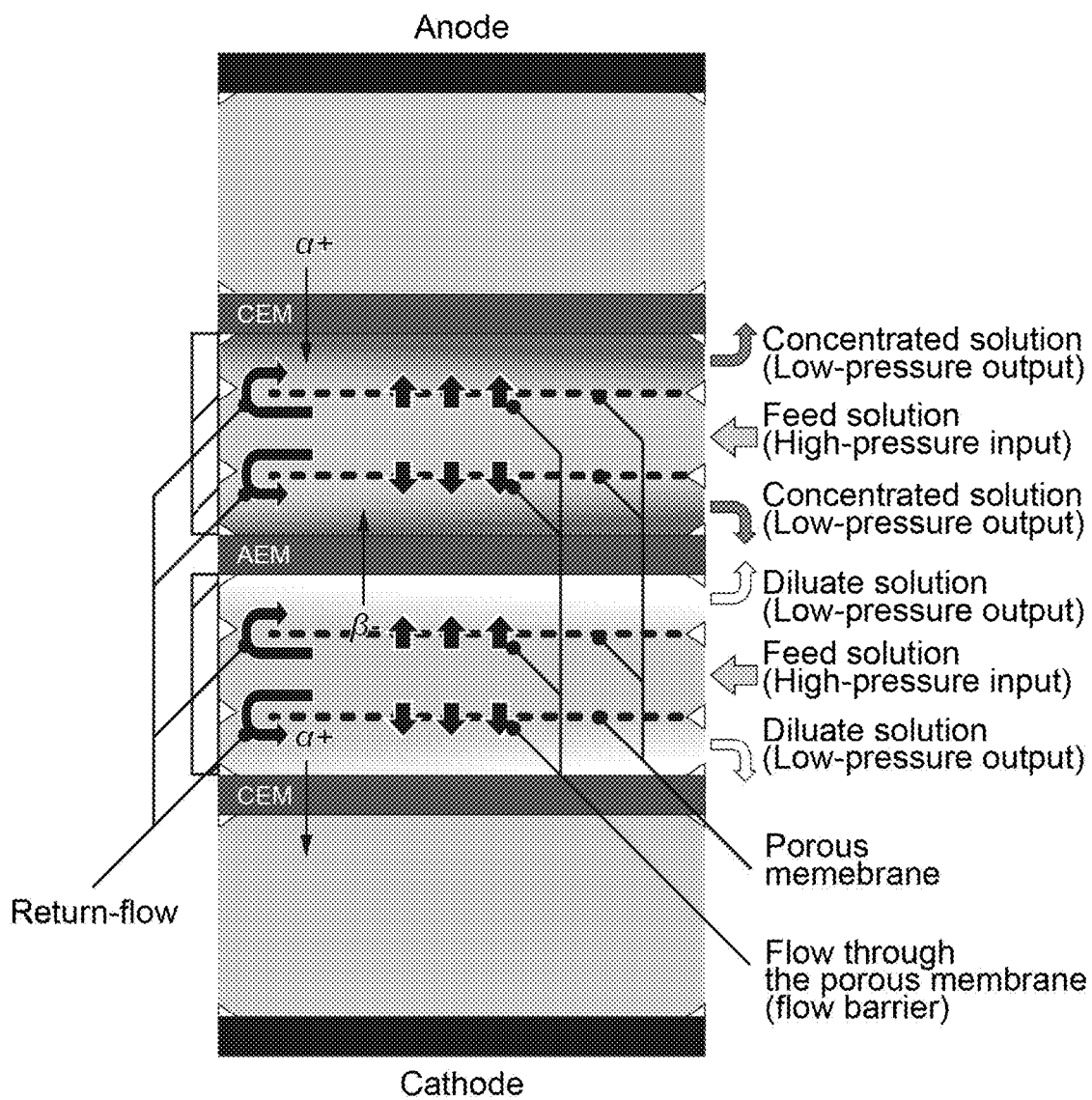
FIG. 6 is a schematic illustration showing double flow barriers with a return-flow system for a conventional electrodialysis.

The present invention also encompasses an electrodialysis system and method including a return-flow system. Electrodialysis is an electrically-driven membrane desalination technology that removes anion through anion exchange membrane (AEM) and cation through cation exchange membrane (CEM). Specifically, the systems and methods include a double flow barrier using a return-flow system for ED desalination/concentration. FIG. 6 is an example of such a system.

FIG. 6 is a schematic showing a return flow system facilitating double flow barrier for a conventional electrodialysis. The installation and operating mechanism are similar to the united flow barrier system for ICP desalination/concentration shown in FIG. 5, but the purpose of barrier is different. In conventional electrodialysis, the dilute and the concentrate channel are separated by IEM whereas they are placed in the same channel in the ICP desalination/concentration. For this reason, the united flow barriers which have two different barrier functions, a suppressor and a preventer, are operated as double flow barriers which have two barriers in the channel, but same feature, in the conventional electrodialysis. The return flow system and barriers result in the collection of a thin depleted and enriched mass layer next to IEM surface and can result in a reduction of energy consumption.

In certain aspects, the invention is directed to a system or method of purifying and/or concentrating a first water stream containing ionic impurities by electrodialysis comprising the steps of:
 a. directing the water stream into an inlet of a first channel and into an inlet of a second channel of an electrodialysis unit forming a first feed stream and a second feed stream, respectively;
  wherein the electrodialysis unit comprises at least three stacked ion exchange membranes (IEMs), wherein the first and the third IEMs have the same charge polarity, and the second IEM has the opposite charge polarity, and further wherein the second IEM is arranged between the first and the second IEMs;
  wherein the first channel is defined, at least in part, by the first and the second IEMs, wherein the second channel is defined, at least in part, by the second and third IEMs, and wherein the first channel is on the anodic side of the unit and the second channel is on the cathodic side of the unit;
  wherein the first channel and the second channel are each further characterized as having an inlet end and a return flow end, wherein the inlet end is the end of the channel at which the first inlet and the second inlets, respectively, are located, and the return flow end is the end of the channel downstream from the inlet end;
  the first channel and the second channel each further comprise two outlets on the inlet end of the channels, wherein the first inlet is located between the two outlets of the first channel and the second inlet is located between the outlets of the second channel;
  wherein the first inlet is separated from the two outlets of the first channel by two porous membranes, respectively, that traverse the length of the first channel between the first and second IEMs, and terminate at the return flow zone of the first channel, wherein the return flow zone is a section of the channel at the return flow end, and wherein each return flow end is fully closed;
  wherein second inlet is separated from the two outlets of the second channel by two porous membranes, respectively, that traverse the length of the second channel between the second and third IEMs; and terminate at the return flow zone of the second channel, wherein the return flow zone is a section of the channel at the return flow end, and wherein each return flow end is fully closed;
 b. applying an electric field across the first and the second channels, wherein the electric field causes formation of two purified water streams in the first or the second channel and formation of two concentrated water streams in the other of the first and the second channels;
  at least part of the first feed stream enters the return flow zone of the first channel and forms two return flow streams that flow to the opposing side of the porous membranes and the return flow streams flow in the direction of the outlets, and at least part of the first feed stream adjacent to the porous membranes flows through the membranes joining the return flow streams,
  at least part of the second feed stream enters the return flow zone of the second channel and forms two return flow streams that flow to the opposing side of the porous membranes and the return flow streams flow in the direction of the outlets, and at least part of the second feed stream adjacent to the porous membranes flows through the membranes joining the return flow streams, and
  wherein the purified water stream is the stream directed to the outlets of the first or the second channel, and the concentrated ion aqueous stream is the stream directed to the outlets of the other of the first and the second channel;
 c. collecting the purified water stream and/or the concentrated ion aqueous stream from the outlets of the first and/or second channels.

The porous membranes can, for example, be non-ionic porous membranes. The non-ionic porous membranes can be the same or different.

In certain aspects, the first and third IEMs are cation exchange membranes, the second IEM is an anion exchange membrane, and the fluid directed to the outlets of the first channel is the concentrated ion aqueous stream, and the fluid directed to the outlets of the second channel is the purified water stream.

In yet additional aspects, the first and third IEMs are anion exchange membranes and the second IEM is a cation exchange membrane, and wherein the fluid directed to the outlets of the first channel is the purified water stream, and the fluid directed to the outlets of the second channel is the concentrated ion aqueous stream.

Another aspect of the present invention combines the concepts of ICP and electrocoagulation (EC) in one step. The device comprises an electrolytic cell with a cation exchange membrane (CEM) that separates the solutions in contact with anode and cathode respectively. Through this CEM, only cations can be transported according to the direction of the electric field applied. The anode is composed of a metal, typically aluminum or iron, and is used to provide metal ions for electrocoagulation. This hybrid system can remove both salt and particles, it has the flexibility to treat various types of wastewater, whether it be brackish groundwater, household water rich in bacteria or other biological contaminants, or simply murky water from various suspended solids and/or industrial heavy metal contaminants. The hybrid device can also be used for produced water treatment such as found in the shale gas industry, where suspended solids removal is crucial for re-use in hydraulic fracturing. The product from the CEM outlet is free of salt and suspended solids. This water can be used as a fresh feed solution, which is mixed with the produced water, for hydraulic fracturing. Typically, 90% of produced water is recycled in shale gas wells, mixed with fresh feed. Therefore, a relatively small portion of desalinated water may be sufficient to be used as fresh feed in produced water recycling. Similarly, the ICP-EC system has a wide range of applications in wastewater treatment system. It can be used as a single-device water treatment system. It does not require additional pre-treatment. It will be mainly used for removal of small particles, including suspended solids, oil droplets, organic chemicals, and biological organisms, with a small desalination capacity in addition, since the system is mainly driven by electricity and does not require a high pressure system, it can be made in small scale and is suitable for a localized water treatment system. By having shared electrodes for the two independent processes, the single electrochemical system can achieve both pre-treatment and desalination. Our invention makes use of the unavoidable Faradaic reaction near the anode to remove nonionic particles, reducing the unnecessary voltage drop and thus the energy consumption.

Salt removal ratio is a parameter to indicate the desalting ability of devices. By measuring the concentration (or conductivity) of sample flows $C_0$ and that of the desalted flow $C_{desalted}$, we can figure out how many salt ions are removed from the discrepancy between the two conductivities. Salt removal ratio is non-dimensional form of the amount of desalted ions by the initial ion concentration (or conductivity):

$$\text{Salt removal ratio} = \frac{C_0 - C_{desalted}}{C_0} \qquad (1.1)$$

The concentrations can be converted from the measured conductivity $\sigma$ in experiments with given molar conductivities of electrolytes. Here, we use only dilute binary electrolytes ($z^+ = z^- = 1$), 10 mM KCl, NaCl, and LiCl solutions. Then, the equation for conversion is:

$$C_i[\text{mol}/\text{m}^3 = \text{mM}] = \frac{\sigma}{\Lambda_{+,i} + \Lambda_{-,i}}\left[\frac{S/m}{S \cdot m^2/\text{mol}}\right], \qquad (1.2)$$

where $\Lambda_{+,i}$ and $\Lambda_{-,i}$ are the molar conductivity of cation and anion. The molar conductivities of $K^+$, $Na^+$, $Li^+$ are 7.63, 7.36, 5.01, and 3.87 [$10^3$ S m$^2$ mol$^{-1}$], respectively, which are connected closely with their diffusivity.

To compare different desalination devices, energy consumption is frequently measured. In electrochemical desalination systems, energy consumption for desalination is electrical power consumption (multiplication of current I and voltage V) divided by the flow rate of desalted water $Q_{desalted}$ per one cell:

$$\text{Energy consumption} = \frac{IV}{Q_{desalted}/N}[\text{Wh/L}] \qquad (1.3)$$

While energy consumption is an important metric determining the economic viability of the desalination technique, it cannot represent the desalination energy efficiency of the system. We therefore consider energy consumption to remove a single ion, i.e. energy per ion removal, which can be obtained by dividing energy consumption by the amount of removed ions and non-dimensionalizing by thermal energy $k_B T$ (=2.479 kJ/mol):

$$\text{Energy per ion removal} = \frac{NIV/Q_{desalted}}{k_B T(C_0 - C_{desalted})}. \qquad (1.4)$$

Energy per ion removal (EPIR) is a parameter representing how efficiently energy is consumed to reject ions by combining the concept of energy consumption and salt removal ratio. However, it is noted that salt removal ratio or the value of conductivity drop can be checked together, because better energy per ion removal does not necessarily represent better desalting performance.

Current efficiency describes the ratio of rejected ions in desalted flow and ions transferred at the electrodes. The following equation is a modified to obtain current efficiency from the concentration differences of initial sample flow and desalted flow:

$$\text{current efficiency} = \frac{zFQ_{desalted}(C_0 - C_{desalted})}{NI} \qquad (1.5)$$

Last, area efficiency represents the amount of desalted ions per unit area of the working membranes or electrodes:

$$\text{Area efficiency} = \frac{C_0 - C_{desalted}}{A}[\text{mM}/\text{m}^2],$$

where A is the working area of IEMs here. The most significant cost of an electrochemical desalination system is the membrane cost, therefore higher area efficiency would be economically favorable. However, there is usually a trade-off between area efficiency and energy consumption; if one increases area efficiency to enhance salt removal ratio with a limited size device by applying higher electric potential, energy consumption will increase. If one uses a larger system for better salt rejection at a fixed voltage or current, area efficiency becomes lower.

The platforms described here, ICP with two CEMs (2CEM), or AEMs (2AEM), and ED, are fabricated to study the differences and any potential advantages of each technique. The height h, width w, and length L of the working channel is 0.2, 2, and 10 mm, respectively. The area of working IEMs is therefore $2\times10^{-6}$ m$^2$. Three different electrolytes (10 mM KCl, NaCl, and LiCl) with 10 mM concentration are used to observe the effect of asymmetric molar conductivity (or diffusivity) of cation and anion. The flow rate between IEMs is 20 µL/min, so the desalted flow rates $Q_{desalted}$ are 10 µL/min for ICP platform and 20 µL/min for ED. The electrodes are rinsed with the same electrolytes (KCl or NaCl or LiCl) with 30 µL/min; dibasic buffer solution is not used here to supply the same cations or anions within the sample water.

Current responses on applied voltage from 0 to 10 V have been measured to overview the ICP and ED systems' characteristics. As described in U.S. Pat. No. 9,850,146, which is incorporated herein by reference, the transition from Ohmic to overlimiting regimes are observed with the slope changes near 2V. Interestingly, the current-voltage curves of ED and ICP platform with two CEMs are almost same, but the curves of ICP platform with two AEMs are located above even with the same electrolytes. This indicates two major characteristics of the ICP and ED platforms; the current responses are governed i) by the conducting ions (cations in 2CEM and anions in 2AEM) or ii) by the slower ions (cations in ED). The movement of Cl$^-$ governs ICP platform with two AEMs with KCl, NaCl, and LiCl solutions. The movement of cation governs ICP platform with two CEMs and ED, because chorine ion has a higher molar conductivity than cations here. If we place ions in the order of higher molar conductivity (proportional to electrophoretic mobility or diffusivity), it is Cl$^-$>K$^+$>Na$^+$>Li$^+$. Accordingly, in ICP with 2CEM and ED, the current values with K$^+$ are higher than that with Na$^+$ and Li$^+$.

The phenomena by previous linear ICP analysis is that a limiting current density (LCD) is linearly proportional to the diffusivity (or molar conductivity) of conducting ions. Here, the limiting current can be selected at the location where the current-voltage curve is bent.

For quantifying desalting performances of two types of ICP platform and ED, we record voltage responses, conductivity drop of desalted flows, and visualized ion concentration/flow profiles with fluorescent dyes during 300 sec at a constant applied current (Ohmic regime: 5, 10 µA and overlimiting regime: 20, 30, 50, 75, 100, 150, 200 µA) and a given flow rates (20 µL/min) of various aqueous solutions with 10 mM KCl, NaCl, and LiCl. Based on the given, controlled, and measured parameters, we also obtain salt removal ratio, energy consumption, energy per ion removal, current efficiency, and area efficiency for all data points. As can be seen, most parameters have similar values in Ohmic regime (5 and 10 µA) with lower current and voltage (<2 V), but there are clear differences in overlimiting regime. This extensive dataset of three different systems with three different electrolytes reveals many interesting trends and elucidates the differences between ICP platform and ED with nonlinear ICP.

First, the voltage-current responses show the similar tendencies. Correspondingly, the energy consumptions of ED and ICP with 2CEM are matched when the same electrolyte is used. In the case of ICP with 2AEM, chlorine ions can move faster with higher molar conductivity, resulting in lower cell resistance, lower voltage responses at a given current, and lower energy consumptions than the other two systems.

However, salt removal ratio of ICP with 2AEM are worse than both ICP with 2CEM and ED; ICP with 2CEM shows larger salt removal ratio than ED, meaning that with the same amount of driving current, ICP (2CEM) can move more ions from the desalted flow output. It is noted that with faster cation (K$^+$>Na$^+$>Li$^+$), the salt removal ratio is constant (ED) or higher (ICP with 2CEM) or lower (ICP with 2AEM). This ambitendency of the salt removal ratio at a constant applied current is also shown in the current efficiency. The current efficiency of ICP with 2CEM (2AEM) always better (worse) than ED, and the trend is magnified the cation molar conductivity is lower. This phenomenon will be discussed in detail in the next section.

Energy per ion removal represents the combined efficiency of both energy consumption and salt removal. Energy per ion removal of ICP with 2AEM have the lowest values, as like energy consumption. However, energy per ion removal of ICP with 2CEM becomes better than that of ED. It is because of higher salt removal ratio of ICP with 2CEM and that of ED, even the energy consumptions are the same. In all three systems, removing slow ions (Li$^+$) require more energy than the other faster ions (K$^+$ and Na$^+$). Energy per ion removal in overlimiting regime is O ($10^3$ $k_BT$), but it becomes O (10 $k_BT$) in Ohmic regime, which is comparable with state-of-the-art CDI systems. While the operation in Ohmic regime (applied current <20 µA) shows better energy efficiency (i.e., energy per ion removal), the area efficiency is significantly low. This enlightens us about the trade-off in optimization of desalting processes; better energy per ion removal and worse area efficiency (e.g., CDI or Ohmic ED), or higher salt removal ratio and area efficiency but worse energy per ion removal (e.g., nonlinear ED or ICP). The former is ideal for achieving the maximum energy efficiency but challenging to deal with large amount of salts (high salinity feed water). The latter can handle high salinity feed water (due to high salt removal ratio) and the system size can be minimized, at the cost of higher energy expense per ions removed.

As discussed above, current voltage responses in ICP and ED platforms with various salts can be largely expected from the linear and nonlinear ICP model. However, the trend of the salt removal ratio is exponible for deeper understanding of ion transport in ICP desalination process, along with energy per ion removal and current efficiency.

The invention is illustrated by the following non-limiting examples.

EXEMPLIFICATION

Figure 11A:
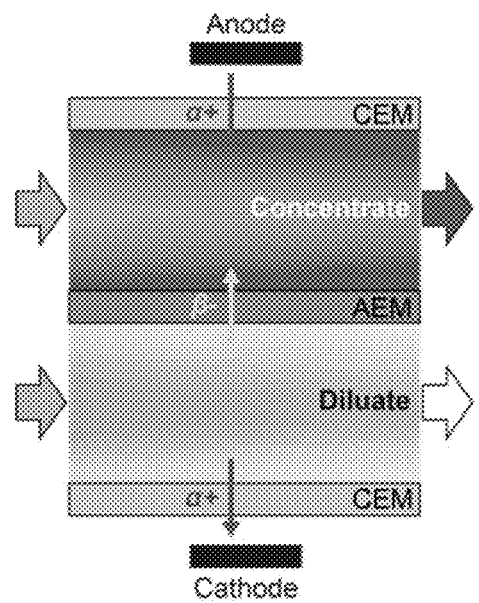
FIGS. 11A-11D are schematic illustrations of ion transport and flow path in electrodialysis (ED) (FIG. 11A), bifurcate ion concentration polarization (Bi-ICP) (FIG. 11B), (c) trifurcate ICP (Tri-ICP) (FIG. nC) and return-flow ICP (RF-ICP) (FIG. 11D) desalination. Arrows ("α+" and "β−") respectively indicate the cation and anion movement by electric field, respectively. Color Shading intensity represents ion concentration.
Figure 11B:
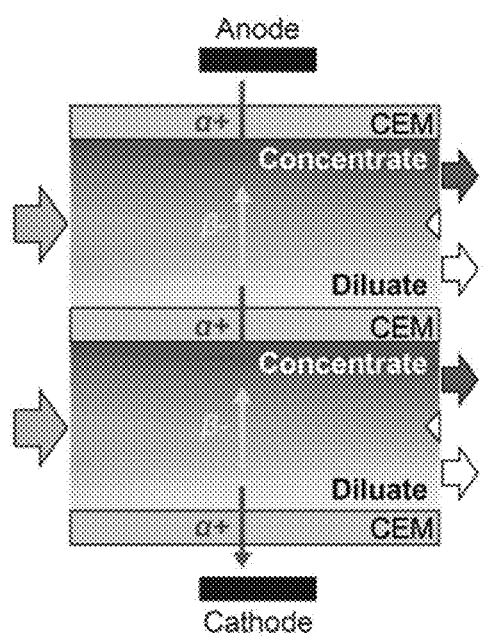
Figure 11C:
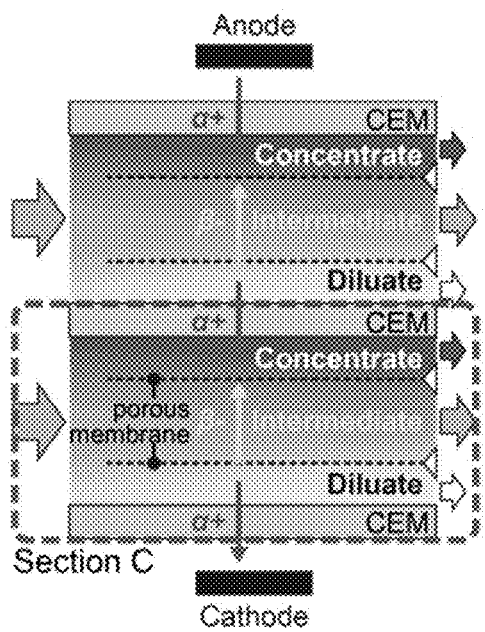
Figure 11D:
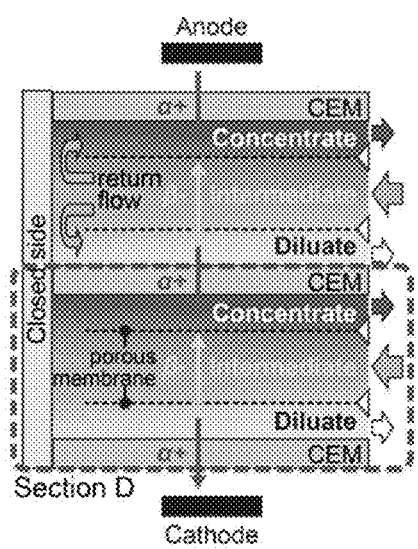
Figure 11E:
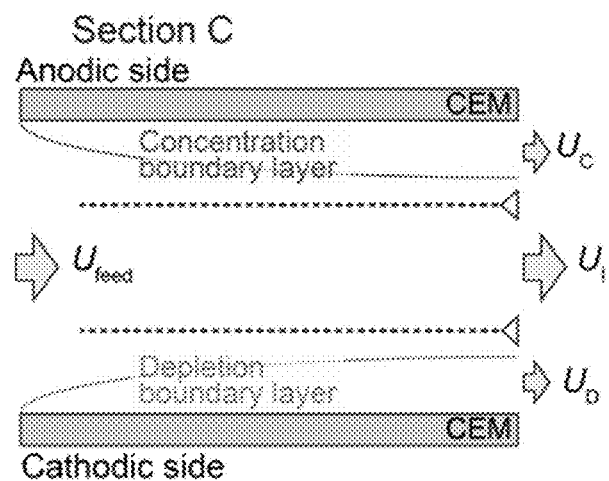
FIG. 11E Section C and FIG. 11F Section D, respectively, represent the details of the flow path and concentration profile. The solid lines, top and bottom, indicate the depletion and concentration boundary layers, respectively.

Example 1: Return Flow Ion Concentration Polarization Desalination: A New Way to Enhance Electromembrane Desalination A novel return flow (RF) electromembrane desalination process was developed where direct control of flow path effectively limits the growth of ion depletion region, therefore resulting in both high salt removal and high energy efficiency. FIG. 11D shows a schematic illustration of RF-ICP desalination with three channels separated by two porous membranes. RF-ICP has the same channel architecture as Tri-ICP, which has the three channels composed of a concentrate channel on the anodic side, a diluate channel on the cathodic side and an intermediate channel between them.

Figure 11F:
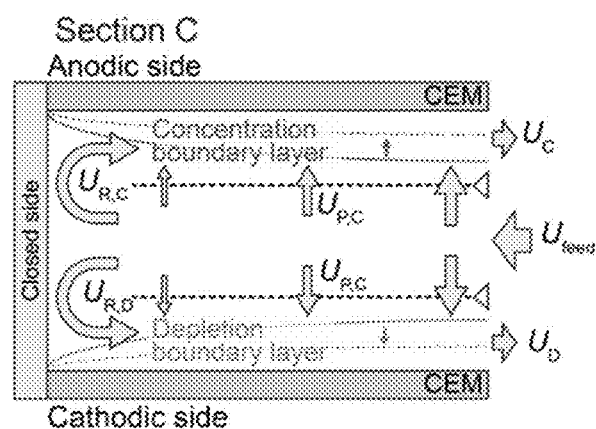
FIG. 11G plots a distribution of current density along the CEM and the concentration profile near the CEM. The lines that gradually decrease moving left to right along the horizontal axis indicate current density distributions along the CEM; and the lines that increase moving left to right along the horizontal axis indicate concentration profiles ($C_o$) near the CEM. Solid lines and dotted lines indicate Tri-ICP and RF-ICP, respectively, for FIGS. 11E, 11F, and 11G.
Figure 11G:
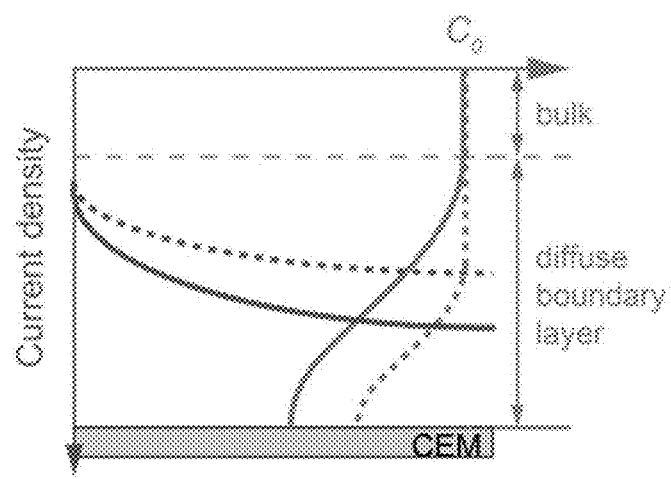

However, the intermediate channel outlet of Tri-ICP is replaced by the feed inlet of RF-ICP, and the feed inlet of Tri-ICP is entirely closed. Due to the course of flow and its pressure distribution by the channel configuration, two flows appear as follows (FIG. 11F): firstly, the channel configuration results in a flow which returns to the outlet next to the inlet, so called a return-flow (RT-flow). The feed solution enters through the inlet of the intermediate channel. Then, it flows to the end of channel and returns to the outlet of the two channels as separating into two channels, a diluate and a concentrate channel. RT-flow sweeps a mass thereby collecting thin ion depleted and concentrated layer, developed adjacent to CEM. Secondly, the pressure difference generates the other flow that flows from the intermediate channel to both side channels via the porous membranes (PM-flow). As the fluid flows along the channel, fluid pressure decreases due to energy loss due to friction. This pressure loss makes it possible to have higher pressure distribution in the intermediate channel than the others. It leads to an increase in pressure difference along the porous membrane. The increase in pressure difference promotes a gradual increase in the flow rate of PM-flow, resulting in a progressive increase in flow rate of diluate and concentrate stream. For the diluate stream, this phenomenon leads to an increase in mass transfer leading to a flatten depletion boundary layer with a uniform current distribution along CEM, while in the case of normal electromembrane process, the current decreases with thicker depletion boundary layer along CEM due to fixed mass transfer (FIG. 11G). [10,11]. For the concentrate stream, the presence of PM-flow reduces a diffusion flux from the concentrate stream. The diffusion flux increases as it gets closer to the outlet due to the increase in concentration of the concentrate stream, but the pressure difference also increases, further reducing the diffusion flux.

The net outcome of this architecture is the development of relatively even ion-depleted region across the system, since the regions with largest depletion region thickness (near the inlet/outlets on the left) is met by highest restricting flow from the intermediate flow. This difference will result in many important advantages, both in terms of achieving high salt removal and high energy efficiency. In this example, we demonstrate this new architecture by demonstrating the treatment of three concentrations of salt water (10, 35 and 70 g/L, which represent brackish water, seawater and highly saline brine, respectively), to evaluate technical and economic feasibility of RF-ICP desalination.

1 Materials and Methods
1.1 Device Fabrication

The modified lab-scale ICP desalination is prepared, with configuration, fabrication, and operation as described and demonstrated in a previous work. [8] The spacer comprised three channels, diluate, intermediate and concentrate channel. The intermediate channel is fabricated with clear cast acrylic sheet with 1.6 mm-thick and the nanoporous membrane (poly-carbonate membrane filter with 200 nm pore, Sterlitech Co., Kent, Wash., USA) were attached both sides of intermediate channel. Then, the diluate and concentrate channels, prepared with silicon rubbers with 0.8 mm-thick, were attached both sides. Three spacers were stacked and divided by four pieces of CMX, heterogeneous Neosepta CMX (Astom Co., Japan) with 15×5 cm² of the effective membrane area.

1.2 System Operation and Measurement

Three sodium chloride (S5886, Sigma-Aldrich, Co., St. Louis, Mo., USA) solutions with a concentration of 10, 35, 70 g/L are prepared for representative salinity for brackish water seawater and highly saline brine, respectively. Sodium sulfate (239313, Sigma-Aldrich, Co.) solution with a concentration of 0.6 M is used in the electrode rinsing channel. In order to apply the sodium chloride solutions, the hydrodynamic pressure is generated by a peristaltic pump (Masterflex® L/S pump, Cole-Parmer Instrument Company, LLC., Vernon Hills, Ill.). The sodium sulfate solution with 300 ml/m is recirculated by circulation pump (McMaster). Flow rates for diluate and concentrate stream are controlled by needle valve (7792K55, McMaster, Robbinsville, N.J., USA) and monitored by flowmeter (4350K45, McMaster). The real-time conductivity change is monitored by flow-through conductivity probe (16-900 Flow-thru Conductivity Electrode, Microelectrode, Inc., Bedford, N.H., USA) and then the diluate and concentrate solutions are collected after 5 minutes when the flow-through conductivity probe shows a saturated conductivity. The collected solutions are measured by electrode conductivity cell (013610MD, Thermo Fisher Scientific Inc., Cambridge, Mass., USA). The DC power supply (9205, B&K Precision Cor., Yorba Linda, Calif., USA) was used for an application of constant current and the Digital multimeter (5491B, B&K Precision Cor.) was used for a voltage drop between spacers.

Figure 12:
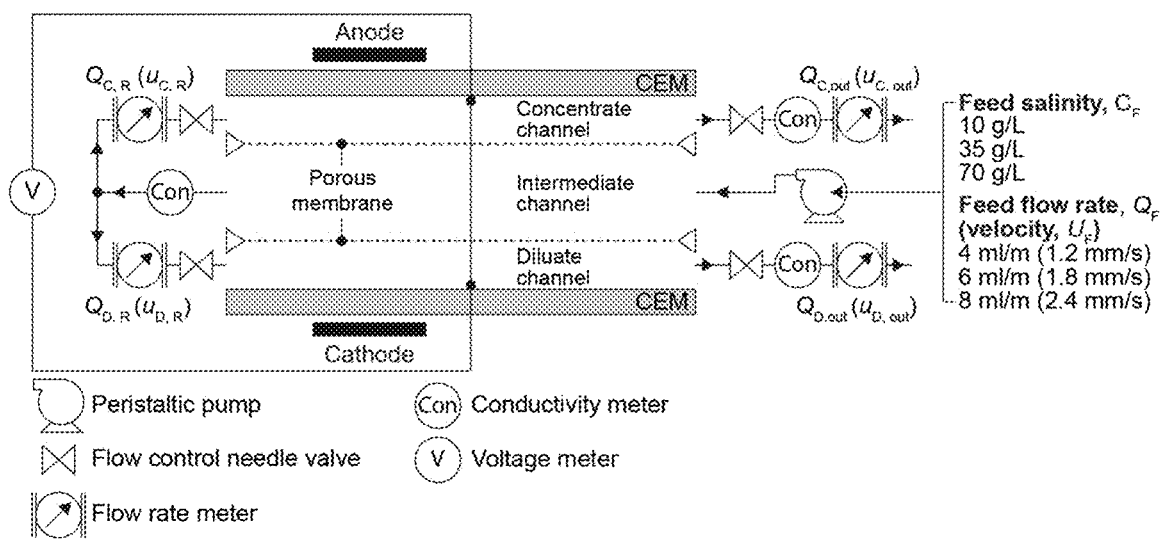
FIG. 12 is a schematic of a measurement system for an analytical experiment using a RF-ICP desalination system.

Experiment Set-Up and Analysis for the Studies on the Feasibility of RF-ICP Desalination System As shown in FIG. 12, two flow rate sensors and two needle valves are installed to measure and control the flow rate of concentrate channel outlet ($Q_{C,out}$) and diluate channel outlet ($Q_{D,out}$), respectively. Normally, the outflow from intermediate channel directly returns to both the concentrate and diluate channel, but intermediate channel extended with tube and split two directions to measure the flow rate of return flow (RT-flow) to the concentrate channel ($Q_{C,R}$) and diluate channel ($Q_{D,R}$). The two RT-flows are balanced by the needle valves to have a same flow rate before an application of electric field. The flow though the porous membranes (Por-flow) towards the concentrate ($Q_{C,P}$) and diluate channel ($Q_{D,P}$) are calculated as the difference between the flow rate of outflow and Re-flow. The conductivities of the outlets of each channel are measured. The flow velocities of concentrate outlet ($u_{C,out}$), diluate outlet ($u_{D,out}$), Re-flow to concentrate ($u_{C,R}$) and Re-flow to diluate ($u_{D,R}$) are calculated by dividing the corresponding flow rate by the width and height of the channel. The flow velocities of Por-flow to concentrate ($u_{P,C}$) and diluate ($u_{P,D}$) is calculated by dividing the corresponding flow rate by the width and length of the porous membrane. The channel and porous membrane have the same width (35 mm), but length of porous membrane (150 mm) is 187.5 times longer than the height of channel (0.8 mm). To calculate a power consumption within the channel, voltage drop within the channel ($V_{ch}$) is measured and the average resistivity ($\rho$) of each channel is calculated based on the measured conductivity ($\sigma$) with following equation:

$$\rho = \frac{1}{\sigma}$$

The approximate power consumption (P) of each channel is calculated based on the resistivity of the channel as below:

$$P_I = \frac{I^2}{Q_F} \cdot \rho_I \frac{h_I}{wl}, P_C = \frac{I^2}{Q_{C,out}} \cdot \rho_C \frac{h_C}{wl} \text{ and } P_D = \frac{I^2}{Q_{D,out}} \cdot \rho_D \frac{h_D}{wl}$$

where superscriptions, I, C and D, denote intermediate, concentration and diluate, respectively. I indicate current. h, w and l are the height, width and length of the channel.

Figure 13A:
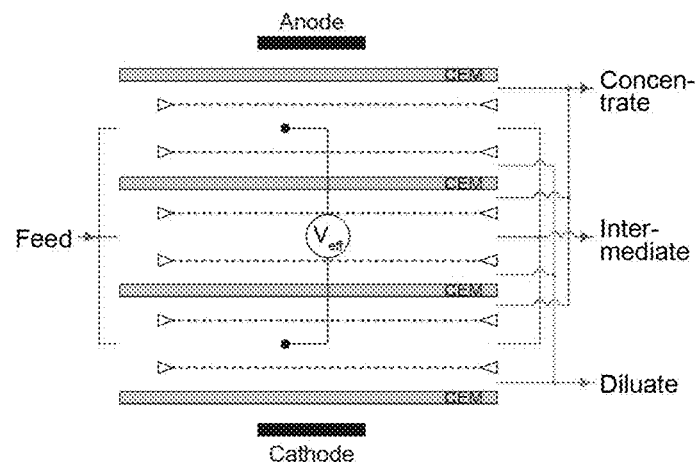
FIGS. 13A and 13B are schematic illustrations of Tri-ICP (FIG. 13A) and RF-ICP desalination experiment (FIG. 13B).
Figure 13B:
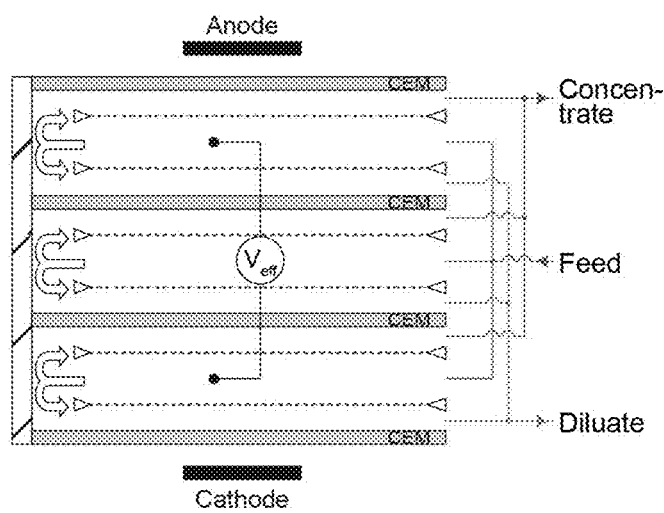

Experiment Set-Up and Analysis for Studies on the Comparison of RF-ICP and Tri-ICP Desalination Tri-ICP (FIG. 13A) and RF-ICP (FIG. 13B) are schematically illustrated in FIGS. 13A and 13B. Both systems have same spacer dimension and membrane area. The different feed flow rate is applied to have a same flow velocity at the diluate and concentrate outlet. The three channels have the same width and length but have different channel heights at a ratio of 1:2:1 (diluate: intermediate: concentrate). RF-ICP has a half of feed flow rate of Tri-ICP in order to have the same flow rate of diluate and concentrate flow rate for both systems. This flow path improves the recovery rate from 25% to 50% without any additional flow control. The outlet flow rates are monitored by flow meter to maintain a constant flow rate.

The current utilization (CU), power consumption (P) and energy per unit ion (EPI R) is calculated as follows:

$$CU = \frac{zFQ_{out,D}(C_F - C_D)}{NI}$$

$$P = \frac{IV_{eff}}{NQ_{out,D}}$$

$$EPIR = \frac{P}{zk_bT(C_F - C_D)}$$

where z is ion valence, F is Faraday's constant, I is current, N is the number of membrane pair, $C_F$ is feed ion concentration $C_D$ is ion concentration of diluate flow, $k_b$ is Boltzmann constant, T is temperature and $Q_{D,out}$ is the diluate flow rate.

Two parameters, salt removal ratio (SRRatio) and salt removal rate (SRRate), are applied to evaluate how many ions are removed.

$$SSRatio\ (\%) = \frac{C_D}{C_F} \times 100$$

$$SSRate\ (\mu g/s \cdot cm^2) = (C_F - C_D) \cdot Q_{out,D} \cdot \frac{1}{A_{mem}}$$

where $A_{mem}$ is the effective membrane area.

Numerical Analysis

Numerical simulation result is obtained after solving the governing equations including Nersnt-Planck equations for ion transport (Eq. 1-2), Poisson's equation for the dependence of electric potential fields on the ion concentrations (Eq. 3-4), and Navier-Stokes and continuity equations (Eq. 5-6) for fluid motions inside the channel. Dimensionless form of these equations is as following:

$$\frac{1}{\tilde{\lambda}_D}\frac{\partial \tilde{C}_\pm}{\partial \tilde{t}} = -\tilde{\nabla} \cdot \tilde{J}_\pm \tag{1}$$

$$\tilde{J}_\pm = -\tilde{D}_\pm(\tilde{\nabla}\tilde{C}_\pm + Z_\pm \tilde{C}_\pm \tilde{\nabla}\tilde{\Phi}) + Pe\tilde{U}\tilde{C}_\pm \tag{2}$$

$$\tilde{\lambda}_D^2 \tilde{\nabla} \cdot (\tilde{\nabla}\tilde{\Phi}) = -\tilde{\rho}_e \tag{3}$$

$$\tilde{\rho}_e = Z_+ \tilde{C}_+ + Z_- \tilde{C}_- \tag{4}$$

$$\frac{1}{Sc}\frac{1}{\tilde{\lambda}_D}\frac{\partial \tilde{C}_\pm}{\partial \tilde{t}} = -\tilde{\nabla}\tilde{P} + \tilde{\nabla}^2\tilde{U} - Re(\tilde{U}\cdot\tilde{\nabla})\tilde{U} - \tilde{\rho}_e\tilde{\nabla}\tilde{\Phi} \tag{5}$$

$$\tilde{\nabla} \cdot \tilde{U} = 0 \tag{6}$$

where $\tilde{t}$, $\tilde{C}_\pm$, $\tilde{\Phi}$, $\tilde{U}$ and $\tilde{P}$ denote the dimensionless time, concentration of cations (+) and anions (−), electric potential, vector of fluid velocity, and pressure, respectively. These quantities are normalized by the corresponding reference values of time, ionic concentration, electric potential, velocity, and pressure, respectively as follows:

$$\tau_0 = \frac{l_0^2}{D_0}; C_0 = C_{bulk}; \Phi_0 = \frac{k_BT}{Ze}; U_0 = \frac{\varepsilon\Phi_0}{\eta l_0}; P_0 = \frac{\eta U_0}{l_0} \tag{7}$$

where $C_0$ is the concentration scale, $l_0$ is the characteristic length scale, $D_0$ is the average diffusivity, $k_B$ is the Boltzmann constant, T is the absolute temperature, e is the elementary charge, $Z=|Z_+|$ is ion valence, $\eta$ is the dynamics viscosity of solution, and $\varepsilon$ is the permitivity of the solvent. Parameters $\tilde{D}_\pm = D_\pm/D_0$, $\tilde{\lambda}_D = \lambda_D/l_0$, and $\tilde{\rho} = \rho_e/C_0$ are dimensionless diffusion coefficient, the Debye length and the space charge, respectively. $Pe = U_0 l_0/D_0$, $Sc = \eta/\rho_m D_0$, and $Re = U_0 l_0 \rho_m/\eta$ are the Péclet number, the Schmidt number, and the Reynolds number, respectively.

Simulations were performed using an in-house code, which solved the above set of coupled Poisson-Nersnt-Planck-Navier-Stokes equations directly on a two-dimensional domain. These equations (Eq. 1-6) are discretized using the finite volume method, the nonlinearity of the equations was treated utilizing the Newton's method, and discretized linear systems were solved using GMRES method. The equations were solved iteratively until the convergence reached for all variables. The details about the simulation method can be found in [1][2].

Figure 14:
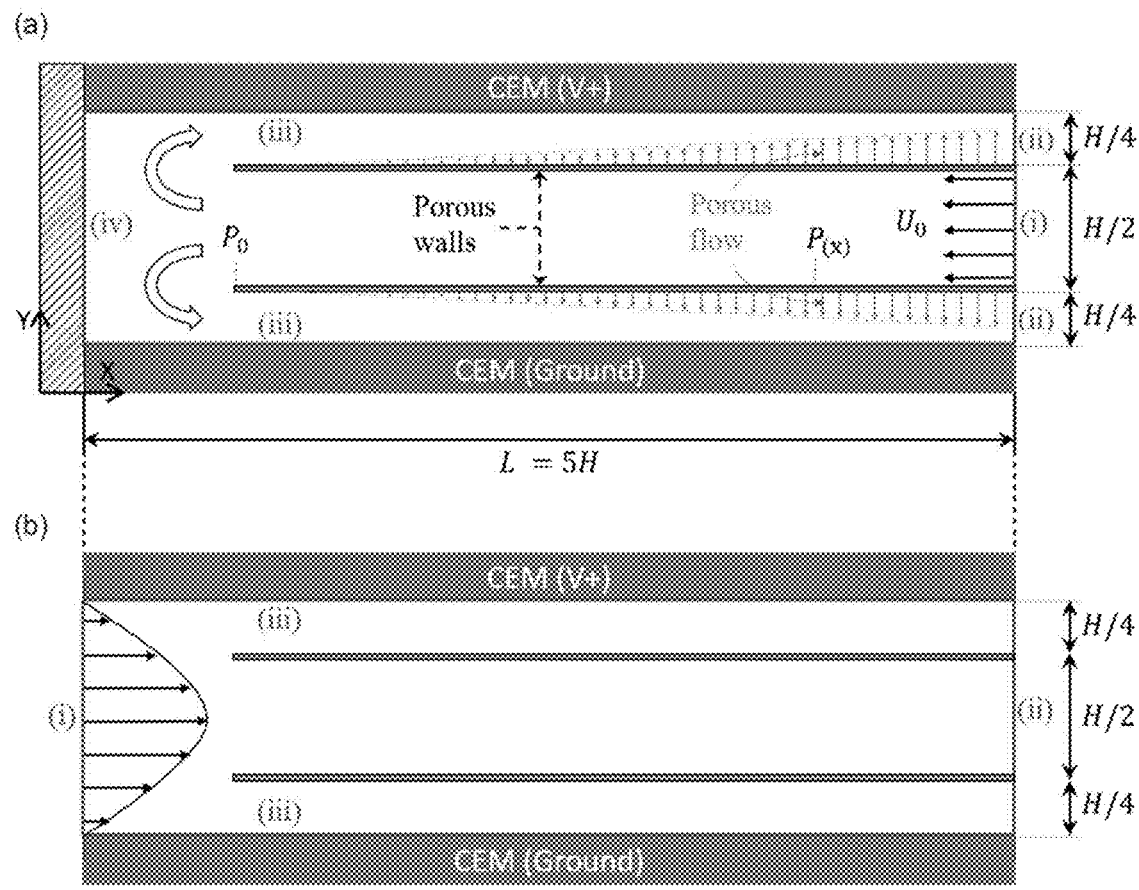
FIG. 14 is a schematic of simulation models of (a) RF-ICP and (b) Tri-ICP.

We consider numerical simulation models of RF-ICP and Tri-ICP sketched in FIG. 14. Two systems have the same channel configuration. The height and length of channel are H and 5H, respectively. The length of channel is enough to capture all the dynamics of ICP desalination phenomenon even it does not cover the whole channel length (15 cm). The thickness of porous wall is 0.005H which is very thin compared to the channel height (H). For the RF-ICP model, the function, $f(x)$, is applied to a porous wall having flow profiles which value reaches a maximum near the inlet and decreases linearly as going further from the inlet. The magnitude of flow rate through the porous wall is calculated so that the total flowrate is approximately 25% of inlet flowrate. In the Tri-ICP model, a Hagen-Poiseuille pressure-driven flow of electrolyte solution is defined at the inlet boundary. Since the inlet of Tri-ICP is identical to the channel height, while the RF-ICP's inlet is two time smaller, the inlet flowrate of Tri-ICP need to be two times higher than that of RF-ICP to equalize their dilute flowrate, which is 25% of the inlet flowrate. All parameter used here described in Table 1.

TABLE 1

Parameter used in the simulation.

| Symbol | Description | Value | Unit |
|---|---|---|---|
| $U_0$ | Average feed velocity | 0.5 and 2.0 | mm/s |
| $\Phi$ | Electric potential | 10 | V |
| $C_0$ | Bulk concentration | 10 | mol/m$^3$ |
| $D_+$ | Diffusion coefficient of cation | $1.33 \times 10^{-9}$ | m$^2$/s |

TABLE 1-continued

Parameter used in the simulation.

| Symbol | Description | Value | Unit |
|---|---|---|---|
| $D_-$ | Diffusion coefficient of anion | $2.03 \times 10^{-9}$ | m²/s |
| $\rho_m$ | Mass density | 1000 | kg/m³ |
| H | Height of channel | $3.175 \times 10^{-3}$ | m |
| $k_B$ | Boltzmann constant | $1.381 \times 10^{-23}$ | J/K |
| T | Absolute temperature | 300 | K |
| η | the dynamics viscosity of solution | $8.9 \times 10^{-4}$ | $P_{a \cdot s}$ |
| $\lambda_D$ | Debye length | $4.356 \times 10^{-9}$ | m |

Experiment Set-Up and Analysis for the Power Consumption Analysis of RF-ICP

Figure 15:
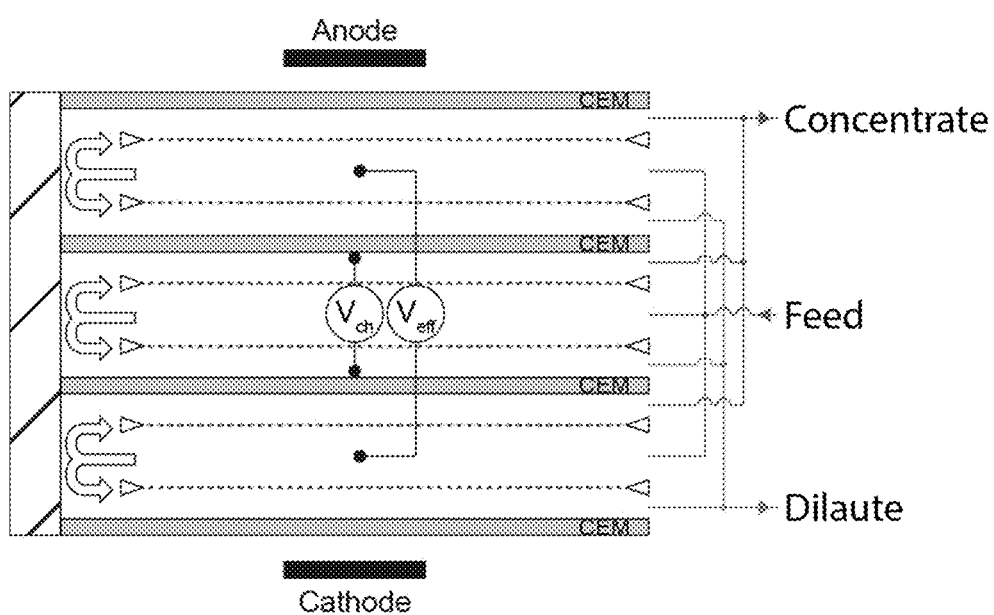
FIG. 15 is a schematic of an experimental configuration to evaluate power consumption and water cost variation.

The experiment set-up is schematically illustrated in FIG. 15. Three RF-ICP desalination spacers are stacked with the cation exchange membranes, alternatively. The effective voltage is measured in the same manner as the previous measurement. Two platinum electrodes are placed next to the membrane to measure the voltage drop in the channel. The experiment condition is in Table 2.

TABLE 2

The experiment conditions.

| Feed salinity ($C_F$, g/L) | Stack (#) | Feed flow rate ($Q_F$, ml/min) | Diluate flow rate ($Q_D$, ml/min) | Average feed flow velocity ($U_F$, mm/s) |
|---|---|---|---|---|
| 10, | 3 | 5 | 2.50 | 0.5 |
| 35, | | 10 | 5 | 1.0 |
| 70 | | 15 | 7.5 | 1.5 |
| | | 20 | 10 | 2.0 |
| | | 30 | 15 | 3.0 |
| | | 40 | 20 | 4.0 |

Water Cost Calculation $$\text{Water cost} = \text{Capital cost} + \text{Operating cost}$$

$$\text{Capital cost}(\$/m^3) = \frac{\text{Used membrane cost}(\$)}{\text{Output Flow volume per life }(m^3)} \times \text{Annualised Factor} = \frac{A_m \times K_Q}{Q_d \times T} \cdot \frac{(1+R)^T - 1}{T \times R}$$

$$\text{Operating cost}(\$/m^3) = \text{Power consumption}(kWh/m^3) \times \text{Electricity rate }(\$/kWh) = \frac{V \times I}{Q_d} \cdot K_E$$

where $A_m$, $K_Q$ and $Q_d$ are membrane area (m²), area normalized equipment cost ($750/m² membrane) and diluate flow rate (m³/h), respectively. T and R are lifespan (year) and annual interest rate (10%). V, I and $K_E$ are voltage (V), current (A) and electricity cost ($/kWh).

Where $Q_{RO,p}$ and $Q_{RO,b}$ are the produced water and brine from RO, respectively. $Q_{ICP,b}$ is the brine from RF-ICP.

REFERENCE

[1] R. Kwak, V. S. Pham, K. M. Lim, and J. Y. Han, Phys Rev Lett, 2013; 110.
[2] V. S. Pham, Z. R. Li, K. M. Lim, J. K. White, and J. Y. Han, Phys Rev E, 2012; 86.

Figure 16:
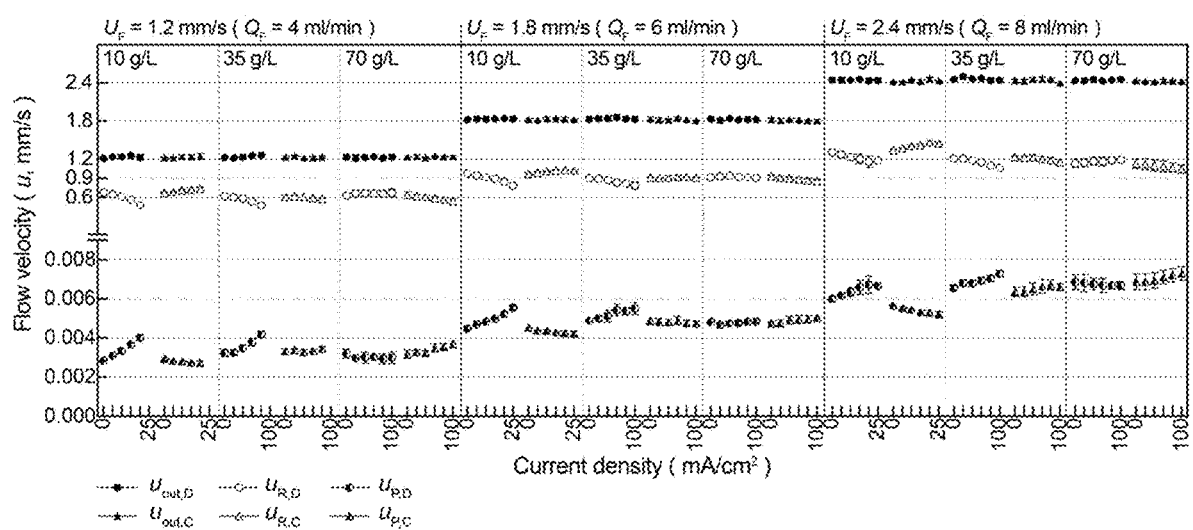
FIG. 16 shows flow velocity variation under an application of constant current flux. Various flow velocities (1.2, 1.8 and 2.4 mm/s) and feed salinities (10, 35 and 70 g/L) are applied for RF-ICP system. (N=3, error bars indicate standard deviations).

2 Results and Discussion 2.1 Studies on the Feasibility of RF-ICP Desalination System We evaluate the feasibility of RF-ICP desalination system by examining feed flow ($Q_F$) and feed salinity ($C_F$) variation under application of constant current flux (Details of experiment set-up are given in FIG. 12). As shown in the figure, the flow rate of PM-flow ($Q_P$) and RT-flow ($Q_R$) are measured at four points and the average flow velocity of PM-flow ($U_P$) and RT-flow ($U_R$) are calculated with the area of porous membrane surface (15×3.5 cm²) and channel cross section (0.8×3.5 cm²). Both $U_P$ and $U_R$ for diluate and concentrate streams show a symmetric flow distribution due to the symmetric channel configuration without an application of current flux. It observed that $U_P$ slightly increases under higher $U_F$ and $C_F$. $U_P$ is determined by a pressure difference between the intermediate stream and both side streams (diluate and concentrate streams). The pressure difference results from the energy loss due to friction by shear stress, which is changed by viscosity, density and velocity. Higher salinity brings higher viscosity and density which lead increase in pressure drop along the traveling the channel. The flow distribution is changed with an application of current flux (FIG. 16). $U_P$ for diluate stream ($U_{P,D}$) increases with increase in current flux whereas $U_P$ for concentrate stream ($U_{P,C}$) maintains initial velocity. The increasing tendency of $U_P$ decreases as $U_F$ and $C_F$ increases. This change can be simply explained by electro-osmotic flow through the negatively charged polycarbonate porous membrane. Firstly, large potential drop promoting the electro-osmotic flow is formed across the porous membrane in contact with the diluate stream., but higher velocity and feed salinity reduce the potential drop as decrease in the influence of electro-osmotic flow.

Figure 17A:
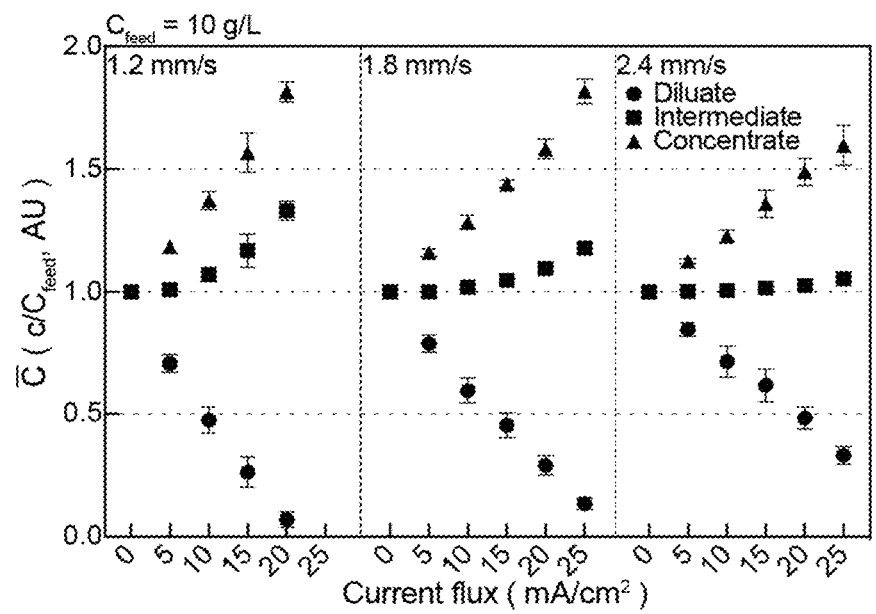
FIGS. 17A, 17B and 17C show the salinity variation at two channel outlets, diluate (●) and concentrate stream (▲) outlets, and one end of intermediate stream (■) in the RF-ICP system with salinities of 10 (FIG. 17A), 35 (FIG. 17B) and 70 g/L (FIG. 17C). (N=3, error bars indicate standard deviations).
Figure 17B:
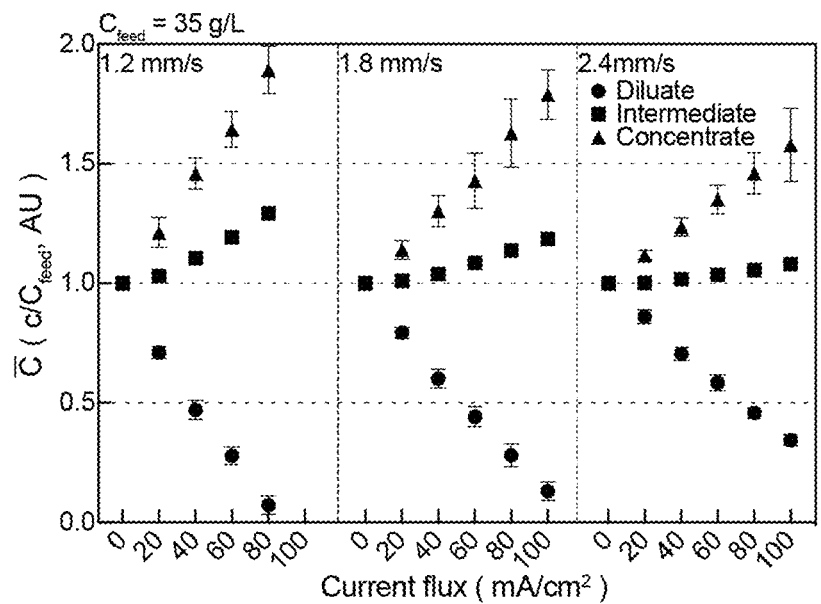
Figure 17C:
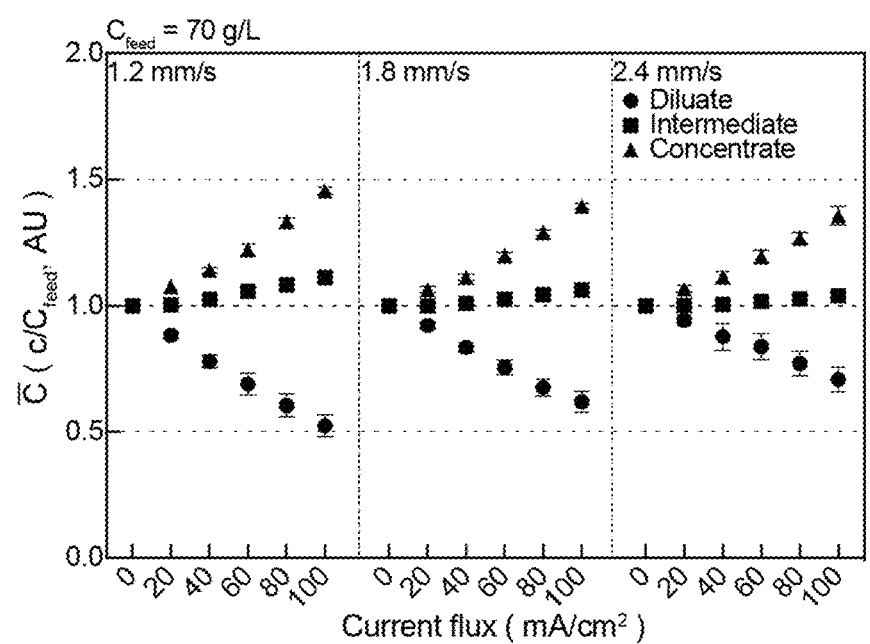
Figure 18A:
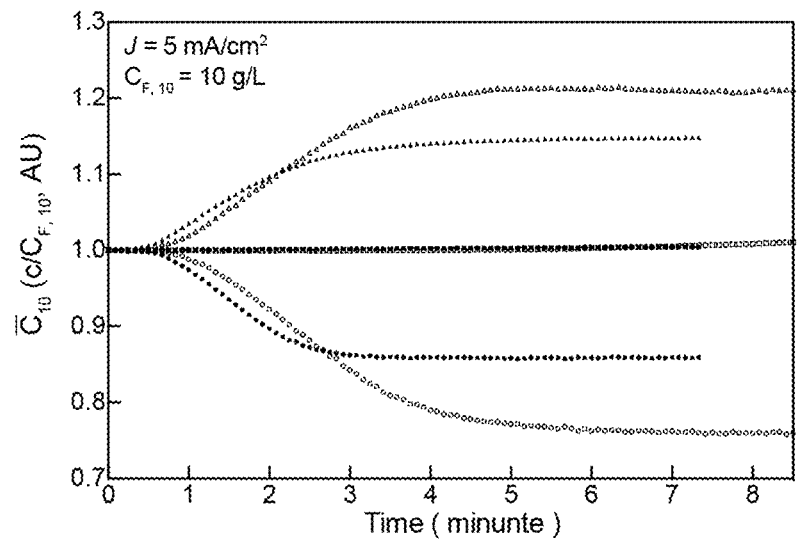
FIGS. 18A-18C show real-time monitoring of salinity changes for RF-ICP under a constant current flux. Corresponding experiment conditions, current density and feed salinity are indicated on the northwest of the graph.
Figure 18B:
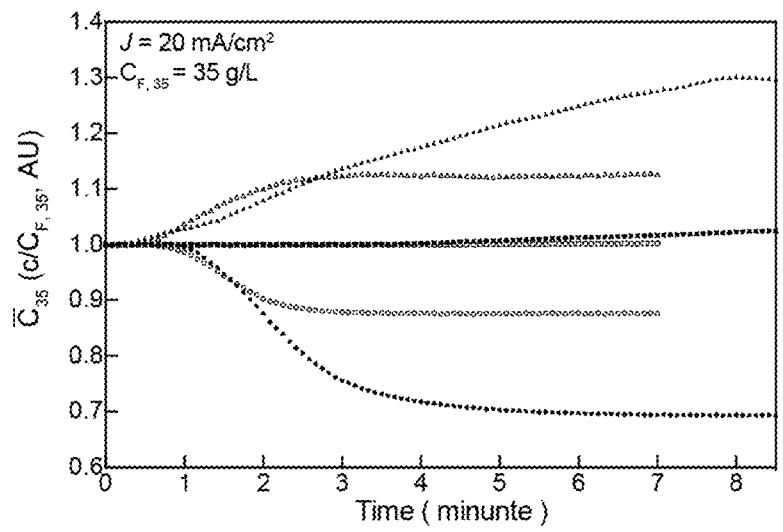
Figure 18C:
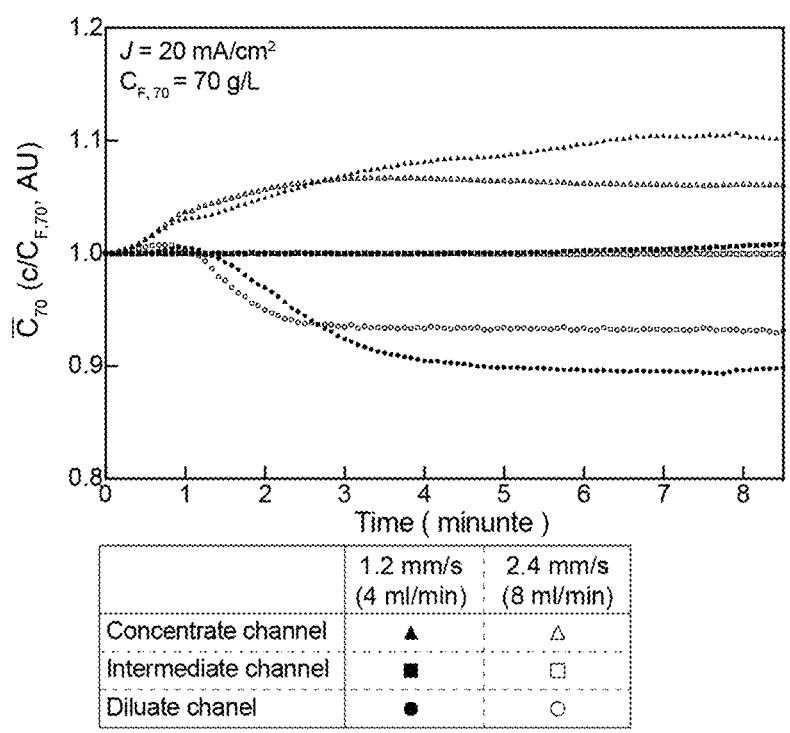
Figure 19A:
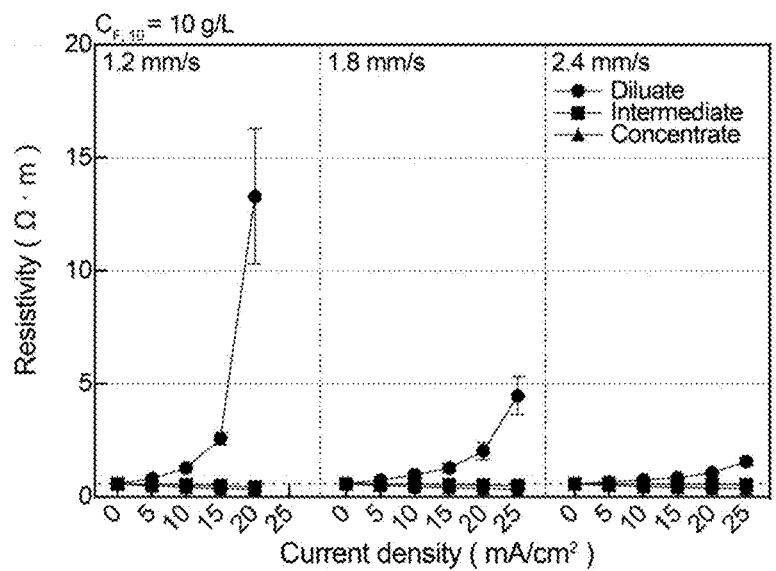
FIGS. 19A-19C show the calculated resistivity based on salinity variation with feed solutions of 10 (FIG. 19A), 35 (FIG. 19B) and 70 g/L (FIG. 19C). The dash lines indicate the resistivity of the feed solutions. (N=3, error bars indicate standard deviations).
Figure 19B:
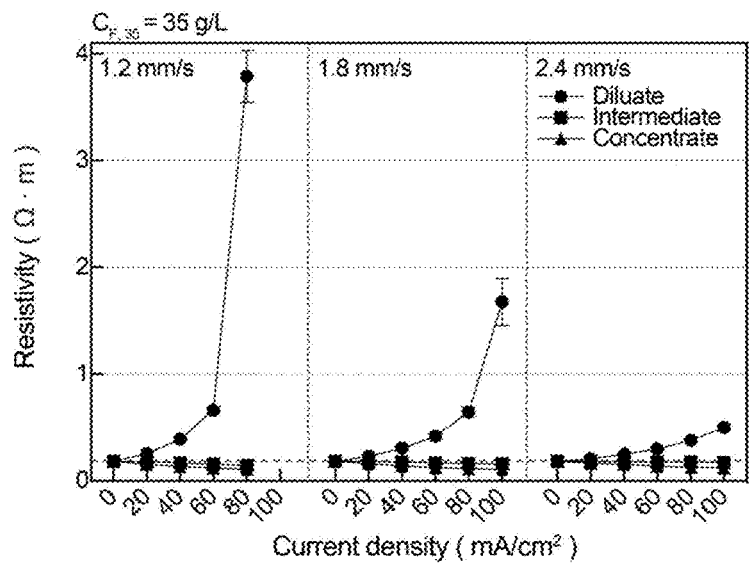
Figure 19C:
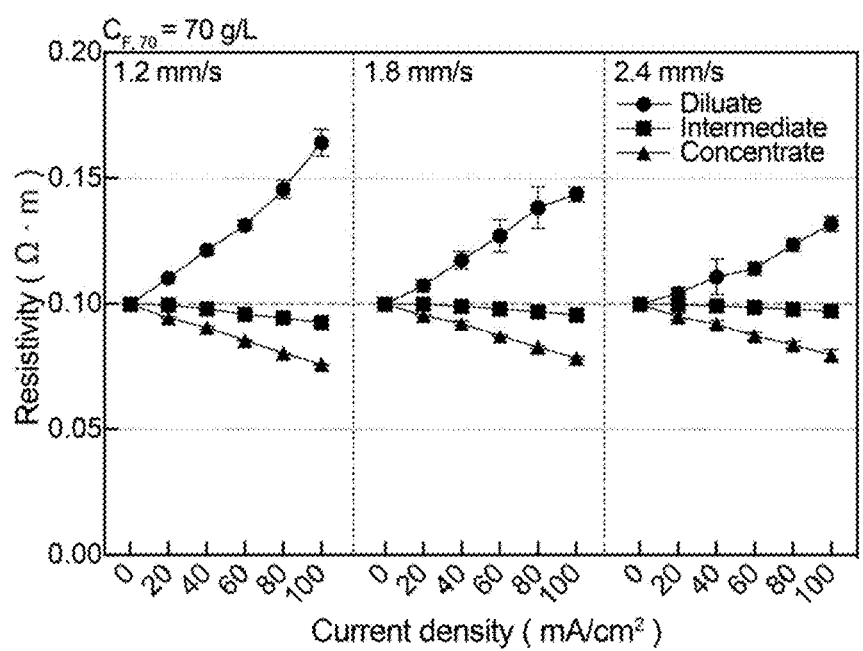
Figure 20A:
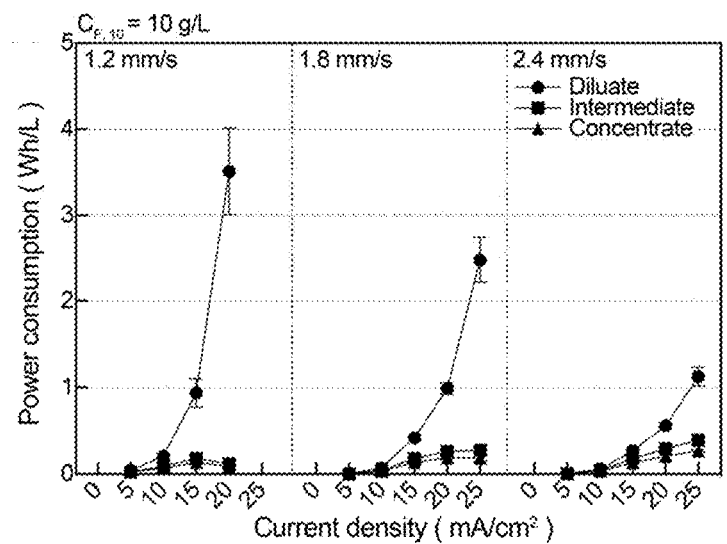
FIGS. 20A-20C show the power consumption by three different channels, diluate, intermediate and concentrate channel. (N=3, error bars indicate standard deviations).
Figure 20B:
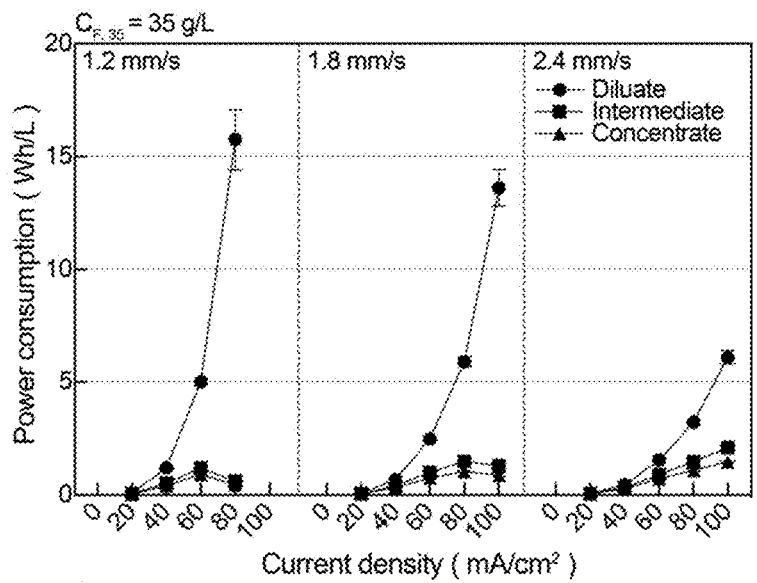
Figure 20C:
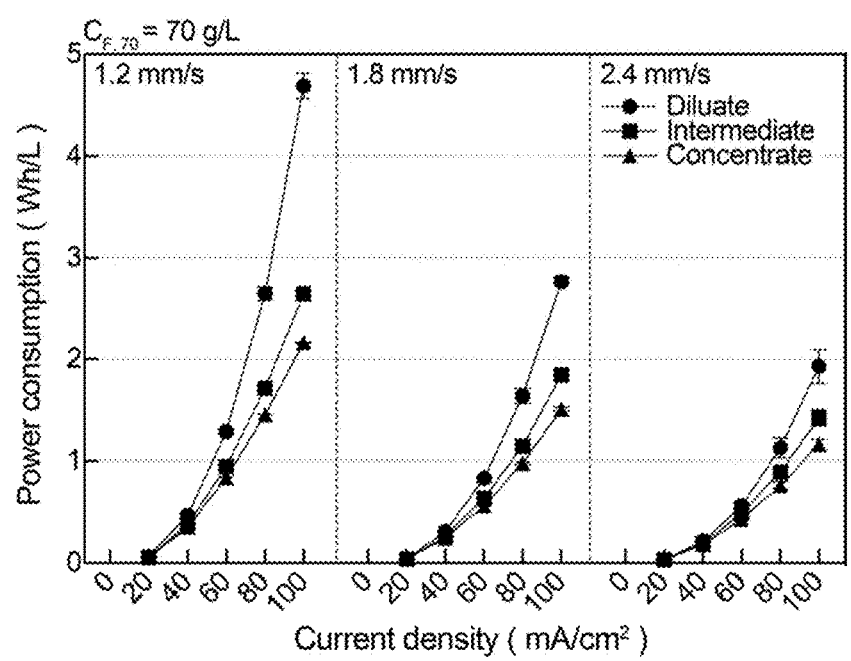

FIGS. 17A-C shows the salinity variation at outlets of two channels, diluate and concentrate channel, and end of intermediate channel. We monitored the real-time salinity changes for a fixed flow velocity for outlet and current flux to achieve a constant outlet salinity (FIGS. 18A-18C). All cases stabilized within 10 minutes, but slower $U_F$ requires more time to stabilize than higher $U_F$. Higher $U_F$ shows a symmetric salinity profile change, but lower $U_F$ shows an asymmetric salinity profile change with a delayed increase in salinity for the concentrate stream, indicating a salt precipitation on CEM. The salinity of the intermediate stream increases with the salinity of concentrate stream, indicating that the highly concentrated salt in the concentrate Total water cost $(TC) = $ RO cost $(RC) + RF-ICP$ cost $(RIC) + $ Waste treatment cost $(WTC)$ $$TC(\$/m^3) = \frac{RC(\$/m^3) \times Q_{RO,p}(m^3/h) + RIC(\$/m^3) \times Q_{RO,b}(m^3/h) + WTC(\$/m^3) \times Q_{ICP,b}(m^3/h)}{Q_{RO,p}(m^3/h)}$$

$$\text{Recovery rate }(\%) = \frac{Q_{RO,p}}{Q_F}$$

stream leaks into the intermediate stream. The leaked salt, however, returns again to the concentrate stream due to the geometrical character of RF-ICP system. Higher $U_F$ shows a lower intermediate salinity for a same current flux application and for a same salinity in the concentrate stream. It can be explained by two ways. One is that higher $U_F$ helps washing out the concentrated salt plug by hydrodynamic convection. The other is that higher $U_F$ generates higher up to prevent a diffusion flux from the concentrate stream even they have a same salinity in concentrate stream. With the result, we can conclude that higher $U_F$ prevents the diffusion flux from the concentrate to intermediate stream and helps to wash out the concentrate plug in the concentrate stream. Without salinity variation in the intermediate channel, there is no significant difference from the previous reported Tri-ICP desalination system [8] such that higher flow velocity requires more current flux to achieve a certain salinity of diluate stream, showing the symmetric salinity change for diluate and concentrate stream.

Figure 21:
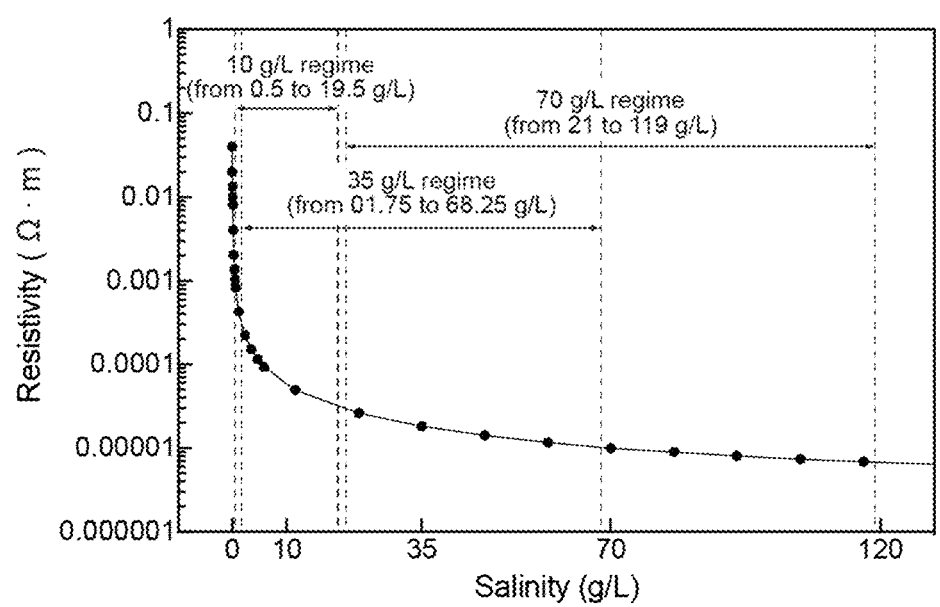
FIG. 21 shows the change in resistivity according to salinity at 25° C. The resistivity calculated by data set in [12].

Based on the salinity of each stream, the resistivity and power consumption of each stream is calculated in FIGS. 19A-19C and FIGS. 20A-20C. [12] The resistivity of the diluate stream exponentially increases with increase in current flux due to relation between salinity and resistivity (FIG. 21), while the resistivity of the intermediate and concentrate streams decrease due to the increase in salinity. The power consumption of diluate stream is not significantly higher than other streams under a lower salt removed condition, but most of the power consumed by diluate stream under a higher salt removed condition is due to its rapid increase in resistivity. In some cases, the power consumptions for intermediate and concentrate stream decrease rather than increase due to the resistance decrease.

2.2 Comparison of RF-ICP and Tri-ICP Desalination

Figure 22A:
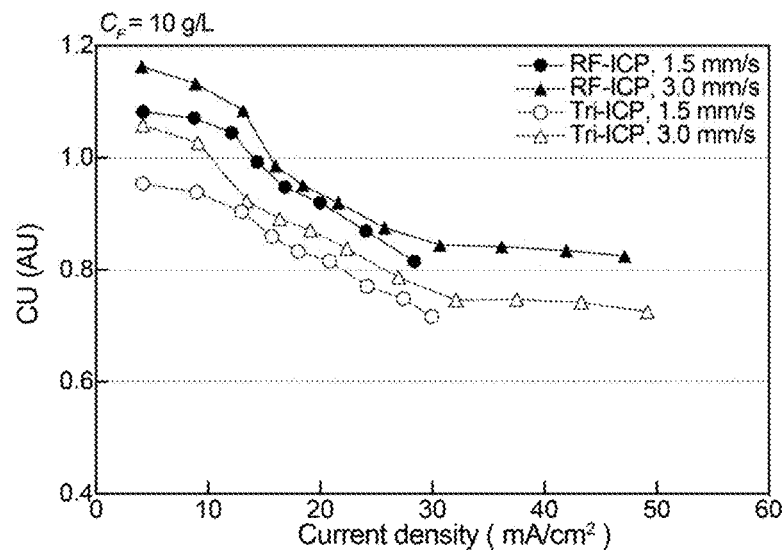
FIGS. 22A, 22B, and 22C show the change in the current utilization (CU) of RF-ICP and Tri-ICP versus current flux for 10 (FIG. 22A), 35 (FIG. 22B) and 70 g/L (FIG. 22C).
Figure 22B:
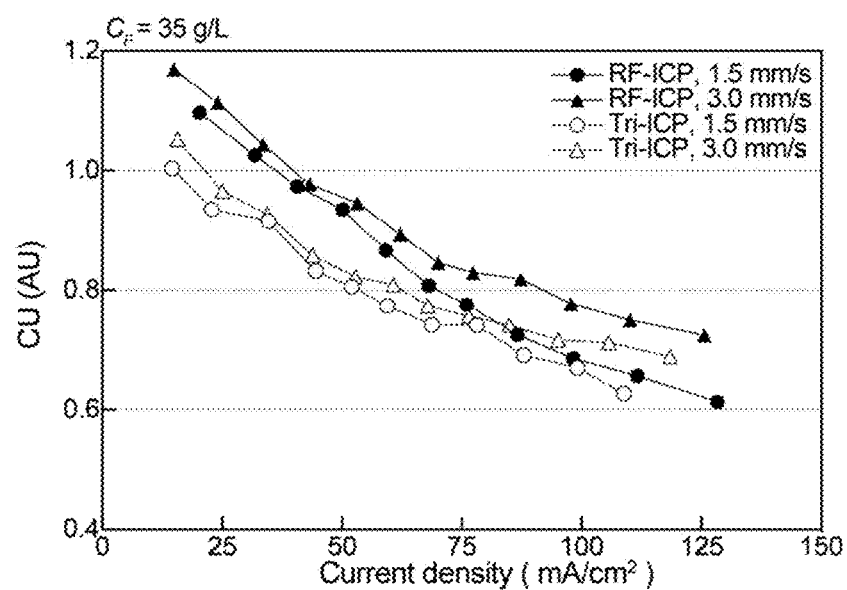
Figure 22C:
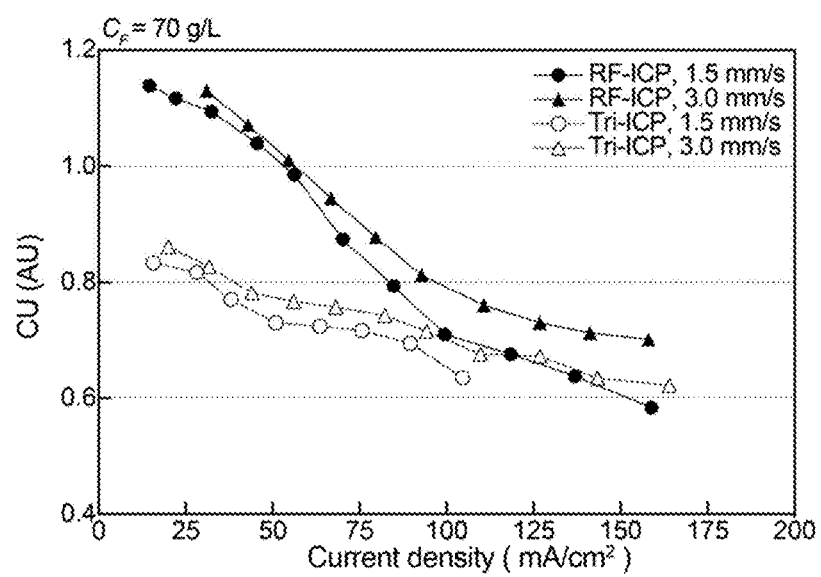

We performed both RF-ICP and Tri-ICP desalination experiments with same spacer and membrane dimension to evaluate an improved performance of RF-ICP desalination (Details of experiment set-up are given in FIG. 13A-13B). FIGS. 22A-22C shows the effect of systems on CU, calculated from the experimental results, with respect to $C_F$ and current flux. Firstly, CU of both systems gradually decreases as the current flux increases for all $C_F$. The higher current flux leads to a thicker depletion and concentration layer on the opposite side of CEM. The development of trans-membrane concentration difference promotes stronger back-diffusion and osmosis, resulting in the reduction of CU. [3] Both systems show higher CU value under higher $U_F$. Higher $U_F$ facilitates an increase in CU by the improved mass transfer, reducing a depletion layer thickness. The difference in CUs between the different velocities tends to increase as the current flux increases. It indicates that the hydrodynamic convection has a more significant role at the higher current regime. Second, RF-ICP shows higher CU than that of Tri-ICP. Even both systems have a same outlet flow velocity, Tri-ICP has higher a horizontal velocity component along the membrane than that of RF-ICP. If we consider only the horizontal velocity component, CU of Tri-ICP should be higher than that of RF-ICP, because a higher velocity improves CU. The configuration of RF-ICP facilitates the vertical mass transport by PM-flow and increases the traveling length where water experiences an ion separation.

Figure 23A:
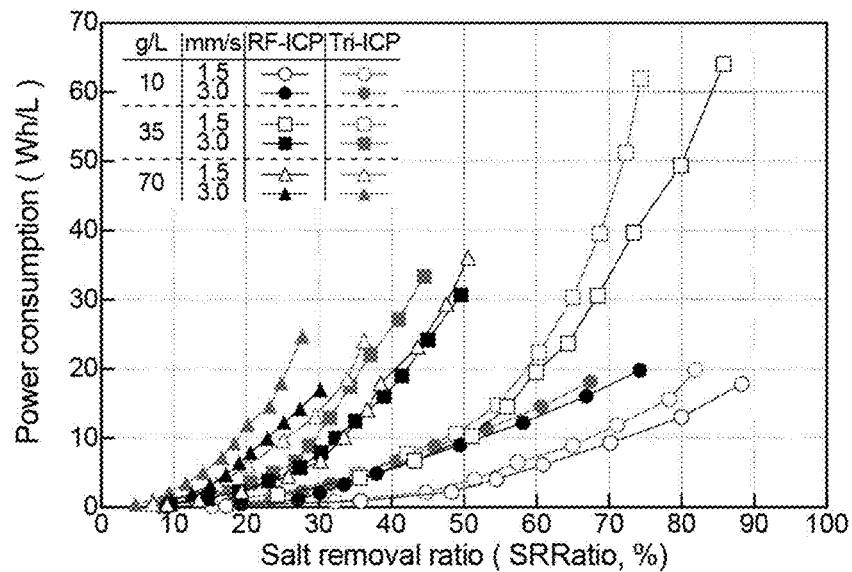
FIG. 23A shows power consumption according to salt removal ratio (SRRatio) and FIG. 23B shows energy per unit ion removal (EPIR) according to salt removal rate (SRRate) for RF-ICP and Tri-ICP.
Figure 23B:
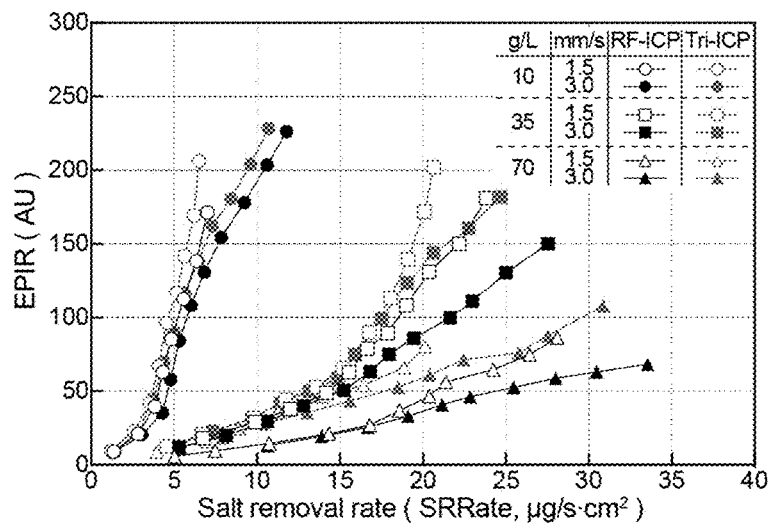
Figure 24:
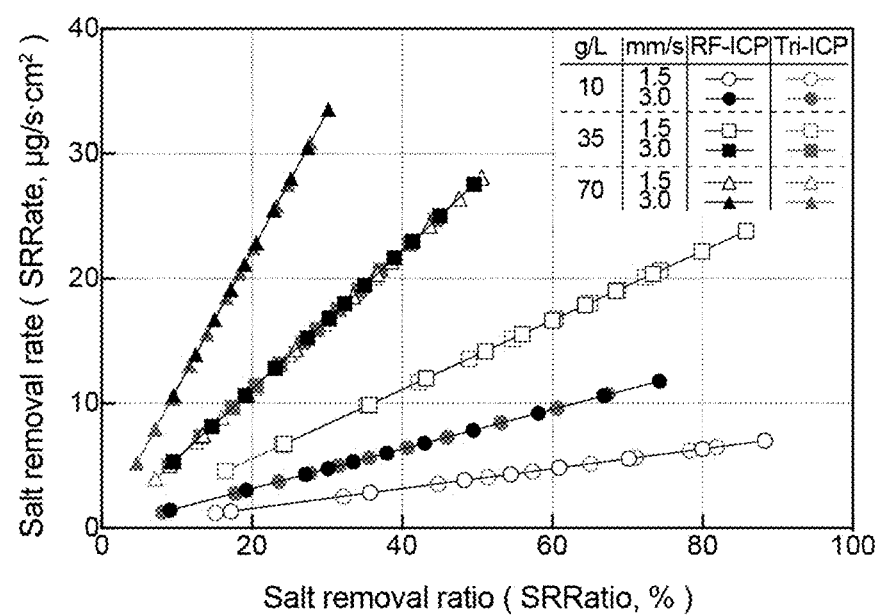
FIG. 24 shows the relationship between salt removal ratio (SRRatio) and salt removal rate (SRRate).

We plotted two graphs, the power consumption as a function of salt removal ratio (SRRatio) in FIG. 23A. Two systems have similar trends in power consumption which require higher power consumption for higher flow velocity to achieve a certain SRRatio. However, RF-ICP has better energy efficiency than Tri-ICP in all cases, including salinity and flow velocity changes. The difference in power consumption increases with increase in SRRatio, indicating that RF-ICP has a better improvement of energy efficiency at higher SRRatio. The energy per unit ion removal (EPIR) was plotted as a function of salt removal rate (SRRate) to evaluate energy requirement for a specific mass transfer rate in FIG. 23B. SRRate can provide the removed mass per unit time, but SRRatio can only represent the ratio of removed mass fraction (FIG. 24). Less EPIR is required at higher feed salinity and flow velocity to achieve same SRRate. A large amount of ion with a high salinity solution is easily transported to and through the membrane, and a higher flow velocity increases mass transport near the membrane, reducing depletion layer.

2.3 Numerical Analysis

Figure 25A:
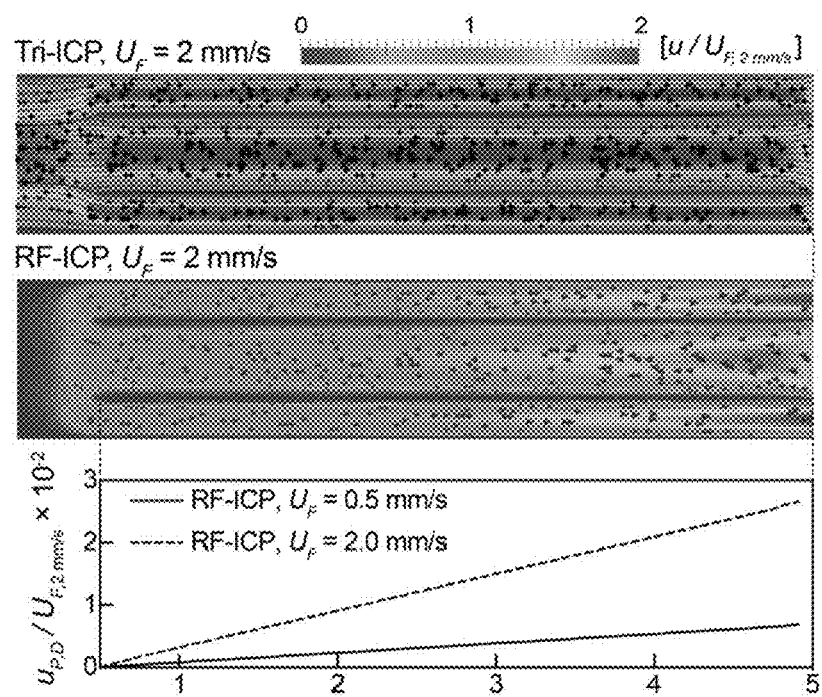
FIGS. 25A and 25B show the result of numerical analysis.
Figure 25B:
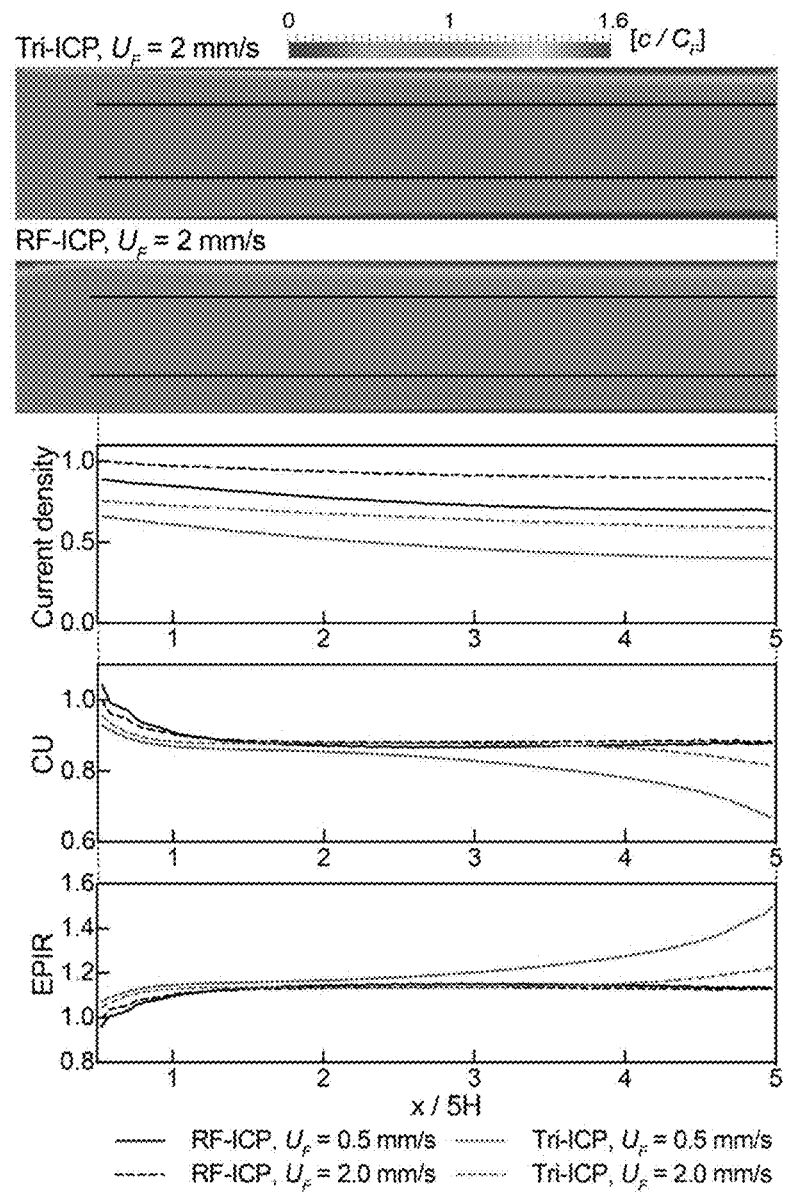

We also performed a numerical analysis using previously developed multi-physics ICP desalination model. [13,14]. The magnitude of velocity is visualized in FIG. 25A. In Tri-ICP, the flow formed parabolic profile in each channel because the porous membranes worked as physical walls. In RF-ICP, however, the velocity of intermediate stream decelerates by outflux through the porous membrane, but the velocity of other streams accelerates by influx through the porous membrane. Also, the PM-flow velocity increases linearly along the porous membrane, having the maximum value at the outlet of channel. Both Tri-ICP and RF-ICP have effectively removed cations in initial region of CEM, where the ion depletion layer has thinner thickness, showing good CU and EPIR (FIG. 25B). Tri-ICP, however, creates a thicker depletion layer along the membrane, rapidly deteriorating CU and EPIR, whereas RF-ICP develops a thinner depletion layer with good CU and EPIR. This trend is more apparent when a lower feed velocity generates a thicker depletion layer. Generally, higher velocity leads to an increase in mass transfer leading to a uniform current distribution along CEM. [10,11] RF-ICP leads to a uniform current distribution, improving a desalination performance, with a same feed velocity, but doubles a recovery rate. Interestingly, under an application of same feed velocity, RF-ICP has better desalination performance even Tri-ICP has a higher flow velocity near diluate side of CEM than RF-ICP. In the previous paper, it is proved that Tri-ICP with porous membranes has a better energy efficiency than Tri-ICP without porous membranes. [8]. It has been experimentally and numerically shown that RF-ICP facilitates an improved desalination performance, including energy efficiency and recovery rate, with a simple flow configuration change using same channel architecture.

2.4 Power Consumption Analysis

Figure 26A:
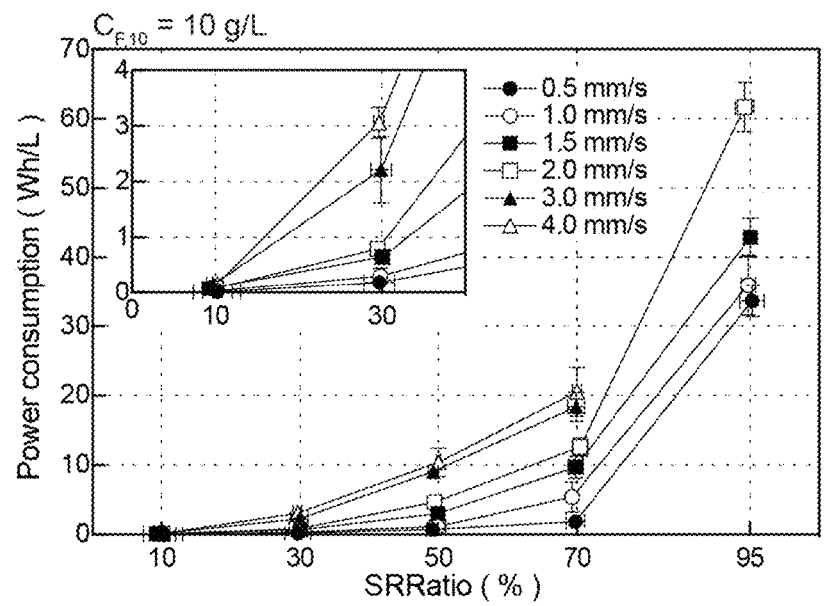
FIGS. 26A, 26B and 26C show the power consumption at various flow velocities (0.5~4.0 mm/s) for a fixed SRRatio (10, 30, 50, 70 and 95%) of feed solutions with 10 (FIG. 26A), 35 (FIG. 26B) and 70 g/L (FIG. 26C) of concentration. (N=4, error bars indicate standard deviations).
Figure 26B:
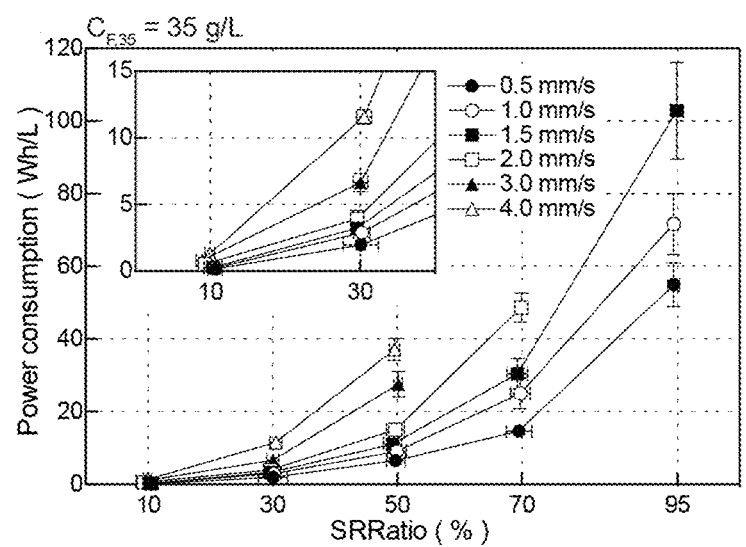
Figure 26C:
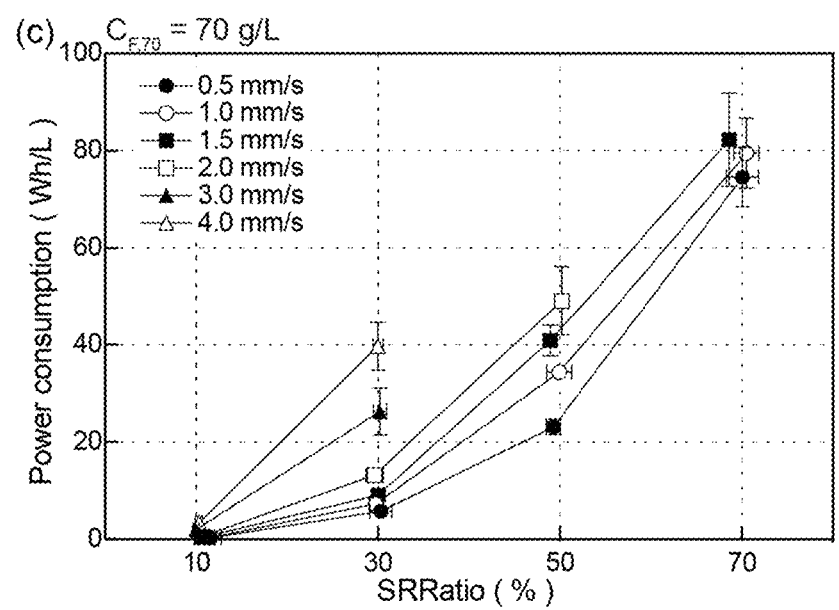

The performance of RF-ICP is evaluated to achieve a fixed SRRatio (10, 30, 50, 70, 95%) from various feed salinities and flow velocities (FIGS. 26A-26B). The details of experiment setting and experiment conditions are provided in FIG. 15 and Table 2. The maximum current flux was limited to 250 mA/cm². The harsh condition, requiring a current flux over 250 mA/cm², leads to malfunctions in CEM, creating a confused concentration profile and a bubble formation in the spacer. Higher power is required to promote pure and fast desalination, which indicate higher SRRatio and flow velocity, respectively.

Various feed salinities and the corresponding SRRatio can provide different application. In the case of desalination with a feed salinity of 10 g/L, we can achieve a drinking level desalination with a concentration of 0.5 g/L of diluate stream with a power consumption of 33.7~61.7 Wh/L. Recently, several studies are reported to get drinking water form low salinity brackish water (2~3 g/L) with a power consumption of 0.8~1 Wh/L. [3,15] However, they require benchtop (550 cm² of membrane area) or plant scale (meter-long membrane length) equipment. RF-ICP still requires high power consumption, but it is applicable to portable scale desalination with small equipment size (75 cm²). The other application is a partial desalination of highly saline brine (70 g/L). According to recent batch-ED study, the power consumption has been reported to range from 19 to 21 Wh/L, desalting similar salinity changes (90 g/L to 40 g/L) for multi-stage brine desalination. [16]. Also, the lab-scale Tri-ICP has required 5.6 to 213 Wh/L to achieve 50% of SRRatio with 70 g/L [8]. RF-ICP requires a power consumption of 23.2 to 49 Wh/L to achieve 50% of SRRatio. This power consumption is quite competitive value, because RF-ICP is continuous processes and facilitates an improved recovery rate from 25% to 50% without re-circulation and reduction of membrane length from 30 cm to 15 cm.

2.5 Cost Analysis

Power consumption is an important for a desalination application, but it is much more important to calculate a total water cost, composed of capital and operating cost, to evaluate a validity of technology in a practical desalination application. In this section, we mainly focused on how an optimized water cost changes by external environment to treat a brine (70 g/L) and its application.

Figure 27:
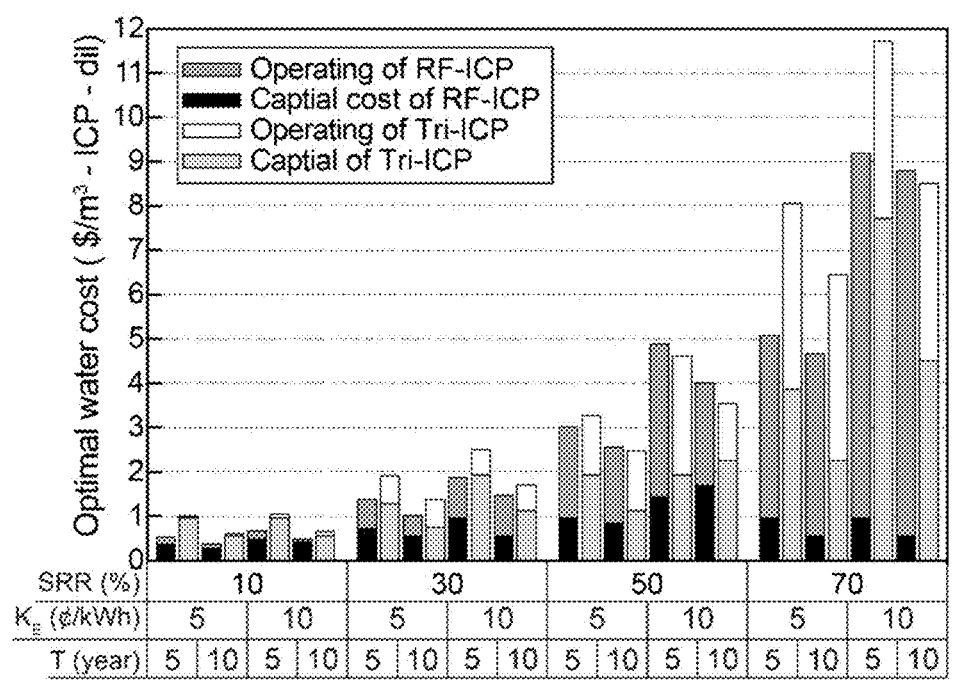
FIG. 27 shows the optimal water cost variation with change in equipment size, lifespan and electricity cost. The optimal water cost for Tri-ICP were calculated using experiment result from the literature. [8]

As previously reported [8,17], the simplified water cost model is applied for a water cost optimization (See Section 1.6 for details). The model includes capital and operating costs to determine the water cost. The capital cost is mainly determined by equipment lifespan and its cost. An increase in the equipment lifespan, determined by the lifespan of membrane, can reduced capital cost. Even the lifespan of commercial membrane is guaranteed for 10 years according to the specifications provided by the membrane manufacturer. [18,19], it is widely known that ion exchange membranes have a lifetime of 4 to 10 years while maintaining selective permeability, depending on the type of feed solution due to fouling problems [20-22]. The equipment cost is dominated by a membrane cost and its size in the electromembrane desalination. Especially, the membrane size is inversely correlated with the energy efficiency. As the length increases, energy efficiency improves, therefore operating costs are reduced, but capital costs increase. The electricity cost is a key factor in determining operating costs. The selection of electricity cost is also crucial to optimize water costs, because the electricity cost varies according to local conditions and is widely distributed between $0.025 and $0.325/kWh. [23] In FIG. 27, the water cost analysis was performed to understand how water costs change with different scenarios, including equipment size, lifespan and electricity cost. We import experiment data from the previous reported model, Tri-ICP, which has bigger membrane size, 180 cm², and better energy efficiency (RF-ICP has 75 cm² of membrane area). [8] The water cost is optimized to the lowest cost value of the sum of capital and operating cost. The lifespan and electricity cost are set as 5 and 10 year, $0.05 and $0.1/kWh, respectively. The optimized water cost for RF-ICP is $4.01/m³ ($1.69 and $2.32/m³ for capital and operating cost, respectively) with a lifespan of 10 years and an electricity cost of $0.1/kWh. It can be reduced to $2.57/m³ (0.85 and 1.72 $/m³ for capital and operating cost, respectively) with a reduced electricity cost of $0.05/kWh, albeit the same lifespan.

The changes in capital and operating cost provide changes in water cost, but also system characteristics and their applications. The operating costs, determined by electricity costs, used for both RF-ICP and Tri-ICP increase dramatically with increasing SRRatio, indicating that all ICP desalination is basically power intensive process, regardless of membrane size. Tri-ICP can further reduce capital costs by increasing lifespan due to differences in membrane size, although extending the lifespan of RF-ICP desalination plants has a relatively small capital cost savings. For the case (SRRatio=70% and $K_E$=$0.1/kWh), Tri-ICP could reduce the capital cost from $7.72 to $4.51/m³, maintaining operating cost as $4.00/m³ with the increase in lifespan from 5 to 10 year, whereby the water cost is reduced from $11.72 to $8.51/m³. However, in the same scenario, RF-ICP could hardly reduce the water cost from $9.19 to $8.79/m³. This result provides that ICP desalination is suitable technology for the region where has low electricity costs, while the smaller system ICP desalination is more sensitive to electricity costs.

Generally, coastal sea water reverse osmosis (RO) process discharges 65 to 85 g/L of brine waste to a coast. [24,25] The disposal to surface water can save a wastewater treatment cost, but it causes increase in a seawater salinity e.g. seawater salinity around Arabian Gulf exceeded 40 ppt. [26,27] This higher seawater salinity causes a significant marine environment problem, because the salinity of 40~45 ppt appear to cause a death of exposed marine plants. [28] The brine wastes can be disposed to a well or recycled by a post-treatment such as mechanical vapor recompression (MVR), which leads to additional cost ($4.7 to 18.9/m³ and $22 to 39/m³ are waste treatment cost by evaporation pond and MVR, respectively). [29] This additional cost should be considered to be part of the desalination costs and it accounts for the majority of the water cost calculations because RO, ranging $0.71 to 0.91/m3, has little change in cost. [30]

Figure 28A:
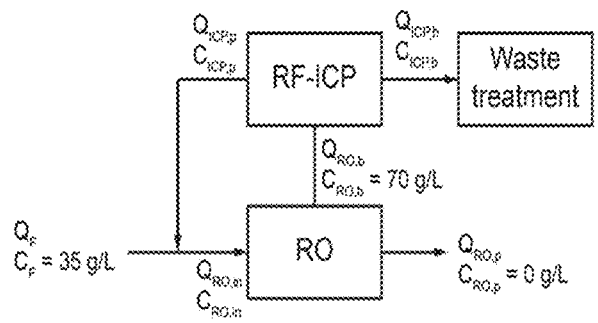
FIGS. 28A, 28B and 28C show the water cost optimization for RO brine treatment scenario.
Figure 28B:
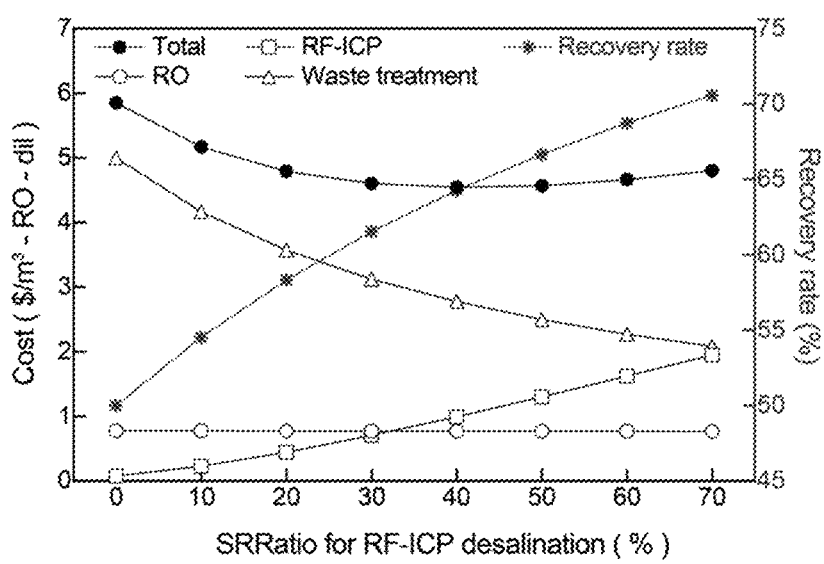
Figure 28C:
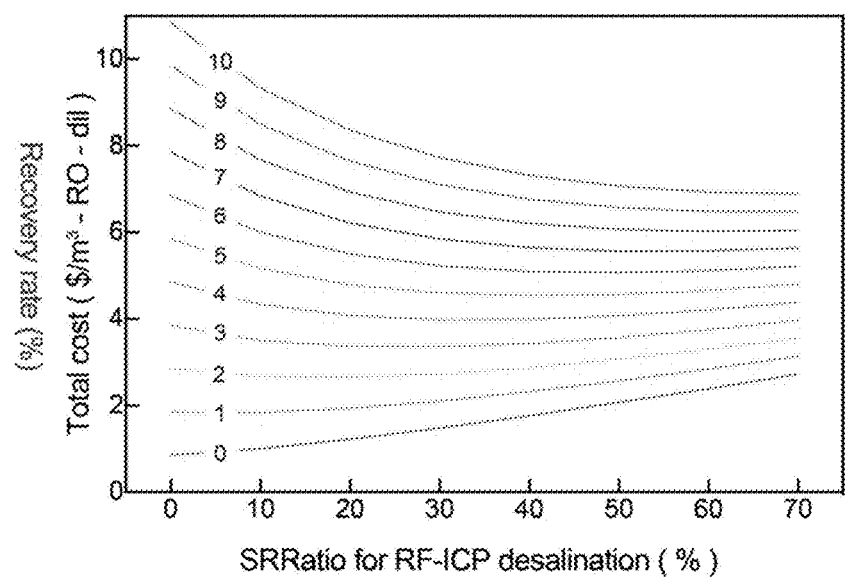

In order to reduce total water cost, the partial desalination by RF-ICP is applied to reduce the volume of waste from RO. FIG. 28A illustrates RO process incorporated RF-ICP and waste treatment process. To calculate the total water cost, including RO, waste treatment and RF-ICP cost, we applied RO cost model developed Lienhard's group[31], fixed waste treatment costs and RF-ICP cost model with lifespan of 10 years and electricity cost of $0.05/kWh. The feed salinity ($C_F$) is set as a seawater salinity, 35 g/L, and the brine salinity ($C_{RO,b}$) from SWRO is fixed as 70 g/L. The brine ($Q_{RO,b}$) is partially desalinated by RF-ICP and the produced water ($Q_{ICP,p}$) and brine ($Q_{ICP,b}$) by RF-ICP are recirculated into the RO inflow ($Q_{RO,in}$) and discharged to waste treatment, respectively. The feed salinity for RO ($C_{RO,in}$) can change depend on the SRRatio of RF-ICP desalination, but it is limited to 30 to 45 g/L, which can be applied to typical RO.[32] In FIG. 28B, the total water cost varies with change in RO, RF-ICP and waste treatment costs. As the SRRatio of RF-ICP increases, the RO recovery rate increases and $Q_{ICP,b}$ decreases, resulting in saving the total water cost. Additionally, the total water cost can be changed by the waste treatment cost. The cost analysis performed to assess the feasibility of RF-ICP desalination with changes in wastewater treatment costs (FIG. 28C). The increase in waste treatment costs dominates the total cost variation, but the increase in the SRRatio of RF-ICP reduces the total water cost. The RF-ICP begins to show that it is cost effective when wastewater treatment costs are greater than $3/m³. Above the waste treatment cost of $3/m³, the total cost decreases rapidly at the beginning of SRRatio increase and saturated a certain cost regardless of SRRatio increase.

3 Conclusion

Herein, we demonstrate the feasibility of RF-ICP desalination system by a portable-scale ICP RF-ICP device (75 cm² of membrane area). The performance of RF-ICP desalination was evaluated with various flow rate (0.83 to 6.67 ml/m per spacer) and feed salinity (10 to 70 g/L) conditions to achieve fixed SRRatios. The RF-ICP desalination achieved a desalination of drinking water with a concentration of 10 g/L. The RF-ICP desalination were applied two cost analysis scenarios for partial desalination of brine, a concentration of 70 g/L. First scenario was evaluated an optimized water cost variation for ICP models with different membrane sizes by lifespan and electricity cost. The RF-ICP desalination can achieve a total water cost as $2.57/m³ under conditions with $0.05/kWh and a lifespan of 10 years to reduce the feed salinity from 70 g/L to 35 g/L. Second scenario was a RO cost variation, which included wastewater treatment cost. The RF-ICP was applied to reduce the volume of waste and was a cost-effective when the wastewater treatment cost is higher than $3/m³. ICP desalination is new ion separation process in the field of electromembrane process. It indicates that ICP desalination technology can achieve improvement of energy efficiency and recovery rate by applying a well-developed technology in the ED field to the ICP desalination technology. While the similar idea can be applied to conventional ED (RF-ED), we validated the idea in ICP desalination process.

In summary, in electromembrane desalination processes such as electrodialysis and ion concentration polarization (ICP) desalination, ion-depleted boundary fluid layers constitute the desalted, product fluid stream, yet they also result in high resistivity and lowered energy efficiency. Manipulating fluid flow streams directly (e.g. spacers) is a new and under-explored method to break this fundamental trade-off for electromembrane desalination. In this work, a novel electromembrane desalination architecture was studied that allows a feed stream to return to the feed direction (hereby named as return-flow architecture) to improve energy efficiency by limiting and controlling the size of depleted boundary layer, even at high current values. The technical feasibility of this idea was examined in ICP desalination process (RF-ICP) with a wide range of feed salinity from 10 to 70 g/L. Brackish water (10 g/L) can be desalinated into potable water salinity (0.5 g/L) with a small size device (75 cm² of effective membrane area) at the energy efficiency of 33.7 Wh/L. For partial desalination of 70 g/L brine down to 35 g/L, RF-ICP desalination achieved overall water cost of $2.57/m³ ($0.41/barrel). These results show that return-flow architecture can improve the performance of electromembrane desalination, enabling more flexible water treatment for many applications.

Example 2: Counter-Flow Ion Concentration Polarization (CF-ICP)

ICP desalination is created by employing a unipolar membrane system (e.g. only using CEMs), which will create two zones (brine and desalted) within the channel between the membranes. In ICP desalination, separation of brine and desalted flow is achieved by the fluidic split at the end of the system. A high-flow scale-up (shown in FIGS. 29 to 33) can be achieved by stacking CEMs in a similar manner to a conventional electrodialysis (ED). FIGS. 29 to 33 compare the bifurcate ICP (Bi-N) with the CF-ICP (referred to as "Bi-C" in FIGS. 29 to 33). Concentration profile, Current utilization, and Power Consumption were measured as described above in Example 1.

To evaluate the feasibility of Bi-C for desalination, concentration changes in diluate and concentrate streams for both systems (Bi-N and Bi-C) were measured under an application of current flux (FIG. 30). Both systems show symmetrical changes in concentration profiles and Bi-C provided an improved desalination performance under the same current flux application.

As the current flux increases, the concentration difference between the diluate streams of each system becomes larger, which means that the Bi-C system can remove ions more efficiently at higher current fluxes. FIG. 31 shows changes in current utilization, feed velocity, and current flux. CUs of both systems gradually decrease with the increase in current flux. Also, CU increases with the increase in feed velocity. Bi-C shows an improved CU as compared to Bi-N for all cases.

The concentration difference between the outlet of concentrate stream and the stream across the CEM beside the concentrate stream was obtained to estimate the effect of trans-membrane back diffusion which reduces desalination performance (FIG. 32). The concentration difference of Bi-N is higher than that of Bi-C. The higher concentration difference can result in higher trans-membrane back diffusion which reduces desalination performance.

Figure 33:
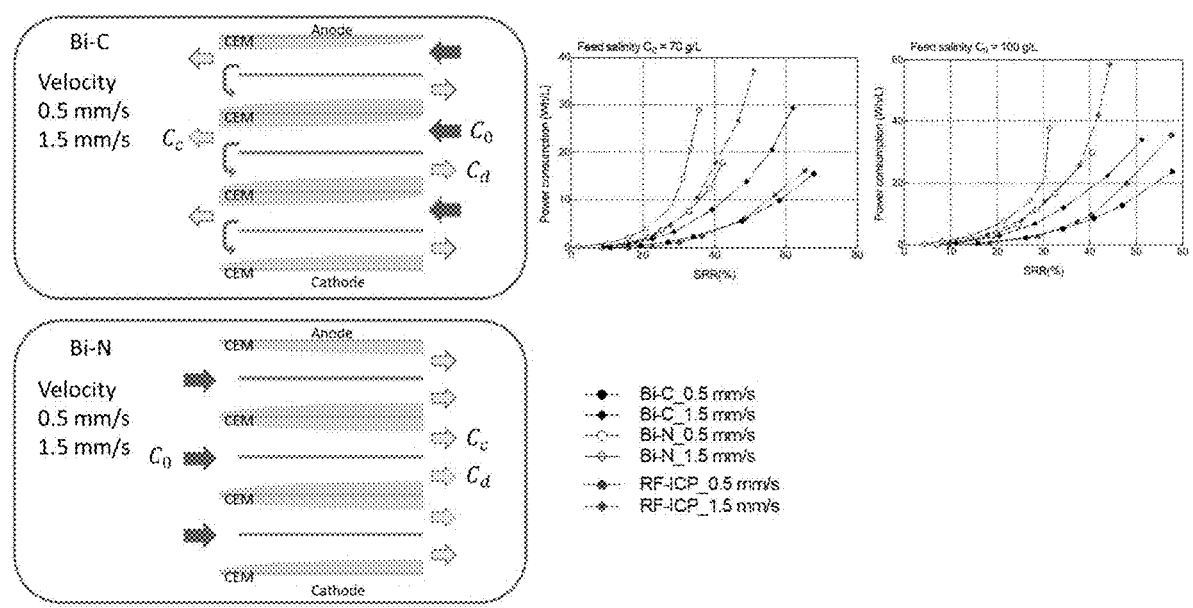
FIG. 33 shows the power consumption for the Bi-C and Bi-N systems at feed flow velocities of 0.5 mm/s and 1.5 mm/s. The graph on the right side shows the power consumption according to salt removal ratio (SRRatio) for Bi-C, Bi-N, and RF-ICP for feed salinities of 70 and 100 g/l.

In FIG. 33, we obtained the power consumption to evaluate energy efficiency of different ICP spacer architectures (Bi-N, Bi-C and RF). The RF-ICP and Bi-C showed higher energy efficiency than Bi-N, indicating that the presence of return flow motion improved energy efficiency. With respect to Bi-C and RF-ICP, Bi-C has higher energy efficiency than RF-ICP. These results show that the reduction of concentration difference across CEMs results in an improved desalination performance.

Example 3: Comparison of Power Efficiency by Various ICP Process Architectures (Spacers)

Figure 9A:
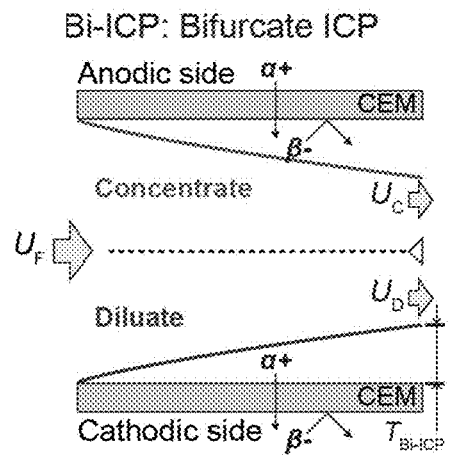
FIGS. 9A-9D are schematic illustrations comparing Bi-ICP (FIG. 9A), Tri-ICP (FIG. 9B), RF-ICP (FIG. 9C) and CF-ICP (FIG. 9D).
Figure 9B:
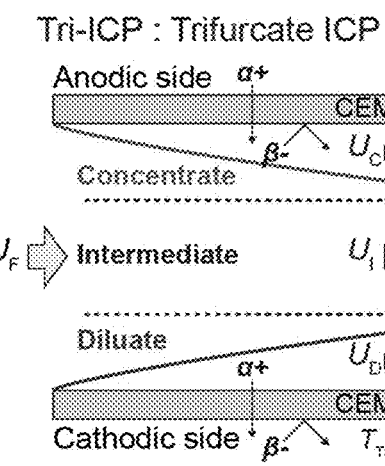
Figure 9C:
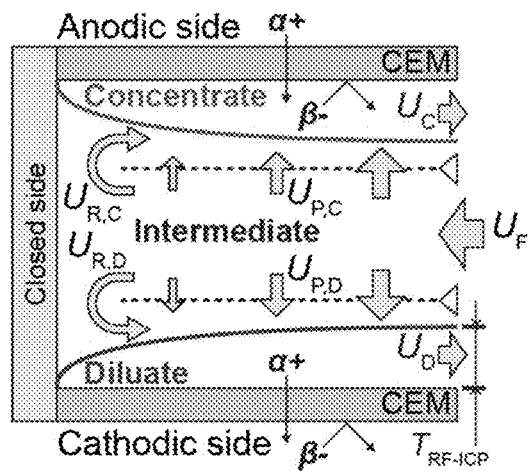
Figure 9D:
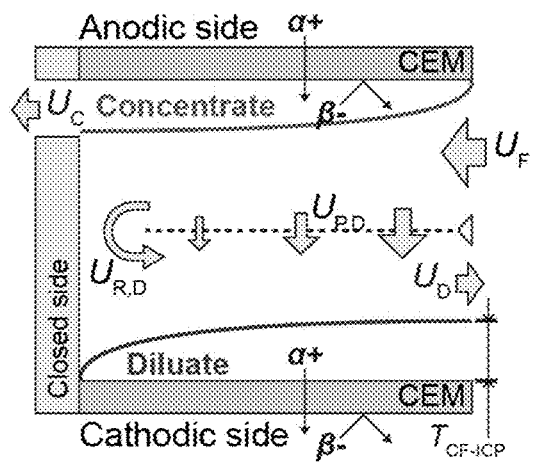
Figure 10A:
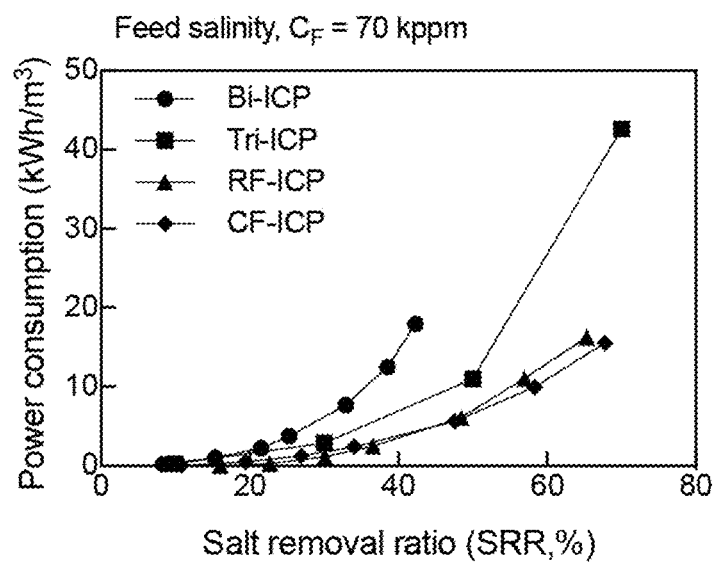
FIGS. 10A-10C shows power consumption according to salt removal ratio (SRR) with feed concentrations of 70 (FIG. 10A), 100 (FIG. 10B) and 160 kppm (FIG. 10C). (ICP desalination system with 30 cm of effective membrane length. 0.5 mm/s of flow velocity.)
Figure 10B:
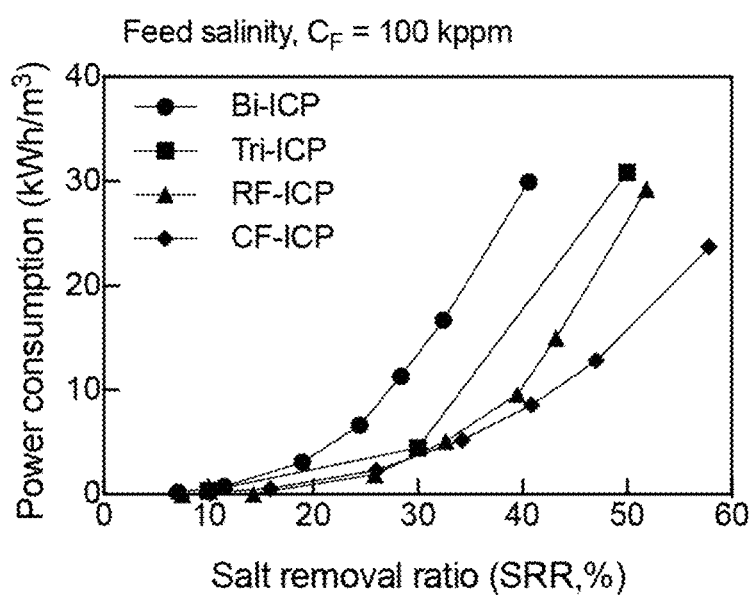
Figure 10C:
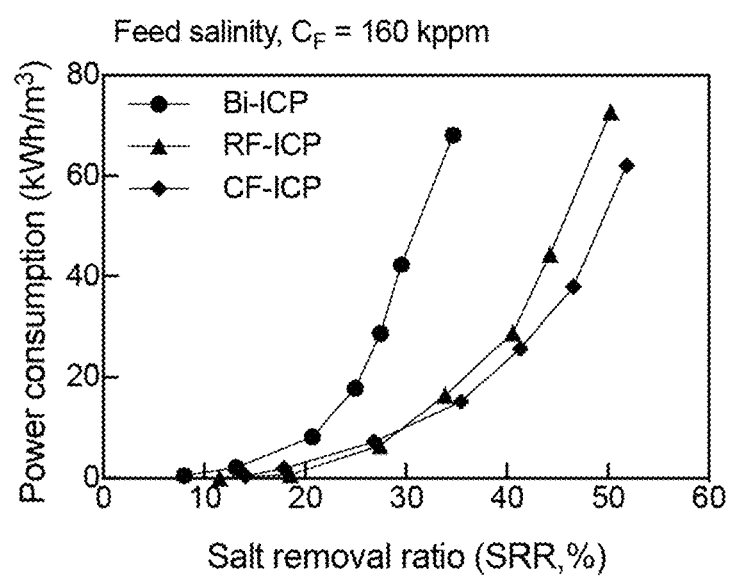

We have introduced various spacers, Bi-ICP (bifurcate normal flow), Tri-ICP (trifurcate ICP), RF-ICP (return flow ICP) and CF-ICP (counter flow ICP), for ICP desalination (FIGS. 9A-9D) and their unique features are summarized in Table 3. In order to evaluate the energy efficiency of different ICP process architectures (which differ by the kind of spacer design/engineering that is used), we obtained the power consumption as a function of salt removal ratio (SRR) with 70, 100 and 160 g/L of feed salinity in FIGS. 10A-10C. The original ICP architecture called "Bi-ICP" (FIG. 9A) is able to separate and collect two streams, diluate and concentrate streams. Bi-ICP requires the highest power consumption among the spacers, given the same conditions. Because Bi-ICP simultaneously collects a large amount of streams including a thick bulk layer and a thin depletion layer. Then, Tri-ICP (FIG. 9B) facilitates the collection of thin depletion layer in the diluate stream but suffers from reduced recovery rate. Tri-ICP significantly improves energy efficiency as compared to Bi-ICP, generating and collecting thin depletion layer and minimizing depletion layer thickness. RF-ICP (FIG. 9C), using the same channel structure as Tri-ICP, still facilitates the collection of thin depletion layers, but increases the effective channel length by simply changing the flow path. This change significantly reduces power consumption again, as compared to the power consumption of Tri-ICP. Another important benefit of RF-ICP is that the depletion layer across the entire membrane length is more evenly distributed, increasing the overall efficiency. CF-ICP (FIG. 9D), inspired by Bi-ICP, increases the effective channel length for diluate stream, but maintains the effective channel length for concentrate stream. By reversing the direction of growth of the two streams, diluate and concentrate streams, CF-ICP reduced a trans-membrane concentration difference, resulting in a reduction in back diffusion and osmosis. Therefore, it was shown (FIGS. 10A-10C) that CF-ICP achieves the best power efficiency of all four architectures, given the same feedwater salinity, flow rate, and membrane length conditions. While the techno-economic model of these ICP processes predict that the current level of power efficiency is suitable for many brine management applications, we will continue to engineer the design of these space structure to increase the energy efficiency of the ICP desalination:

- Collection of thin depletion layer
- Increase in the effective membrane length for diluate stream
- Reduction in trans-membrane concentration difference
- More efficient desalination at low-salinity condition (at the end of the process)

TABLE 3

Various ICP process architectures

| Type | Fluidic compartment | Feature |
|---|---|---|
| Bi-ICP | ● Two channels<br>● One porous membrane | ● One inlet and two outlets<br>● Separate collection of diluate and concentrate streams<br>● Recovery rate = 50% |
| Tri-ICP | ● Three channels<br>● Two porous membranes | ● One inlet and three outlets<br>● Collection of thin depletion layer<br>● Recovery rate = 25% |
| RF-ICP | ● Three channels<br>● Two porous membranes | ● One inlet and two outlets<br>● Increase in the effective channel length<br>● Recovery rate = 50% |
| CF-ICP | ● Two channels<br>● One porous membrane | ● One inlet and two outlets<br>● Minimized trans-membrane concentration difference<br>● Recovery rate = 50% |

REFERENCES

[1] R. Kwak, J. Han, Water desalination/purification and bio-agent preconcentration, US 2014/0374274 A1, 2014.
[2] B. Kim, J. Han, R. Kwak, Purification of ultra-high saline and contaminated water by multi-stage ion concentration polarization (ICP) desalination, US 2016/0115045 A1, 2016.
[3] R. Kwak, V. S. Pham, B. Kim, L. Chen, J. Han, Enhanced Salt Removal by Unipolar Ion Conduction in Ion Concentration Polarization Desalination, Sci Rep. 6 (2016) 25349. doi:10.1038/srep25349.
[4] B. Kim, R. Kwak, H. J. Kwon, Van Sang Pham, M. Kim, B. Al-Anzi, et al., Purification of High Salinity Brine by Multi-Stage Ion Concentration Polarization Desalination, Sci Rep. 6 (2016) 31850. doi:10.1038/srep31850.

REFERENCES

[1] H. Strathmann, Electrodialysis, a mature technology with a multitude of new applications, Desalination. 264 (2010) 268-288. doi:10.1016/j.desal.2010.04.069.
[2] J. Balster, D. F. Stamatialis, M. Wessling, Membrane with integrated spacer, Journal of Membrane Science. 360 (2010) 185-189. doi:10.1016/j.memsci.2010.05.011.
[3] K. M. Chehayeb, D. M. Farhat, K. G. Nayar, J. H. Lienhard, Optimal design and operation of electrodialysis for brackish-water desalination and for high-salinity brine concentration, Desalination. 420 (2017) 167-182. doi:10.1016/j.desal.2017.07.003.
[4] J. Balster, I. PUNT, D. STAMATIALIS, M. Wessling, Multi-layer spacer geometries with improved mass transport, Journal of Membrane Science. 282 (2006) 351-361. doi:10.1016/j.memsci.2006.05.039.
[5] J. G. D. Tadimeti, V. Kurian, A. Chandra, S. Chattopadhyay, Corrugated membrane surfaces for effective ion transport in electrodialysis, Journal of Membrane Science. 499 (2016) 418-428. doi:10.1016/j.memsci.2015.11.001.
[6] R. Kwak, V. S. Pham, B. Kim, L. Chen, J. Han, Enhanced Salt Removal by Unipolar Ion Conduction in Ion Concentration Polarization Desalination, Sci Rep. 6 (2016) 25349. doi:10.1038/srep25349.
[7] B. Kim, R. Kwak, H. J. Kwon, Van Sang Pham, M. Kim, B. Al-Anzi, et al., Purification of High Salinity Brine by Multi-Stage Ion Concentration Polarization Desalination, Sci Rep. 6 (2016) 31850. doi:10.1038/srep31850.
[8] B. Kim, H. Kwon, S. H. Ko, G. Lim, J. Han, Partial desalination of hypersaline brine by lab-scale ion concentration polarization device, Desalination. 412 (2017) 20-31. doi:10.1016/j.desal.2017.02.018.
[9] H. J. Kwon, B. Kim, G. Lim, J. Han, A multiscale-pore ion exchange membrane for better energy efficiency, J. Mater. Chem. A. 6 (2018) 7714-7723. doi:10.1039/C7TA10570C.
[10] Y. Tanaka, Current density distribution and limiting current density in ion-exchange membrane electrodialysis, Journal of Membrane Science. 173 (2000) 179-190. doi:10.1016/S0376-7388(00)00368-9.
[11] V. A. Shaposhnik, Analytical model of laminar flow electrodialysis with ion-exchange membranes, Journal of Membrane Science. 133 (1997) 27-37. doi:10.1016/50376-7388(97)00063-X.
[12] International Standard IEC 60746-3:2002, 2002.
[13] V. S. Pham, Z. Li, K. M. Lim, J. K. White, J. Han, Direct numerical simulation of electroconvective instability and hysteretic current-voltage response of a permselective membrane, Physical Review E. 86 (2012) 046310. doi:10.1103/PhysRevE.86.046310.
[14] R. Kwak, V. S. Pham, K. M. Lim, J. Han, Shear Flow of an Electrically Charged Fluid by Ion Concentration Polarization: Scaling Laws for Electroconvective Vortices, Phys. Rev. Lett. 110 (2013) 114501. doi:10.1103/PhysRevLett.110.114501.
[15] J. M. Ortiz, J. A. Sotoca, E. Expôsito, F. Gallud, V. Garcia-Garcia, V. Montiel, et al., Brackish water desalination by electrodialysis: batch recirculation operation modeling, Journal of Membrane Science. 252 (2005) 65-75. doi:10.1016/j.memsci.2004.11.021.
[16] R. K. McGovern, A. M. Weiner, L. Sun, C. G. Chambers, S. M. Zubair, J. H. Lienhard, On the cost of electrodialysis for the desalination of high salinity feeds, Applied Energy. 136 (2014) 649-661. doi:10.1016/j.apenergy.2014.09.050.

[17] S. Choi, Microfluidic engineering of water purification, Massachusetts Institute of Technology, 2017.

[18] M. G. P. Schyvens, SUEZ 2020 EDR Systems, (2017) 1-3.

[19] MEGA|RALEX membranes for ED, EDI and EF coating, Mega.Cz. (n.d.). https://www.mega.cz/ru/membranes/ (accessed Aug. 6, 2018).

[20] H. Strathmann, A. Grabowski, G. Eigenberger, Ion-Exchange Membranes in the Chemical Process Industry, Ind. Eng. Chem. Res. 52 (2013) 10364-10379. doi:10.1021/ie4002102.

[21] Protocols for Electrodialysis. Membrane selection, Membrane fouling and Design, 2017.

[22] Electrodialysis and Electrodialysis Reversal, (2010) 1-2. http://aqwatec.mines.edu/produced_water/treat/docs/Electrodialysis.pdf (accessed Aug. 6, 2018).

[23] World Energy Prices (2018 edition), Iea.org. (n.d.). http://www.iea.org/publications/freepublications/publication/WorldEnergyPrices201 8Overview.pdf (accessed Aug. 6, 2018).

[24] N. Afrasiabi, E. Shahbazali, RO brine treatment and disposal methods, Desalination and Water Treatment. 35 (2011) 39-53. doi:10.5004/dwt.2011.3128.

[25] L. F. Greenlee, D. F. Lawler, B. D. Freeman, B. Marrot, P. Moulin, Reverse osmosis desalination: Water sources, technology, and today's challenges, Water Research. 43 (2009) 2317-2348. doi:10.1016/j.watres.2009.03.010.

[26] R. Smith, A. Purnama, H. H. Al-Barwani, Sensitivity of hypersaline Arabian Gulf to seawater desalination plants, Applied Mathematical Modelling. 31 (2007) 2347-2354. doi:10.1016/j.apm.2006.09.010.

[27] N. Meshkati, M. Tabibzadeh, An Integrated System-Oriented Model for the Interoperability of Multiple Emergency Response Agencies in Large-Scale Disasters: Implications for the Persian Gulf, International Journal of Disaster Risk Science. 7 (2016) 227-244. doi:10.1007/s13753-016-0099-0.

[28] D. A. Roberts, E. L. Johnston, N. A. Knott, Impacts of desalination plant discharges on the marine environment: A critical review of published studies, Water Research. 44 (2010) 5117-5128. doi:10.1016/j.watres.2010.04.036.

[29] J. A. Slutz, J. A. Anderson, R. Broderick, P. H. Homer, Key Shale Gas Water Management Strategies: An Economic Assessment, Society of Petroleum Engineers, 2012. doi:10.2118/157532-MS.

[30] L. Addams, G. Boccaletti, M. Kerlin, M. Stuchtey, Charting our water future: economic frameworks to inform decision-making, McKinsey & Company, New York, 2009.

[31] K. G. Nayar, J. Fernandes, R. K. McGovern, K. Dominguez, B. Al-Anzi, J. H. Lienhard, COSTS AND ENERGY NEEDS OF RO-ED HYBRID SYSTEMS FOR ZERO BRINE DISCHARGE SEAWATER DESALINATION, in: The International Desalination Association World Congress on Desalination and Water Reuse, Sao Paulo, Brazil, 2017.

[32] C. Fritzmann, J. Löwenberg, T. Wintgens, T. Melin, State-of-the-art of reverse osmosis desalination, Desalination. 216 (2007) 1-76. doi:10.1016/j.desal.2006.12.009.

While this invention has been particularly shown and described with references to preferred embodiments thereof, it will be understood by those skilled in the art that various changes in form and details may be made therein without departing from the scope of the invention encompassed by the appended claims.

All references, articles, patent applications, patent publications and patents are incorporated herein by reference in their entirety.

What is claimed is:

1. A method of purifying and/or concentrating a first water stream containing impurities comprising the steps of:
   a. directing the first water stream into an inlet of a channel as a feed stream that comprises water and charged contaminants, wherein the channel is defined, at least in part, by a first ion exchange membrane and a second ion exchange membrane, wherein the ion exchange membranes are juxtaposed and characterized by the same charge,
      wherein the channel is further characterized as having an inlet end and a return flow end, wherein the inlet end is the end of the channel at which the inlet is located, and the return flow end is the end of the channel downstream from the inlet end,
      the channel further comprising a first outlet and a second outlet, wherein the inlet and at least the first outlet are located on the inlet end of the channel and are separated by a first porous membrane that traverses the length of the channel between the ion exchange membranes and terminates at a return flow zone, wherein the return flow zone is a section of the channel at the return flow end, and wherein the return flow end is at least partially closed;
   b. applying an electric field across the channel causing formation of a charged-contaminant-depletion zone comprising a purified water stream and formation of a charged-contaminant-enrichment zone comprising a concentrated charged-contaminant aqueous stream,
      wherein at least part of the feed stream enters the return flow zone and forms a first return flow stream that flows to the opposing side of the first porous membrane, the first return flow stream flowing in the direction of the first outlet, and at least part of the feed stream, including the water and the charged contaminants, adjacent to the first porous membrane flowing through the first porous membrane joining the first return flow stream,
      wherein the purified water stream is the stream directed to the first or the second outlet, and the concentrated charged-contaminant aqueous stream is the stream directed to the other of the first and the second outlet; and
   c. collecting the purified water stream and/or the concentrated charged-contaminant aqueous stream from the first and/or second outlet.

2. The method of claim 1, wherein the ion exchange membranes are cation exchange membranes, wherein each cation exchange membrane has a cathodic side and an anodic side.

3. The method of claim 1, wherein the ion exchange membranes are anion exchange membranes.

4. The method of claim 1, wherein the first porous membrane is a non-ionic porous membrane.

5. The method of claim 1, wherein the second outlet is located at the return flow end.

6. The method of claim 1, wherein the second outlet is located at the inlet end.

7. The method of claim 1, wherein the electric field is created by an electrode and a ground each located external and parallel to the channel.

8. The method of claim 7, wherein the electrode forms a second channel with the first ion exchange membrane and the ground forms a third channel with the second ion exchange membrane.

9. The method of claim 8, wherein the second and third channels are filled with an electrolyte solution.

10. The method of claim 9, wherein the electrolyte solution is the first water stream.

11. The method of claim 2, wherein the first outlet is located on the cathodic side of the first porous membrane, the inlet is located on the anodic side of the first porous membrane, and the purified water stream is directed to the first outlet.

12. The method of claim 11, wherein the second outlet is located at the return flow end, and optionally on the anodic side of the first porous membrane.

13. The method of claim 2, wherein the first outlet is located on the anodic side of the first porous membrane, the inlet is located on the cathodic side of the first porous membrane, and the concentrated water stream is directed to the first outlet.

14. The method of claim 13, wherein the second outlet is located at the return flow end, and optionally on the cathodic side of the first porous membrane.

15. The method of claim 1, wherein the second outlet is located on the inlet end of the channel, wherein the inlet is located between the first outlet and the second outlet, and wherein the inlet and the second outlet are separated by a second porous membrane that traverses the length of the channel between the ion exchange membranes and terminates at the return flow zone, and wherein the return flow end is fully closed.

16. The method of claim 15, wherein the ion exchange membranes are cation exchange membranes.

17. The method of claim 15, wherein the ion exchange membranes are anion exchange membranes.

18. The method of claim 15, wherein the second porous membrane is a non-ionic porous membrane.

19. The method of claim 16, wherein the first outlet is located on the cathodic side of the first porous membrane, and the second outlet is located on the anodic side of the second porous membrane, wherein the purified water stream is directed to the first outlet, and the concentrated charged-contaminant aqueous stream is directed to the second outlet,
  wherein at least part of the feed stream enters the return flow zone and forms a second return flow stream that flows to the opposing side of the second porous membrane and flows in the direction of the second outlet, and at least part of the feed stream, including the water and the charged contaminants, adjacent to the second porous membrane flowing through the second porous membrane joining the second return flow stream.

20. The method of claim 1, wherein the first water stream comprises salt.

21. The method of claim 20, wherein the first water stream is brine.

22. The method of claim 1, wherein the first water stream comprises biomolecules.

* * * * *